US012763490B2

(12) United States Patent
Lee

(10) Patent No.: US 12,763,490 B2
(45) Date of Patent: Oct. 13, 2026

(54) ANTENNA DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventor: Jungaun Lee, Nisshin (JP)

(73) Assignees: DENSO CORPORATION, Kariya-city (JP); TOYOTA JIDOSHA KABSUHIKI KAISHA, Toyota (JP); MIRISE Technologies Corporation, Nisshin (JP)

(*) Notice: Subject to any disclaimer, the term of this patent is extended or adjusted under 35 U.S.C. 154(b) by 80 days.

(21) Appl. No.: 19/029,488

(22) Filed: Jan. 17, 2025

(65) Prior Publication Data

US 2025/0323423 A1 Oct. 16, 2025

(30) Foreign Application Priority Data

Apr. 12, 2024 (JP) ................................ 2024-064776

(51) Int. Cl.

| | |
|---|---|
| ***H01Q 21/00*** | (2006.01) |
| ***H01Q 1/52*** | (2006.01) |
| ***H01Q 21/06*** | (2006.01) |
| ***H01Q 23/00*** | (2006.01) |

(52) U.S. Cl.
CPC ........... *H01Q 21/005* (2013.01); *H01Q 1/523* (2013.01); *H01Q 21/064* (2013.01); *H01Q 23/00* (2013.01)

(58) Field of Classification Search
CPC ........ H01Q 1/3233; H01Q 1/52; H01Q 1/521; H01Q 1/523; H01Q 1/525; H01Q 13/0233; H01Q 21/0037; H01Q 21/0043; H01Q 21/005; H01Q 21/06; H01Q 21/061; H01Q 21/064; H01Q 23/00
See application file for complete search history.

(56) References Cited

U.S. PATENT DOCUMENTS

2018/0277962 A1* 9/2018 Kamo ..................... H01P 1/211
2023/0420857 A1* 12/2023 Garcia Tejero ......... G01S 7/027

* cited by examiner

*Primary Examiner* — Robert Karacsony
(74) *Attorney, Agent, or Firm* — Posz Law Group, PLC

(57) ABSTRACT

An antenna device includes: waveguide sections; a partition wall section disposed to partition the waveguide sections; radiation aperture sections connected to the waveguide sections, respectively; and a distribution section including a feeding aperture through which radio waves are introduced and forming a distribution waveguide to each of the waveguide sections. The waveguide sections extend in a first direction, and are arranged in a second direction. The positions of two of the radiation aperture sections are shifted from each other in the first direction. The distribution section is formed by being folded back from the one side to the other side in the first direction to make phases of the radio waves opposite to each other.

7 Claims, 41 Drawing Sheets

ANTENNA DEVICE

CROSS REFERENCE TO RELATED APPLICATION

This application is based on Japanese Patent Application No. 2024-064776 filed on Apr. 12, 2024, the disclosure of which is incorporated herein by reference.

TECHNICAL FIELD

The present disclosure relates to an antenna device.

BACKGROUND

An antenna apparatus includes antenna devices each including radiation apertures for radiating radio waves. In the antenna device, the radiation apertures are arranged side by side at predetermined spacings in a predetermined direction.

SUMMARY

According to an aspect of the present disclosure, an antenna device includes: a plurality of waveguide sections each forming a waveguide path for radio waves; a partition wall section disposed between the waveguide sections; a plurality of radiation aperture sections connected to the plurality of waveguide sections, respectively, to radiate the radio waves; and a distribution section including a feeding aperture through which radio waves are introduced and forming a distribution waveguide to distribute and propagate the radio waves to each of the waveguide sections. The waveguide sections extend in a first direction, and are arranged in a second direction. The waveguide section includes a connection on one side in the first direction, the connection being connected to an end of the distribution section on the other side in the first direction, and the positions of the connections in the first direction overlap between the waveguide sections. Positions of two of the radiation aperture sections are shifted from each other in the first direction, and the two of the radiation aperture sections are respectively connected to two of the waveguide sections adjacent to each other via the partition wall section. The distribution section includes the feeding aperture in the second direction, and is formed by being folded back from the one side to the other side in the first direction to propagate the radio waves to the respective connections of the two of the waveguide sections, and the distribution section makes phases of the radio waves opposite to each other.

DESCRIPTION OF EMBODIMENTS

Figure 1:
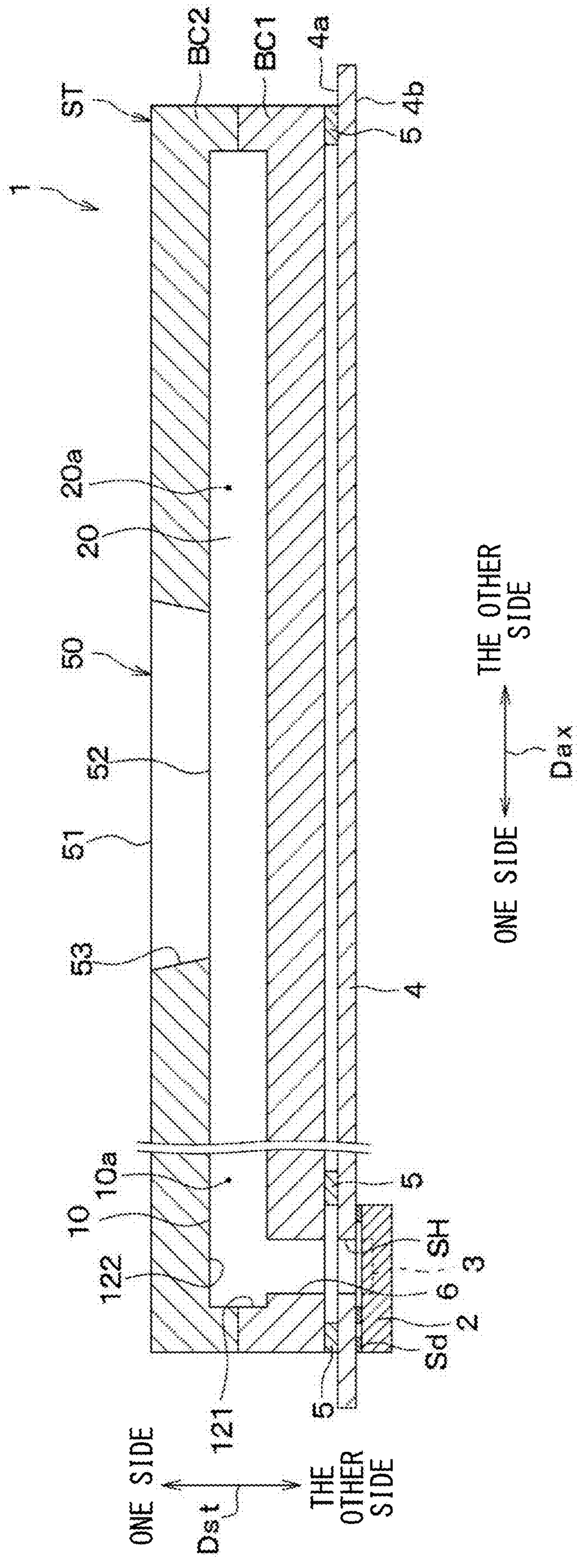
FIG. 1 is a cross-sectional view taken along line I-I of FIG. 2, schematically illustrating an antenna device according to a first embodiment.

Conventionally, an antenna apparatus including antenna devices each including four radiation apertures for radiating radio waves is known. In the antenna device disposed in the antenna apparatus, four radiation apertures are arranged side by side at predetermined spacings in a predetermined direction.

In the antenna device, four radiation apertures are arranged side by side at predetermined spacings in a predetermined direction. When the radiation apertures are arranged side by side along a predetermined direction as described above, in order to improve the gain of the radio waves radiated from the antenna device, it is required to align the phases of the radio waves radiated from the radiation apertures and to combine these radio waves. However, in the case of aligning the phases of the radio waves radiated from the radiation apertures arranged side by side in the predetermined direction, it is necessary to ensure that the spacing between the radiation apertures is at least as long as the radio wavelength.

However, ensuring that the spacing between the radiation apertures is as long as the radio wavelength inevitably increases the size of the antenna device in the direction in which the radiation apertures are arranged. In addition, when the radiation apertures are arranged side by side along the predetermined direction while ensuring that the spacing is as long as the radio wavelength, the sidelobes of the radio waves radiated from the antenna device tend to increase. As a result of the inventor's detailed studies, the above has been found.

The present disclosure provides an antenna device capable of suppressing sidelobes of radio waves while minimizing an increase in size.

According to an aspect of the present disclosure, an antenna device includes: a plurality of waveguide sections each forming a waveguide path that is a propagation path for radio waves; a partition wall section that is disposed between the plurality of waveguide sections and partitions the plurality of waveguide sections; a plurality of radiation aperture sections that are connected to the plurality of waveguide sections, respectively, and radiate the radio waves; and a distribution section including a feeding aperture through which radio waves are introduced and forming a distribution waveguide that is a propagation path to distribute and propagate the radio waves, introduced through the feeding aperture, to each of the plurality of waveguide sections. The waveguide sections extend in a predetermined first direction, are formed side by side in a second direction orthogonal to the first direction, and include connections on one side in the first direction, each of the connections being connected to an end of the distribution section on the other side in the first direction, and the positions of the connections in the first direction overlap. Positions of two of the plurality of radiation aperture sections are shifted from each other in the first direction, the two radiation aperture sections being respectively connected to two waveguide sections that are adjacent to each other via the partition wall section among the plurality of waveguide sections. The distribution section includes the feeding aperture in the second direction, and is formed by being folded back from the one side to the other side in the first direction to be able to propagate the radio waves to the respective connections of the two waveguide sections adjacent to each other via the partition wall section among the plurality of waveguide sections, and the distribution section makes phases of the radio waves, propagated to the connections of the two waveguide sections, opposite to each other.

According to this, by bringing the phases of the radio waves, radiated from the two radiation aperture sections connected to the two waveguide sections adjacent to each other via the partition wall section, close to the same phase, it is possible to suppress sidelobes while amplifying the radio waves radiated from the two radiation aperture sections. The dimension of each of the waveguide sections in the first direction can made smaller than in a configuration in which a part that radiates radio waves along the first direction is placed in a single waveguide extending along the first direction. Therefore, it is possible to restrict an increase in the size of the antenna device.

Hereinafter, embodiments of the present disclosure will be described with reference to the drawings. In the following embodiment, the same or equivalent parts to those described in the preceding embodiment are denoted by the same reference numerals, and the description thereof may be omitted. When only some of the constituent elements are described in the embodiment, the constituent elements described in the preceding embodiment can be applied to the other constituent elements. In the following embodiments, the embodiments can be partially combined with each other as long as the combination is not particularly hindered, even when not particularly specified.

First Embodiment

The present embodiment will be described with reference to FIGS. 1 to 16. In the present embodiment, an antenna device 1 of the present disclosure is applied to an equipment including an electrical component such as MMIC 2. The term "MMIC" is an abbreviation for monolithic microwave integrated circuit. The MMIC 2 illustrated in FIG. 1 is a semiconductor device that includes an input/output section 3 that transmits and receives radio waves. The MMIC 2 is transmission/reception equipment provided corresponding to the antenna device 1. In the present embodiment, the operating frequency of the radio waves transmitted and received by MMIC 2 is in a frequency band (e.g., 76.5 GHZ) corresponding to millimeter waves. The operating frequency of the radio waves transmitted and received by the MMIC 2 is not limited to the frequency corresponding to millimeter waves, and may be a frequency other than millimeter waves.

As illustrated in FIG. 1, the MMIC 2 is mounted on an electrical board 4. The electrical board 4 is a printed board on which wiring patterns are formed by a conductive material, such as metal foil. The electrical board 4 has one surface 4*a* on one side in the thickness direction of the board, and the other surface 4*b* on the other side in the thickness direction of the board. The MMIC 2 is mounted on the other surface 4*b* of the electrical board 4. A board through-hole SH, penetrating the electrical board 4, is formed at a position in the electrical board 4 that faces the input/output section 3 of the MMIC 2. In FIG. 1, solder Sd for joining the MMIC 2 to the other surface 4*b* of the electrical board 4 is illustrated.

Spacers 5 are arranged on the one surface 4*a* of the electrical board 4. The spacer 5 is made of, for example, a conductive material. The spacer 5 is fixed to the electrical board 4. The antenna device 1 is disposed on the one surface 4*a* of the electrical board 4, with the spacers 5 interposed therebetween. The antenna device 1 is fixed to the electrical board 4 by screwing, bonding, or other means while being in contact with the MMIC 2 and each of the spacers 5.

The antenna device 1 is an antenna that transmits radio waves transmitted and received by the MMIC 2. The antenna device 1 is configured by a structure ST having a stacked structure in which two conductive blocks BC1, BC2 are stacked in a predetermined direction. The two blocks BC1, BC2 are made of metal blocks. At least one of the two blocks BC1, BC2 may not be made of metal but, for example, may be made of a conductive film, such as a metal film formed on the surface of a resin block by plating or other means, or a block made of a conductive material other than metal.

The antenna device 1 includes two blocks BC1, BC2, and the two blocks BC1, BC2 are coupled to each other by screwing, bonding, or other means. The antenna device 1 is fixed to the electrical board 4 in an orientation where a stacking direction Dst of the two blocks BC1, BC2 coincides with the thickness direction of the electrical board 4. In the present embodiment, of the two blocks BC1, BC2, the block on the side closer to the electrical board 4 is referred to as the first block BC1, and the block on the side farther from the electrical board 4 is referred to as the second block BC2. The antenna device 1 is stacked in the order of the first block BC1 and the second block BC2 from the other side to one side in the stacking direction Dst.

Figure 2:
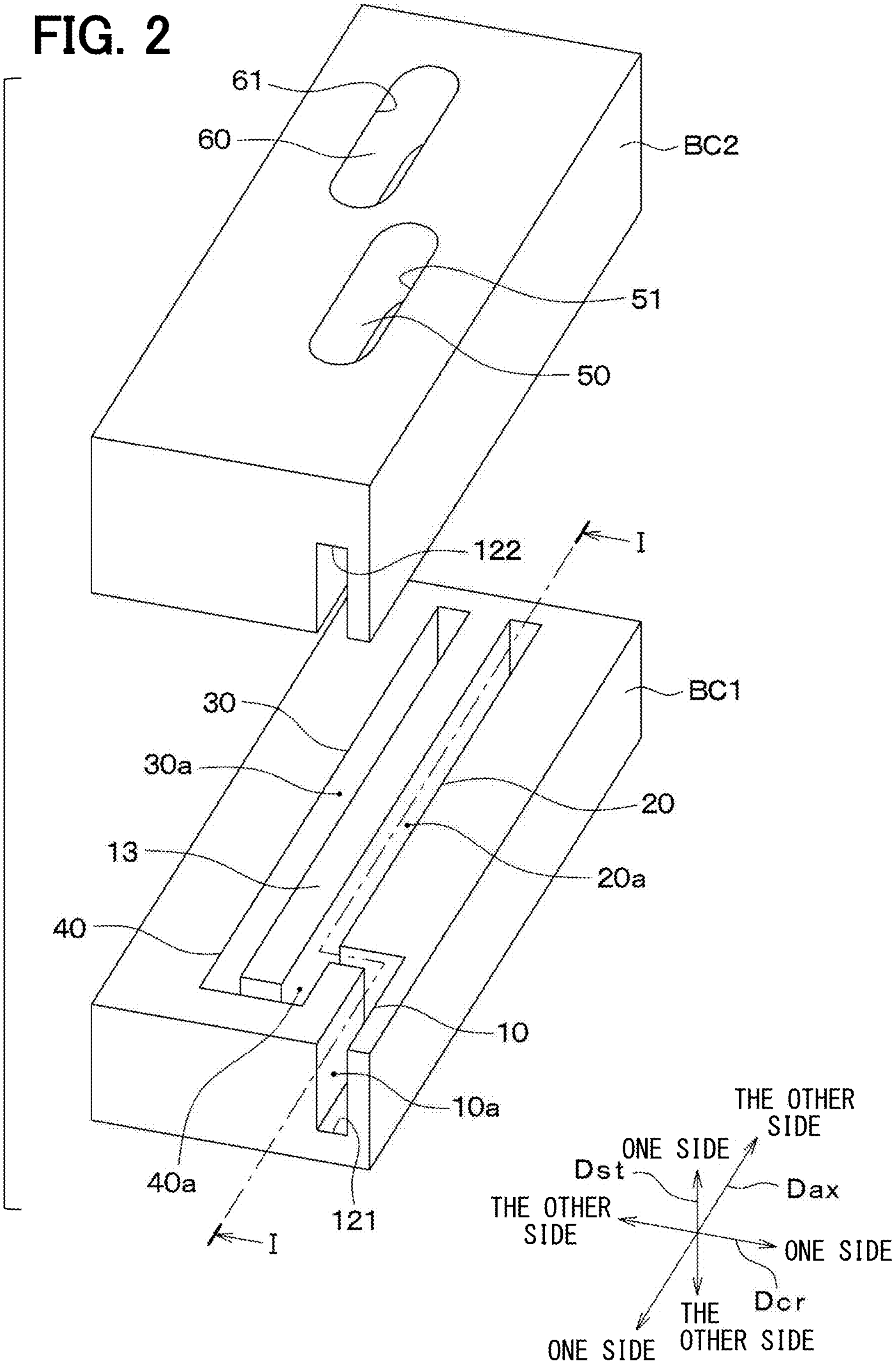
FIG. 2 is a schematic exploded diagram illustrating a first block and a second block of the antenna device according to the first embodiment.

As illustrated in FIGS. 1 and 2, the two blocks BC1, BC2 have the same rectangular shape as each other in a plan view, which is the directional view along the stacking direction Dst. The two blocks BC1, BC2 have substantially the same size in the plan view to overlap each other in the stacking direction Dst. The surfaces of the first block BC1 and second block BC2 that face each other are in partial contact. Thus, the two blocks BC1, BC2 are electrically connected.

The surface of the first block BC1 facing the electrical board 4, that is, the surface on the other side in the stacking direction Dst, faces the one surface 4*a* of the electrical board 4, with the MMIC 2 and the spacers 5 interposed therebetween. Although not illustrated, the first block BC1 is electrically connected to a ground pattern included in a wiring pattern formed on the one surface 4*a* of the electrical board 4 via at least some of the spacers 5. Since the second block BC2 is electrically connected to the first block BC1, the second block BC2 is electrically connected to the ground pattern of the electrical board 4 via the first block BC1. The ground pattern of the electrical board 4 is at a ground potential.

In the first block BC1, an external port 6 is formed, which is provided so that radio waves propagate to and from the MMIC 2. The external port 6 is formed in the first block BC1 as an aperture hole opening on the other side in the stacking direction Dst, and is provided so that radio waves can propagate to and from the MMIC 2. The external port 6 is formed in the first block BC1 at a position facing the input/output section 3, with the board through-hole SH interposed between the external port 6 and the input/output section 3 of the MMIC 2. This enables radio waves to propagate between the external port 6 and the MMIC 2.

Figure 3:
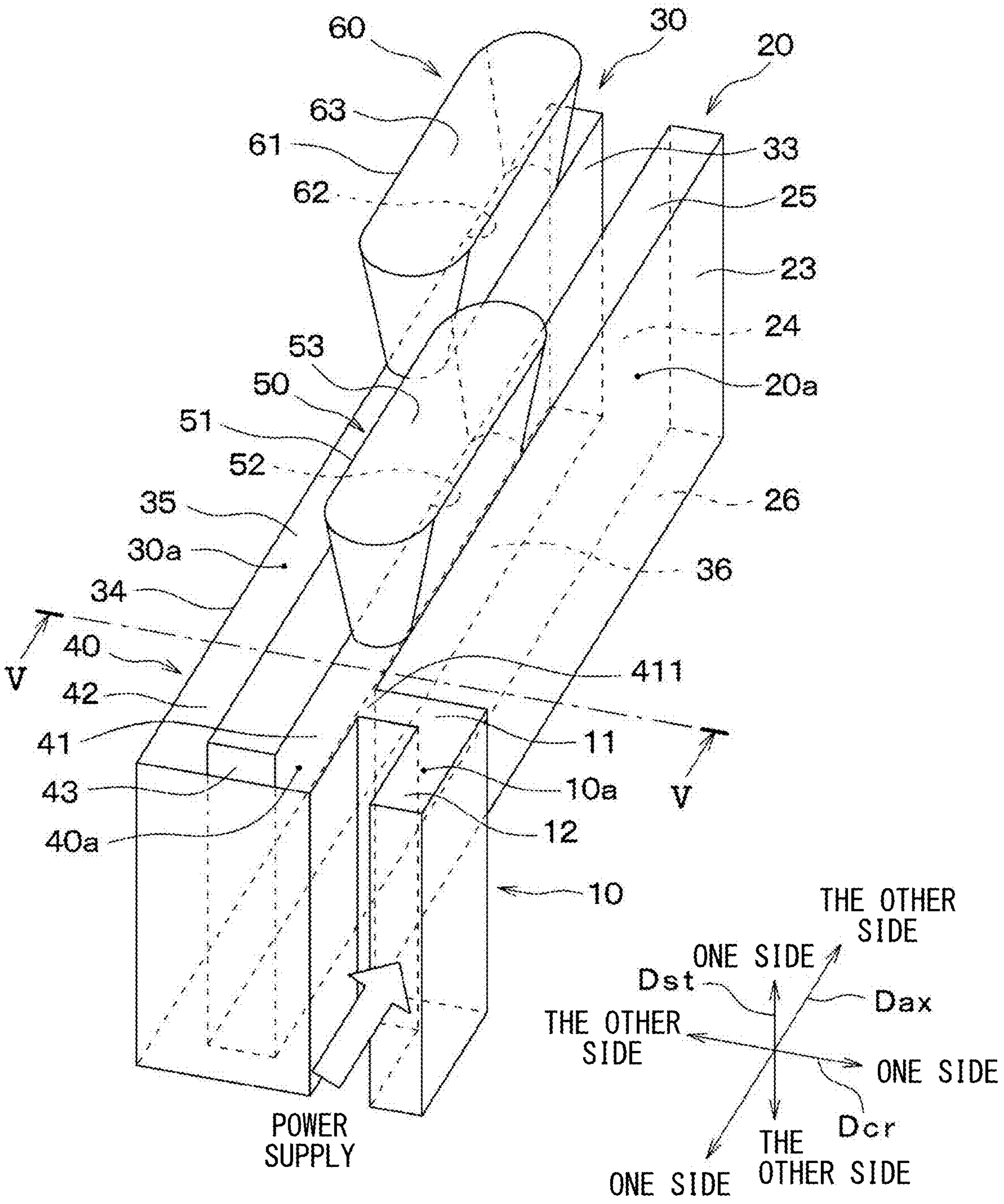
FIG. 3 is an explanatory view for explaining a feeding section, a first waveguide section, a second waveguide section, a distribution section, a first radiation aperture section, and a second radiation aperture section according to the first embodiment.

As illustrated in FIGS. 1 to 3, in the first block BC1 and the second block BC2, the following sections are formed: a feeding section 10, which is provided so that radio waves propagate to and from the MMIC 2, and a first waveguide section 20 and a second waveguide section 30, each constituting a part of a waveguide that serves as a propagation path for the radio waves. Moreover, in the first block BC1 and the second block BC2, a distribution section 40 is formed to distribute the radio waves, introduced from the feeding section 10, to the first waveguide section 20 and the second waveguide section 30. In the second block BC2, a first radiation aperture section 50 and a second radiation aperture section 60, which radiate the radio waves to the external space, are formed.

The feeding section 10, the first waveguide section 20, the second waveguide section 30, and the distribution section 40 are formed by coupling groove sections 121, 122 that are formed in portions facing each other in the stacking direction Dst in the first block BC1 and the second block BC2. The first radiation aperture section 50 and the second radiation aperture section 60 are formed through the second block BC2 in the stacking direction Dst. The portions of the first block BC1 and the second block BC2 that form the feeding section 10, the first waveguide section 20, the second waveguide section 30, and the distribution section 40 constitute a "waveguide". In the present embodiment, the feeding section 10 communicates with the external port 6. In FIGS. 2 and 3, and in FIG. 4 and the like, which will be described later, the peripheral part of the external port 6 of the antenna device 1 is omitted.

In the first block BC1, the first groove section 121 is formed in a portion facing the second block BC2. The first groove section 121 is formed of a bottomed groove recessed from one side to the other side in the stacking direction Dst. The external port 6 is formed on the bottom surface of the first groove section 121. In the second block BC2, the second groove section 122 is formed in a portion facing the first groove section 121 of the first block BC1. The second groove section 122 is formed of a bottomed groove recessed from the other side to one side in the stacking direction Dst.

Figure 4:
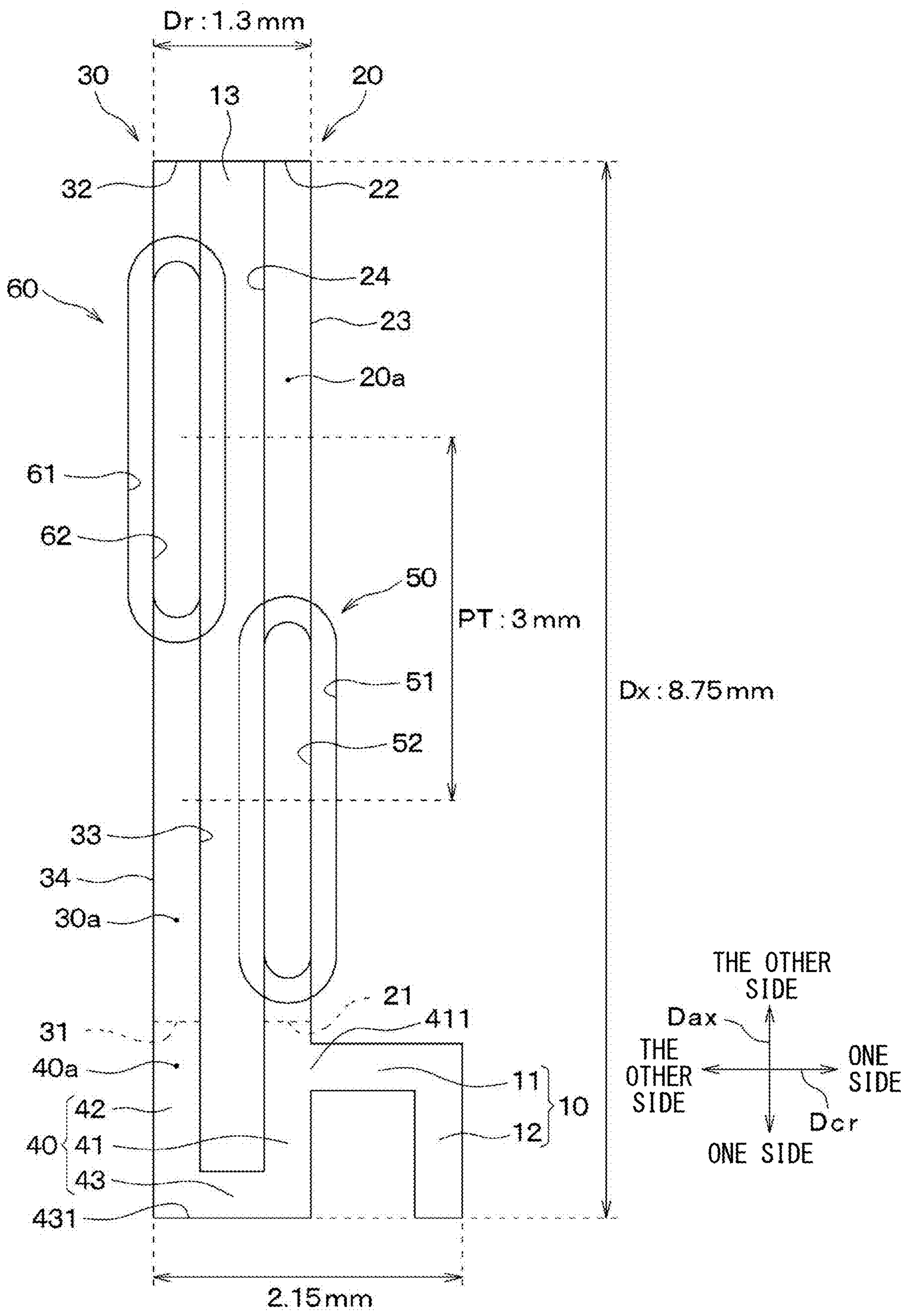
FIG. 4 is a plan view schematically illustrating the antenna device according to the first embodiment as viewed in a direction orthogonal to a stacking direction.

The feeding section 10 guides the radio waves transmitted by the input/output section 3 of the MMIC 2 to the distribution section 40, and guides the radio waves received from the first radiation aperture section 50 and the second radiation aperture section 60 to the input/output section 3 of the MMIC 2. As illustrated in FIGS. 2 to 4, the feeding section 10 has a substantially L-shaped cross section orthogonal to the stacking direction Dst. In the feeding section 10, a first feeding section 11, which communicates with the distribution section 40 and extends along a direction orthogonal to the stacking direction Dst, and a second feeding section 12, which is orthogonal to the stacking direction Dst and the extending direction of the first feeding section 11 and communicates with the first feeding section 11, are formed continuously. That is, the feeding section 10 is formed of a groove with a partially bent shape. The feeding section 10 in the present embodiment is formed of a groove with a shape bent at 90°.

Hereinafter, one direction that is a direction orthogonal to the stacking direction Dst and is the extending direction of the second feeding section 12 is referred to as a guide axis direction Dax, and one direction that is a direction orthogonal to the stacking direction Dst and the guide axis direction Dax and the extending direction of the first feeding section 11 is referred to as a guide width direction Dcr. The guide axis direction Dax is a direction along the central axis of the second feeding section 12. The guide width direction Dcr is a direction along the central axis of the first feeding section 11. The guide axis direction Dax corresponds to the first direction. The guide width direction Dcr corresponds to the second direction. The stacking direction Dst corresponds to the third direction.

The first feeding section 11 and the second feeding section 12 have equal dimensions in the stacking direction Dst. The first feeding section 11 has a cross section orthogonal to the guide width direction Dcr, formed in a rectangular shape extending in the stacking direction Dst. Specifically, the first feeding section 11 is formed in a rectangular shape with a dimension in the stacking direction Dst larger than the dimension in the guide axis direction Dax.

In addition, the second feeding section 12 has a cross section orthogonal to the guide axis direction Dax, formed in a rectangular shape extending in the stacking direction Dst. Specifically, the second feeding section 12 is formed in a rectangular shape with a dimension in the stacking direction Dst larger than the dimension in the guide width direction Dcr. The dimension of the first feeding section 11 in the guide axis direction Dax is equal to the dimension of the second feeding section 12 in the guide width direction Dcr.

In the first feeding section 11, the end on one side in the guide width direction Dcr communicates with the second feeding section 12, and the end on the other side in the guide width direction Dcr communicates with the distribution section 40. In the second feeding section 12, the end on one side in the guide axis direction Dax is connected to the MMIC 2 via the external port 6, and the end on the other side in the guide axis direction Dax communicates with the first feeding section 11. This enables radio waves to propagate between the feeding section 10 and the MMIC 2. A feeding path 10*a* that propagates radio waves is formed inside the feeding section 10. A feeding path 10*a* is formed between the first block BC1 and the second block BC2 as a cavity formed by being bent at 90°.

The first waveguide section 20 is a propagation path constituting a "waveguide" that guides the radio waves, introduced from the feeding section 10, to the first radiation aperture section 50 and guides the radio waves received from the first radiation aperture section 50 to the feeding section 10. The second waveguide section 30 is a propagation path constituting a "waveguide" that guides the radio waves, introduced from the feeding section 10, to the second radiation aperture section 60 and guides the radio waves received from the second radiation aperture section 60 to the feeding section 10. As illustrated in FIGS. 2 to 4, the first waveguide section 20 and the second waveguide section 30 are formed extending along the guide axis direction Dax.

The first waveguide section 20 and the second waveguide section 30 are formed side by side in the guide width direction Dcr, with the central axis of each waveguide section extending along the guide axis direction Dax. As illustrated in FIG. 2, the first waveguide section 20 and the second waveguide section 30 are arranged in the guide width direction Dcr via a partition wall section 13. One side of each of the first waveguide section 20 and the second waveguide section 30 in the guide axis direction Dax communicates with the distribution section 40.

As illustrated in FIG. 4, the first waveguide section 20 includes a first connection 21, connected to the distribution section 40, on one side in the guide axis direction Dax, and includes a first terminal wall 22, forming the terminal end of the waveguide, on the other side in the guide axis direction Dax. The first terminal wall 22 is formed of a planar wall expanding in a direction orthogonal to the guide axis direction Dax. In FIG. 4, the first connection 21, which is a boundary part between the first waveguide section 20 and the distribution section 40, is indicated by a broken line.

As illustrated in FIG. 3, the first waveguide section 20 has a one-side first wide wall surface 23 on one side in the guide width direction Dcr, and has an other-side first wide wall surface 24 on the other side in the guide width direction Dcr. Moreover, the first waveguide section 20 has a one-side first narrow wall surface 25 on one side in the stacking direction Dst, and has an other-side first narrow wall surface 26 on the other side in the stacking direction Dst. The one-side first wide wall surface 23 and the other-side first wide wall surface 24 have a planar shape perpendicular to the guide width direction Dcr, and are formed extending in the guide axis direction Dax and the stacking direction Dst. The one-side first narrow wall surface 25 and the other-side first narrow wall surface 26 have a planar shape perpendicular to the stacking direction Dst, and are formed extending in the guide axis direction Dax and the guide width direction Dcr.

The sizes of the one-side first narrow wall surface 25 and the other-side first narrow wall surface 26 in the guide width direction Dor are smaller than the sizes of the one-side first wide wall surface 23 and the other-side first wide wall surface 24 in the stacking direction Dst. The first radiation aperture section 50 is connected to the one-side first narrow wall surface 25. That is, in the first waveguide section 20, the first radiation aperture section 50 is not connected to the one-side first wide wall surface 23 or the other-side first wide wall surface 24. The first waveguide section 20 is configured as a waveguide that propagates radio waves between the feeding section 10 and the first radiation aperture section 50.

The second waveguide section 30 includes a second connection 31, connected to the distribution section 40, on one side in the guide axis direction Dax, and includes a second terminal wall 32, forming the terminal end of the waveguide, on the other side in the guide axis direction Dax. The second terminal wall 32 is formed of a planar wall expanding in a direction orthogonal to the guide axis direction Dax. In FIG. 4, the second connection 31, which is a boundary part between the second waveguide section 30 and the distribution section 40, is indicated by a broken line.

In addition, the second waveguide section 30 has a one-side second wide wall surface 33 on one side in the guide width direction Dcr, an other-side second wide wall surface 34 on the other side in the guide width direction Dcr, a one-side second narrow wall surface 35 on one side in the stacking direction Dst, and an other-side second narrow wall surface 36 on the other side in the stacking direction Dst. The one-side second wide wall surface 33 and the other-side second wide wall surface 34 have a planar shape perpendicular to the guide width direction Dcr, and are formed extending in the guide axis direction Dax and the stacking direction Dst. The one-side second narrow wall surface 35 and the other-side second narrow wall surface 36 have a planar shape perpendicular to the stacking direction Dst, and are formed extending in the guide axis direction Dax and the guide width direction Dcr.

The sizes of the one-side second narrow wall surface 35 and the other-side second narrow wall surface 36 in the guide width direction Dor are smaller than the sizes of the one-side second wide wall surface 33 and the other-side second wide wall surface 34 in the stacking direction Dst. The second radiation aperture section 60 is connected to the one-side second narrow wall surface 35. That is, in the second waveguide section 30, the second radiation aperture section 60 is not connected to the one-side second wide wall surface 33 or the other-side second wide wall surface 34. The second waveguide section 30 is configured as a waveguide that propagates radio waves between the feeding section 10 and the second radiation aperture section 60.

In the first waveguide section 20 and the second waveguide section 30, the positions of the first connection 21 and the second connection 31 in the guide axis direction Dax overlap, and the positions of the first terminal wall 22 and the second terminal wall 32 in the guide axis direction Dax overlap. That is, the first waveguide section 20 and the second waveguide section 30 have equal dimensions in the guide axis direction Dax. The antenna device 1 includes a partition wall section 13 that is disposed between the first waveguide section 20 and the second waveguide section 30 and partitions the first waveguide section 20 and the second waveguide section 30.

A first waveguide path **20*a* that extends in the guide axis direction Dax and propagates radio waves is formed inside the first waveguide section 20. A second waveguide path 30*a* that extends in the guide axis direction Dax and propagates radio waves is formed inside the second waveguide section 30. The first waveguide path 20*a* and the second waveguide path 30*a* are formed between the first block BC1 and the second block BC2 as cavities extending in the guide axis direction Dax. For example, in the present embodiment, the boundary between the first block BC1 and the second block BC2 is located in the middle of the range occupied by the first waveguide path 20*a* and the second waveguide path 30*a*** in the stacking direction Dst.

The first waveguide path **20*a* is formed on one side of the center in each of the first block BC1 and the second block BC2 in the guide width direction Dcr. In contrast, the second waveguide path 30*a* is formed on the other side of the center in each of the first block BC1 and the second block BC2 in the guide width direction Dcr. The first waveguide path 20*a* and the second waveguide path 30*a* are formed at positions with equal distances from the center of each of the first block BC1 and the second block BC2 in the guide width direction Dcr. The first radiation aperture section 50 is connected to the first waveguide section 20. The second radiation aperture section 60 is connected to the second waveguide section 30**.

The distribution section 40 is a propagation path constituting a "waveguide" that distributes and propagates the radio waves, introduced from the feeding section 10, to the first waveguide section 20 and the second waveguide section 30. The groove forming the distribution section 40 has a substantially U-shaped cross section orthogonal to the stacking direction Dst. Specifically, the distribution section 40 is formed to extend from the first connection 21 of the first waveguide section 20 to the other side in the guide axis direction Dax, fold back from the other side to one side in the guide axis direction Dax, and be connectable to the second connection 31 of the second waveguide section 30. Therefore, the groove formed by the continuation of the first waveguide section 20, the second waveguide section 30, and the distribution section 40 has a substantially U-shape that folds back.

As illustrated in FIGS. 3 and 4, the distribution section 40 includes a first distribution section 41 extending along the guide axis direction Dax and connected to the first connection 21 of the first waveguide section 20, and a second distribution section 42 extending along the guide axis direction Dax and connected to the second connection 31 of the second waveguide section 30. Moreover, the distribution section 40 includes a third distribution section 43 extending along the guide width direction Dcr and connected to the first distribution section 41 and the second distribution section 42. The first distribution section 41 and the second distribution section 42 are formed side by side in the guide width direction Dcr, with the central axis of each distribution section extending along the guide axis direction Dax. The first distribution section 41 and the second distribution section 42 are arranged in the guide width direction Dcr via the partition wall section 13.

The first distribution section 41 guides the radio waves introduced into the distribution section 40 to the first waveguide section 20. In the first distribution section 41, the other side in the guide axis direction Dax communicates with the first waveguide section 20, and one side in the guide axis direction Dax communicates with the third distribution section 43. The first distribution section 41 includes a feeding aperture 411, to which the feeding section 10 is connected, on one side in the guide width direction Dcr, and radio waves are introduced through the feeding aperture 411.

The second distribution section 42 guides the radio waves introduced into the distribution section 40 to the second waveguide path **30*a*. In the second distribution section 42, the other side in the guide axis direction Dax communicates with the second waveguide section 30, and one side in the guide axis direction Dax communicates with the third distribution section 43. The second distribution section 42 communicates with the feeding section 10 via the first distribution section 41 and the third distribution section 43. The radio waves introduced through the feeding aperture 411 of the first distribution section 41 are introduced into the second distribution section 42 via the third distribution section 43. The first distribution section 41 and the second distribution section 42 have equal dimensions in the guide axis direction Dax. The third distribution section 43 extends along the guide width direction Dcr, with one side in the guide width direction Der connected to the first distribution section 41 and the other side in the guide width direction Dcr connected to the second distribution section 42. The third distribution section 43 guides the radio waves, introduced through the feeding aperture 411 of the first distribution section 41, to the second distribution section 42**.

In the distribution section 40 including the first distribution section 41, the second distribution section 42, and the third distribution section 43 formed in this manner, a portion where the first distribution section 41 and the third distribution section 43 are connected is bent at 90°, that is, at a right angle. In the distribution section 40, a portion where the second distribution section 42 and the third distribution section 43 are connected is bent at 90°, that is, at a right angle. The distribution section 40 forms a folded section by being folded back by 180° from one side to the other side in the guide axis direction Dax to bypass the partition wall section 13.

The distribution section 40 is connected to the first waveguide section 20 and the second waveguide section 30 adjacent to each other via the partition wall section 13. A distribution waveguide 40*a* that propagates radio waves is formed inside the distribution section 40 by folding back. The distribution waveguide 40*a* is formed between the first block BC1 and the second block BC2 as a cavity formed by being bent at 180°. The distribution section 40 includes a distribution end wall 431, forming a part of the inner wall surface of the third distribution section 43, on one side in the guide axis direction Dax. The distribution end wall 431 is formed as a short circuit section of the distribution waveguide 40*a*, facing the distribution waveguide 40*a*, and is constituted by a planar wall expanding in a direction orthogonal to the guide axis direction Dax.

This enables radio waves to propagate between the first waveguide path 20*a*, the second waveguide path 30*a*, the distribution waveguide 40*a*, and the feeding path 10*a* of the feeding section 10. Specifically, the radio waves introduced from the feeding path 10*a* of the feeding section 10 into the distribution waveguide 40*a* of the distribution section 40 are distributed in the distribution waveguide 40*a* and propagated to the first waveguide path 20*a* of the first waveguide section 20 and the second waveguide path 30*a* of the second waveguide section 30.

Figure 5:
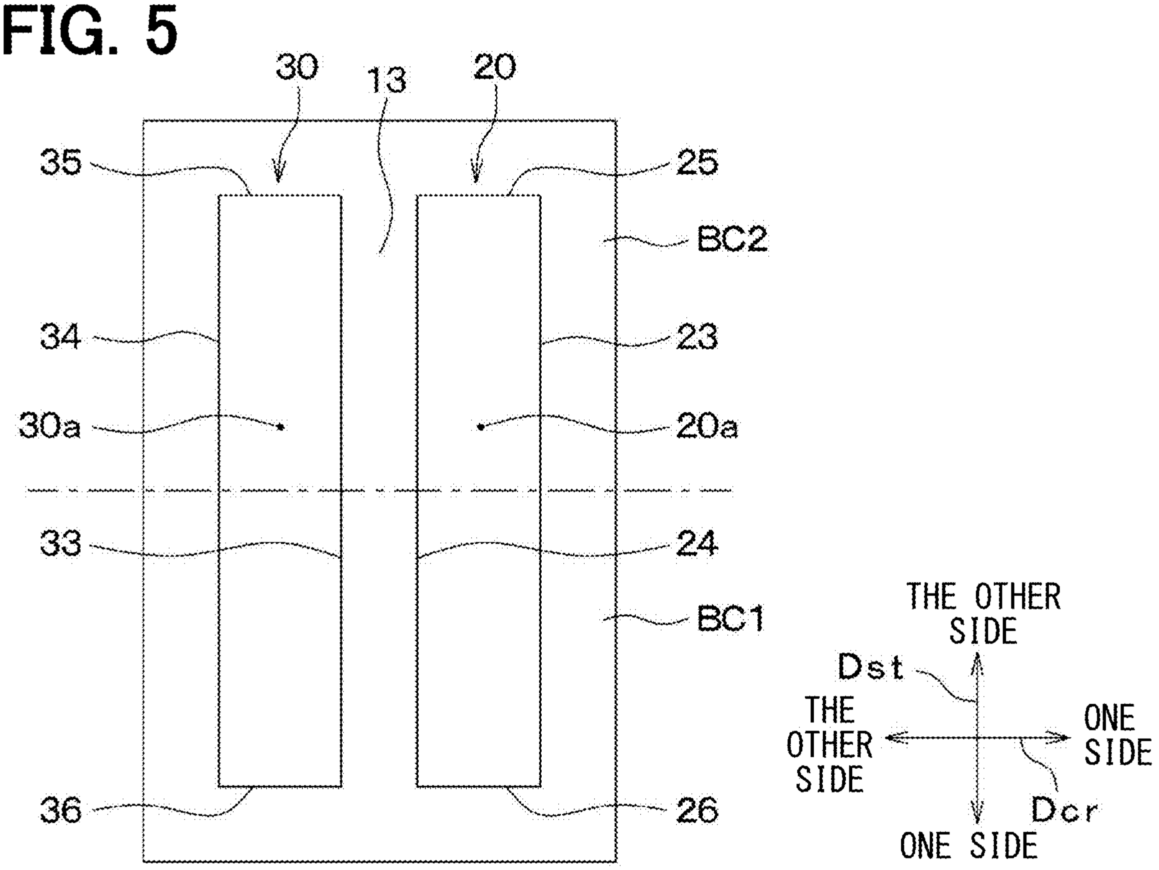
FIG. 5 is a cross-sectional view taken along line V-V of FIG. 3.

Each of the first waveguide section 20, the second waveguide section 30, and the distribution section 40 has a cross section orthogonal to the propagating direction of the radio waves, formed in a rectangular shape extending in the stacking direction Dst. Specifically, as illustrated in FIG. 5, each of the first waveguide section 20 and the second waveguide section 30 has a cross section orthogonal to the guide axis direction Dax, formed in a rectangular shape with a dimension in the guide width direction Dcr larger than the dimension in the stacking direction Dst. Each of the first distribution section 41 and the second distribution section 42 also has a cross section orthogonal to the guide axis direction Dax, formed in a rectangular shape with a dimension in the stacking direction Dst larger than the dimension in the guide width direction Dcr. The third distribution section 43 has a cross section orthogonal to the guide width direction Dcr, formed in a rectangular shape with a dimension in the stacking direction Dst larger than the dimension in the guide axis direction Dax. In FIG. 5, a boundary between the first block BC1 and the second block BC2 is indicated by a broken line.

The first waveguide section 20, the second waveguide section 30, and the distribution section 40 have cross sections of equal shape, orthogonal to the propagating direction of the radio waves. Specifically, the first waveguide section 20, the second waveguide section 30, the first distribution section 41, the second distribution section 42, and the third distribution section 43 have equal dimensions in the stacking direction Dst. In addition, the first waveguide section 20, the second waveguide section 30, the first distribution section 41, and the second distribution section 42 have equal dimensions in the guide width direction Dcr. The dimension of each of the first waveguide section 20, the second waveguide section 30, the first distribution section 41, and the second distribution section 42 in the guide width direction Dor is equal to the dimension of the third distribution section 43 in the guide axis direction Dax.

The dimension of each of the first waveguide section 20, the second waveguide section 30, the first distribution section 41, the second distribution section 42, and the third distribution section 43 in the stacking direction Dst is equal to the dimension of the feeding section 10 in the stacking direction Dst. In addition, the dimension of the first waveguide path 20*a* in the guide axis direction Dax from the distribution end wall 431 to the first connection 21 is equal to the dimension of the second waveguide path 30*a* in the guide axis direction Dax from the distribution end wall 431 to the second connection 31.

The first radiation aperture section 50 is a slot part that radiates the radio waves propagated from the feeding section 10 to the first waveguide section 20 to the external space of the antenna device 1 and receives the radio waves from the external space. The second radiation aperture section 60 is a slot part that radiates the radio waves propagated from the feeding section 10 to the second waveguide section 30 to the external space of the antenna device 1 and receives the radio waves from the external space.

The first radiation aperture section 50 is formed through the second block BC2 in the stacking direction Dst, extending from the surface of the second block BC2 on one side in the stacking direction Dst to the first waveguide section 20. The second radiation aperture section 60 is formed through the second block BC2 in the stacking direction Dst, extending from the surface of the second block BC2 on one side in the stacking direction Dst to the second waveguide section 30.

The first radiation aperture section 50 includes a first radiation aperture 51, opening toward the external space of the antenna device 1, on one side in the stacking direction Dst. The first radiation aperture section 50 includes a first communication port 52, communicating with the first waveguide section 20, on the other side in the stacking direction Dst. The first radiation aperture section 50 is formed as a through-hole penetrating the second block BC2 from the first radiation aperture 51 to the first communication port 52. The first radiation aperture section 50 includes a first peripheral wall surface 53 that is the wall surface of the first radiation aperture section 50 formed as a through-hole. The first peripheral wall surface 53 is formed in an annular shape surrounding the first radiation aperture section 50 in the directional view orthogonal to the stacking direction Dst.

The second radiation aperture section 60 includes a second radiation aperture 61, opening toward the external space of the antenna device 1, on one side in the stacking direction Dst. The second radiation aperture section 60 includes a second communication port 62, communicating with the second waveguide section 30, on the other side in the stacking direction Dst. The second radiation aperture section 60 is formed as a through-hole penetrating the second block BC2 from the second radiation aperture 61 to the second communication port 62. The second radiation aperture section 60 includes a second peripheral wall surface 63 that is the wall surface of the second radiation aperture section 60 formed as a through-hole. The second peripheral wall surface 63 is formed in an annular shape surrounding the second radiation aperture section 60 in the directional view orthogonal to the stacking direction Dst.

Each of the first radiation aperture section 50 and the second radiation aperture section 60 has a cross section orthogonal to the stacking direction Dst, formed in an oval shape extending in the guide axis direction Dax. That is, each of the first radiation aperture section 50 and the second radiation aperture section 60 has a dimension in the guide width direction Dcr smaller than the dimension in the guide axis direction Dax. Each of the first radiation aperture section 50 and the second radiation aperture section 60 is formed in a tapered shape with an inner diameter increasing from the other side to one side in the stacking direction Dst. Specifically, the first radiation aperture section 50 is formed as a through-hole with an inner diameter expanding from the first communication port 52 toward the first radiation aperture 51. The second radiation aperture section 60 is formed as a through-hole with an inner diameter expanding from the second communication port 62 toward the second radiation aperture 61.

In other words, each of the first radiation aperture section 50 and the second radiation aperture section 60 is formed as a through-hole with an inner diameter expanding toward one side in the stacking direction Dst. In the first radiation aperture section 50 of the present embodiment, the dimension of the first communication port 52 in the guide width direction Dcr is equal to the dimension of the first waveguide section 20 in the guide width direction Dcr, and the dimension of the first radiation aperture 51 in the guide width direction Dor is larger than the dimension of the first waveguide section 20 in the guide width direction Dcr. In the second radiation aperture section 60 of the present embodiment, the dimension of the second communication port 62 in the guide width direction Dcr is equal to the dimension of the second waveguide section 30 in the guide width direction Dcr, and the dimension of the second radiation aperture 61 in the guide width direction Dcr is larger than the dimension of the second waveguide section 30 in the guide width direction Dcr.

Therefore, the first peripheral wall surface 53 surrounding the first radiation aperture section 50 is inclined relative to the direction along the stacking direction Dst so that the distance from the axis the first radiation aperture section 50 increases from the other side to one side in the stacking direction Dst. That is, the first peripheral wall surface 53 is an inclined surface, where both the shape of the cross section orthogonal to the guide axis direction Dax and the shape of the cross section orthogonal to the guide width direction Dor are inclined relative to the direction along the stacking direction Dst.

The second peripheral wall surface 63 surrounding the second radiation aperture section 60 is inclined relative to the direction along the stacking direction Dst so that the distance from the axis the second radiation aperture section 60 increases from the other side to one side in the stacking direction Dst. That is, the second peripheral wall surface 63 is an inclined surface, where both the shape of the cross section orthogonal to the guide axis direction Dax and the shape of the cross section orthogonal to the guide width direction Der are inclined relative to the direction along the stacking direction Dst.

The first radiation aperture section 50 and the second radiation aperture section 60 are formed at different positions in the guide axis direction Dax, shifted from each other in the guide axis direction Dax. Specifically, in the present embodiment, the first radiation aperture section 50 is formed as shifted from the second radiation aperture section 60 to one side in the guide axis direction Dax.

Thus, the distance of the first radiation aperture section 50 from the feeding aperture 411 in the guide axis direction Dax is smaller than the distance of the second radiation aperture section 60 from the feeding aperture 411 in the guide axis direction Dax. That is, the first radiation aperture section 50 is formed at a position closer to the feeding aperture 411 than the second radiation aperture section 60. In other words, the distance from the first connection 21 to the portion where the first communication port 52 in the first waveguide path 20*a* communicates is smaller than the distance from the second connection 31 to the portion where the second communication port 62 in the second waveguide path 30*a* communicates.

Here, as illustrated in FIG. 4, the distance in the guide axis direction Dax between the center of the first radiation aperture section 50 in cross section orthogonal to the stacking direction Dst and the center of the second radiation aperture section 60 in cross section orthogonal to the stacking direction Dst is defined as an aperture pitch PT. The aperture pitch PT is the distance from the axis of the first radiation aperture section 50, which has an oval cross section orthogonal to the stacking direction Dst, to the axis of the second radiation aperture section 60, which has an oval cross section orthogonal to the stacking direction Dst.

The aperture pitch PT is set based on an in-guide wavelength $\lambda_g$ of each of radio waves propagating through the first waveguide path 20*a* and the second waveguide path 30*a*. For example, the aperture pitch PT is set to a size that is a positive multiple of half the length of the in-guide wavelength $\lambda_g$. In the present embodiment, the aperture pitch PT is set to the size of the in-guide wavelength $\lambda_g \times 0.5$, that is, half the size of the in-guide wavelength $\lambda_g$. The aperture pitch PT may not be the size of the in-guide wavelength $\lambda_g \times 0.5$ in the strict sense, but may be a size including a manufacturing error or the like, and includes, for example, a range approximately from the in-guide wavelength $\lambda_g \times 0.4$ to the in-guide wavelength $\lambda_g \times 0.6$. In the antenna device 1 of the present embodiment, the in-guide wavelength $\lambda_g$ is 6.0 mm, a free-space wavelength Ao is 3.92 mm, and the aperture pitch PT is 3.0 mm.

Here, as illustrated in FIG. 4, a dimension obtained by combining the dimension of the first waveguide section 20 in the guide axis direction Dax and the dimension of the distribution section 40 in the guide axis direction Dax is defined as an axial dimension Dx. Further, the dimension from the end of the first waveguide section 20 on one side in the guide width direction Dcr to the end of the second waveguide section 30 on the other side in the guide width direction Dcr is defined as a widthwise dimension Dr. The axial dimension Dx of the present embodiment is 8.75 mm, and the widthwise dimension Dr is 1.3 mm. The widthwise dimension Dr is less than or equal to half the free-space wavelength Ao. The feeding section 10 has a dimension of 0.85 mm in the guide width direction Dcr. That is, the combined dimension of the widthwise dimension Dr and the dimension of the feeding section 10 in the guide width direction Dcr is 2.15 mm.

Next, the operation of the antenna device 1 will be described. In the antenna device 1 of the present embodiment, for example, when radio waves are output from the input/output section 3 of the MMIC 2, the radio waves are input to the external port 6. The radio waves input to the external port 6 propagate from the external port 6 to the feeding path 10*a* of the feeding section 10, and propagate to the distribution waveguide 40*a* of the distribution section 40 via the feeding path 10*a*.

The radio waves input to the distribution waveguide 40*a* are distributed in the distribution waveguide 40*a*, one of which is propagated to the other side in the guide axis direction Dax, and the other is propagated to one side in the guide axis direction Dax. The radio wave propagated to the other side in the guide axis direction Dax is propagated to the first waveguide path 20*a* of the first waveguide section 20. The radio wave propagated to one side in the guide axis direction Dax is folded back by propagation to the first distribution section 41, the third distribution section 43, and the second distribution section 42, and is propagated to the second waveguide path 30*a* of the second waveguide section 30. The radio wave propagating to the first waveguide path 20*a* is radiated from the first radiation aperture 51 of the first radiation aperture section 50 to the external space of the antenna device 1. In addition, the radio wave propagating to the second waveguide path 30*a* is radiated from the second radiation aperture 61 of the second radiation aperture section 60 to the external space of the antenna device 1.

For example, when the input/output section 3 of the MMIC 2 receives radio waves from the external space of the antenna device 1, the antenna device 1 propagates the radio waves in a direction opposite to the case where the radio waves are output from the input/output section 3 described above.

Next, a description will be given of the reason why the antenna device 1 of the present embodiment includes the distribution section 40 and is configured to radiate the radio waves, distributed in the distribution waveguide 40*a*, to the external space of the antenna device 1 from the first radiation aperture 51 and the second radiation aperture 61, respectively. The antenna apparatus including apertures for radiating radio waves, such as the antenna device 1 of the present embodiment, can amplify the radio waves and improve the magnitude of the gain by making the phases of the radio waves radiated from the respective apertures the same. Therefore, when apertures are formed in a waveguide through which radio waves propagate, the apertures in the waveguide are required to be arranged such that the phases of the radio waves radiated from the respective apertures are the same.

Figure 6:
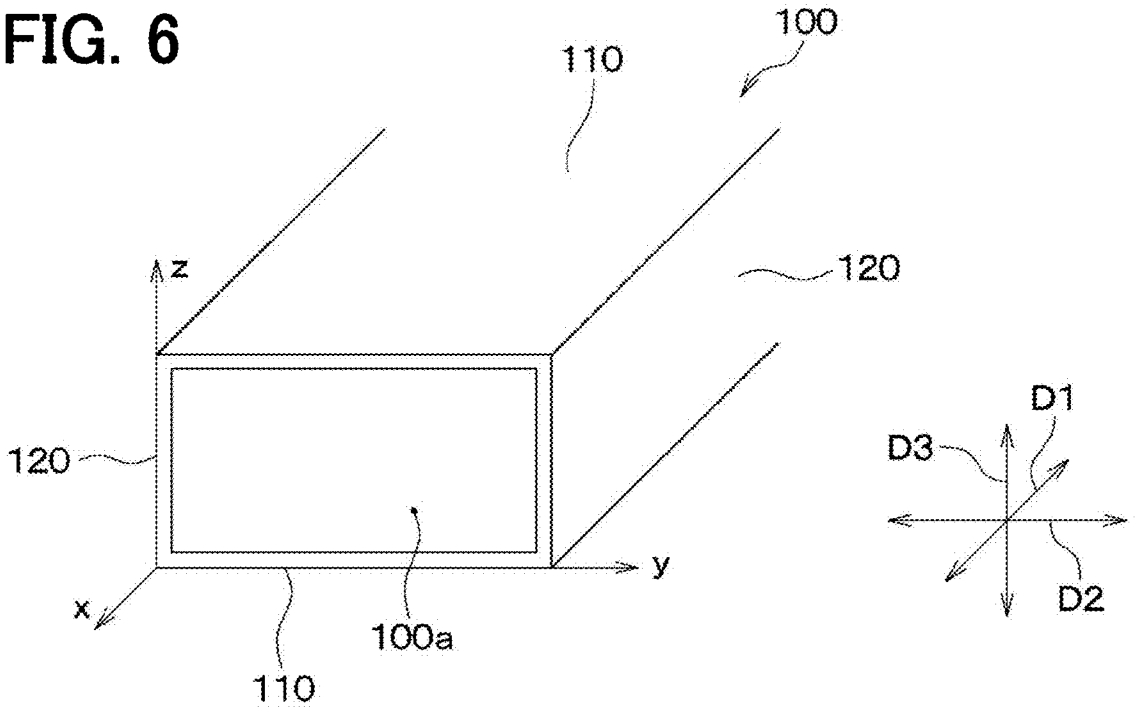
FIG. 6 is a schematic diagram illustrating a hollow waveguide for explanation of phases of radio waves radiated by the antenna device.

Here, the phases of the radio waves radiated by the antenna apparatus will be described with reference to a hollow waveguide 100 for the description, as illustrated in FIGS. 6 to 9. As illustrated in FIG. 6, the hollow waveguide 100 is formed to extend in an X direction D1 and has a quadrangular cylindrical shape with a dimension in a Z direction D3 smaller than the dimension in a Y direction D2. The X direction D1 illustrated in FIG. 6 is a direction in which energy is supplied to the hollow waveguide 100 to propagate radio waves in the hollow waveguide 100, and is a direction corresponding to the guide axis direction Dax in the first waveguide section 20 and the second waveguide section 30 of the present embodiment. The Y direction D2 is a direction orthogonal to the X direction D1, and is a direction corresponding to the stacking direction Dst in the first waveguide section 20 and the second waveguide section 30 of the present embodiment. The Z direction D3 is a direction orthogonal to the X direction D1 and the Y direction D2, and is a direction corresponding to the guide width direction Dcr in the first waveguide section 20 and the second waveguide section 30 of the present embodiment.

The hollow waveguide 100 has a cross section orthogonal to the X direction D1, formed in a rectangular shape extending in the Y direction D2, and includes a hollow waveguide 100*a* that propagates radio waves inside. In addition, the hollow waveguide 100 is formed such that the thickness of the wall is constant in a cross section orthogonal to the X direction D1. That is, similarly to the hollow waveguide 100, the hollow waveguide 100*a* has a cross section orthogonal to the X direction D1, formed in a rectangular shape extending in the Y direction D2. The hollow waveguide 100 includes two wide wall sections 110 extending in the X direction D1 and the Y direction D2 and facing each other, and two narrow wall sections 120 extending in the X direction D1 and the Z direction D3 and facing each other. The dimension of each of the two wide wall sections 110 in the Y direction D2 is larger than the dimension of each of the two narrow wall sections 120 in the Z direction D3. The hollow waveguide 100*a* is formed to be surrounded by the two wide wall sections 110 and the two narrow wall sections 120.

In the hollow waveguide 100 formed as described above, energy is supplied from one side to the other side in the X direction D1 to propagate radio waves so that the propagation mode of the radio waves becomes a TE10 mode. The TE10 mode indicates the transverse electric 10 mode. In this case, in the hollow waveguide 100*a*, an electric field in a direction along the Z direction D3 is generated as indicated by a solid arrow in FIG. 7. The direction of the electric field alternately changes from one side to the other side in the Z direction D3 and from the other side to one side in the Z direction D3 along the X direction D1.

Figure 7:
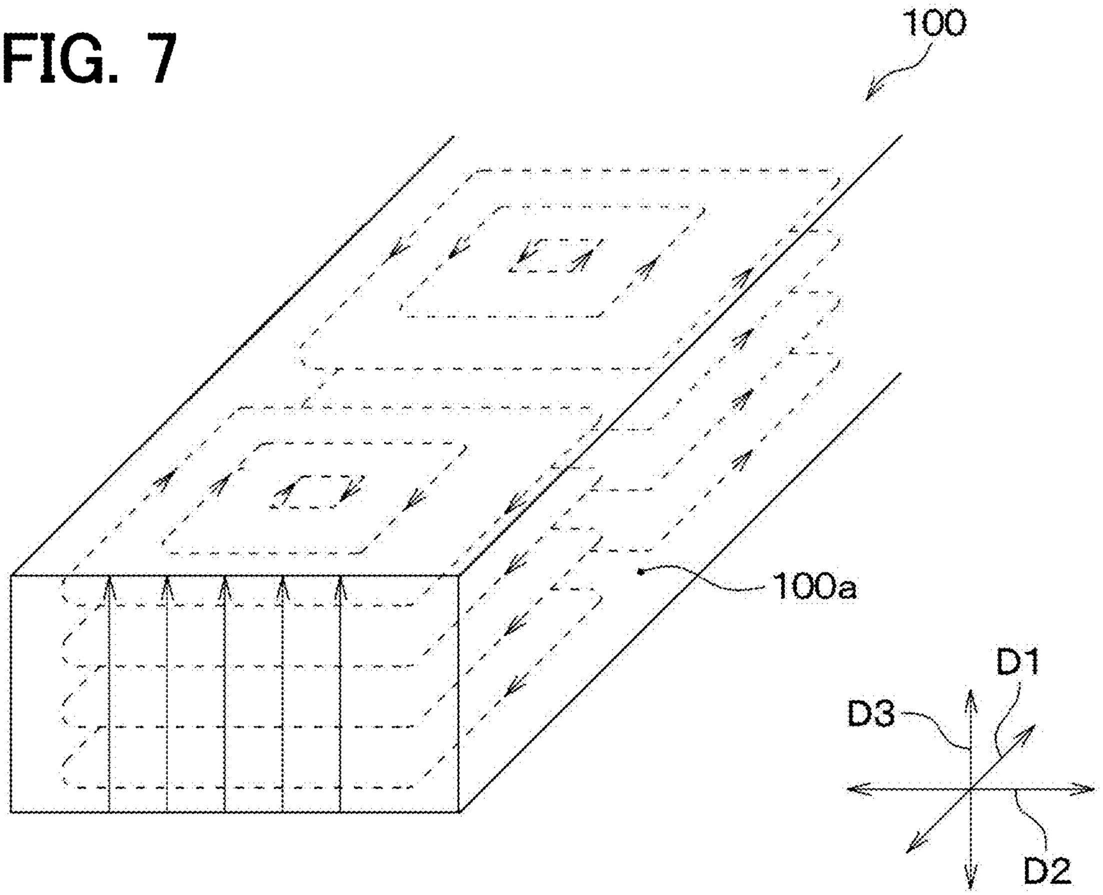
FIG. 7 is an explanatory view for explaining electric and magnetic fields generated in the hollow waveguide.

Along with the generation of the electric field, in the hollow waveguide 100*a*, a magnetic field in a spiral direction swirling in a substantially square shape is generated in a plan view, which is the directional view along the Z direction D3, as indicated by a broken line arrow in FIG. 7. Magnetic fields are generated side by side along the X direction D1 with the generation of the electric field, and the spiral directions of adjacent magnetic fields become opposite to each other. The spacing between the adjacent magnetic fields is half the in-guide wavelength $\lambda_g$. Thus, radio waves propagate in the hollow waveguide 100*a* along the X direction D1.

Figure 8:
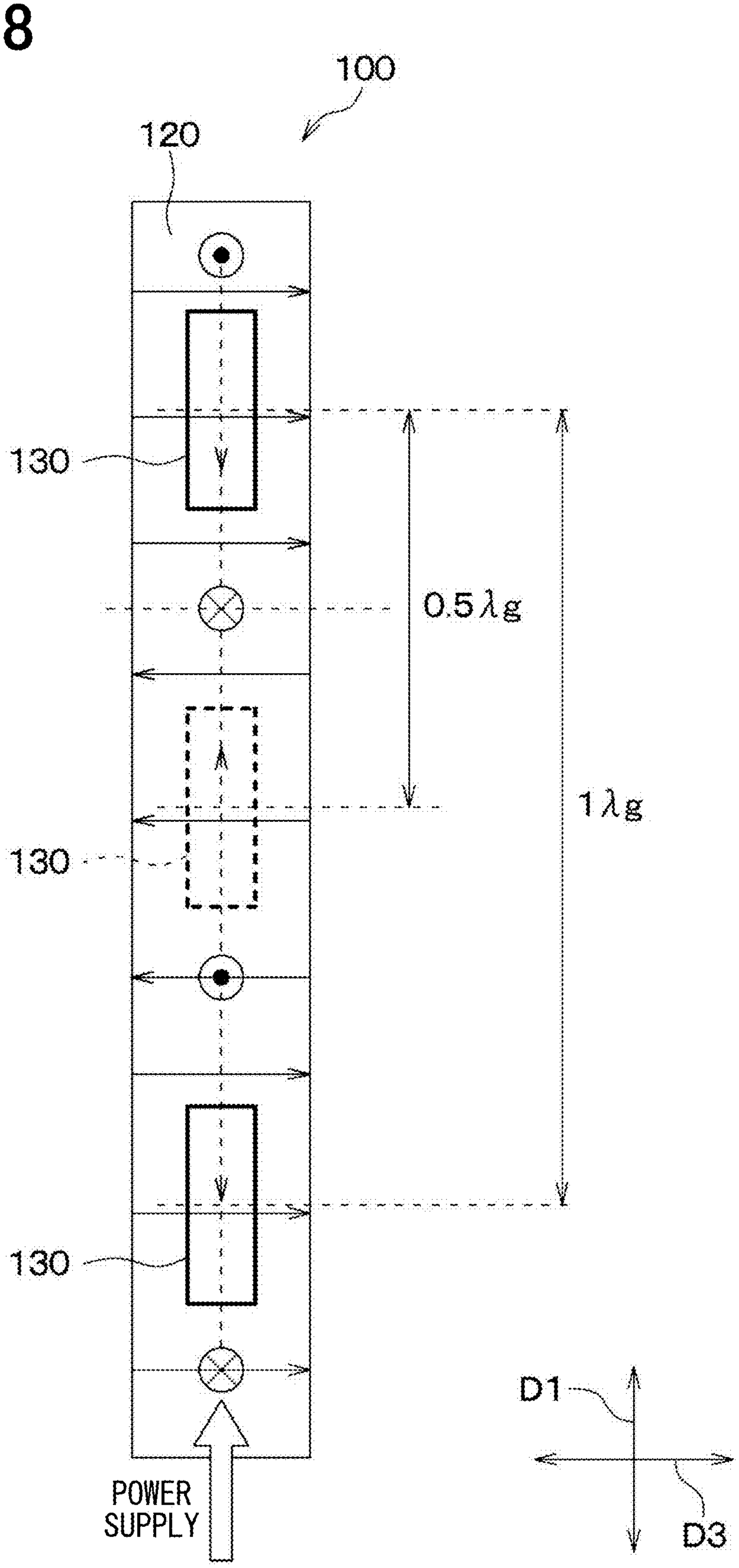
FIG. 8 is a view illustrating a hollow waveguide when radiation ports are arranged in a narrow wall section.
Figure 9:
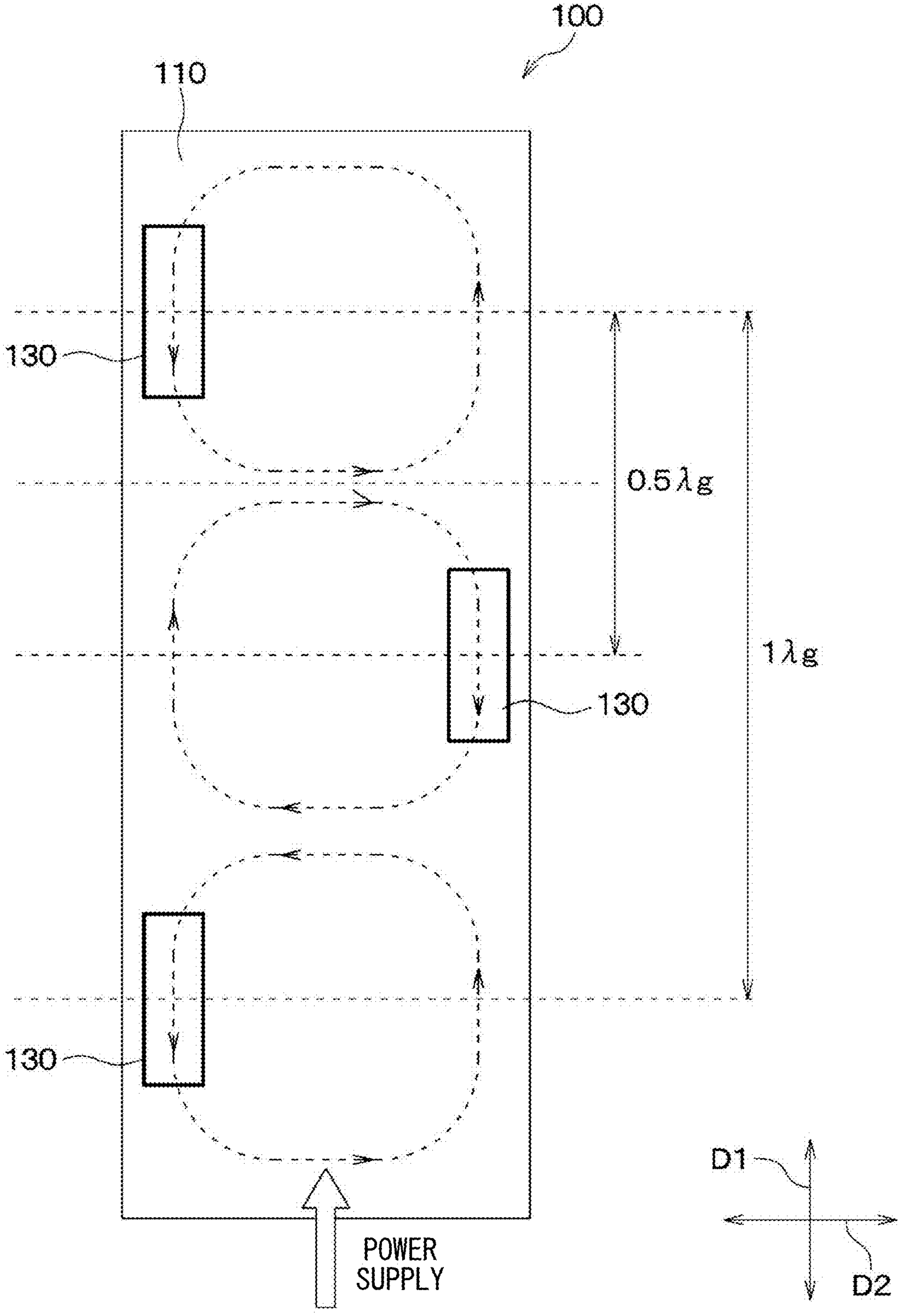
FIG. 9 is a view illustrating a hollow waveguide when radiation ports are arranged in a wide wall section.

Next, the arrangement restrictions for radiation ports 130 due to their varied configurations in a case where the radiation port 130 are formed in the hollow waveguide 100, where the electric and magnetic fields described above are generated in the hollow waveguide 100*a*, will be described with reference to FIGS. 8 and 9. FIG. 8 illustrates an example in which two radiation ports 130 are arranged only in one narrow wall section 120 out of the two narrow wall sections 120 and the two wide wall sections 110 that surround the hollow waveguide 100*a*. In contrast, FIG. 9 illustrates an example in which three radiation ports 130 are arranged only in one wide wall section 110 out of the two narrow wall sections 120 and the two wide wall sections 110 that surround the hollow waveguide 100*a*. In FIGS. 8 and 9, the electric field generated in the hollow waveguide 100*a* is indicated by a solid line, and the magnetic field generated in the hollow waveguide 100*a* is indicated by a broken line. In both the example illustrated in FIGS. 8 and 9, in the hollow waveguide 100 where the propagation mode of the radio waves is the TE10 mode, the radiation ports 130 are arranged such that the phases of the radio waves radiated from the radiation ports 130 are the same.

Specifically, when two radiation ports 130 are arranged in the narrow wall section 120, as illustrated in FIG. 8, the two radiation ports 130 need to be arranged side by side along the X direction D1 at positions where the direction of the magnetic field is along the X direction D1. When the two radiation ports 130 are arranged side by side along the X direction D1 in the narrow wall section 120 as described above, and excitation is performed in each of the two radiation ports 130, the spacing between the two radiation ports 130 needs to be set to a dimension that is a positive multiple of the length of the in-guide wavelength $\lambda_g$.

By setting the spacing between the two radiation ports 130 to a dimension that is a positive multiple of the length of the in-guide wavelength $\lambda_g$, the directions of the magnetic fields in the two radiation ports 130 can be aligned, as illustrated in FIG. 8. Thus, the phases of the radio waves radiated from the two radiation ports 130 can be made the same. That is, when the two radiation ports 130 are arranged in the narrow wall section 120 and the propagation mode of the radio waves is the TE10 mode, in order for the phases of the radio waves radiated from the respective radiation ports 130 to be made the same, it is necessary to ensure that the spacing between the two radiation ports 130 is at least as long as the in-guide wavelength $\lambda_g$. Therefore, when the radiation ports 130 are arranged in the narrow wall section 120, the dimension in the X direction D1 in the antenna apparatus tends to be large.

In FIG. 8, a temporary radiation port 130 disposed between the two radiation ports 130 at a position where the spacing from each of the two radiation ports 130 is half the length of the in-guide wavelength $\lambda_g$ is indicated by a broken line. As illustrated in FIG. 8, when the temporary radiation port 130 is disposed at a position where the spacing from each of the two radiation ports 130 is half the length of the in-guide wavelength $\lambda_g$, the direction of the magnetic field in the temporary radiation port 130 is opposite to the direction of the magnetic field in each of the two radiation ports 130 separated by half the length of the in-guide wavelength $\lambda_g$. In this case, the phase of the radio waves radiated from the temporary radiation port 130 is opposite to the phase of the radio waves radiated from each of the two radiation ports 130. For this reason, the phase of the radio waves radiated from the temporary radiation port 130 cannot be made the same as the phase of the radio waves radiated from the two radiation ports 130 adjacent to the temporary radiation port 130, and it is difficult to obtain a high gain.

Next, a case where three radiation ports 130 are arranged in the wide wall section 110 will be described with reference to FIG. 9. As illustrated in FIG. 9, when excitation is performed in each of the three radiation ports 130 arranged in the wide wall section 110, two of the three radiation ports 130 need to be arranged side by side along the X direction D1 at positions where the direction of the magnetic field is along the X direction D1. The remaining one of the three radiation ports 130 can be disposed at a position shifted relative to each of the two radiation ports 130 in the Y direction D2, with the direction of its magnetic field opposite to the direction of the magnetic fields of the two radiation ports 130.

When the two radiation ports 130 are arranged side by side along the X direction D1 in the wide wall section 110 as described above, the spacing between the two radiation ports 130 needs to be set to a dimension that is a positive multiple of the length of the in-guide wavelength $\lambda_g$. In addition, the spacing in the X direction D1 between each of the two radiation ports 130 arranged in the X direction D1 and the one radiation port 130 disposed as shifted from each other in the Y direction D2 needs to be set to a dimension that is a positive multiple of half the length of the in-guide wavelength $\lambda_g$. That is, when the three radiation ports 130 are arranged in the wide wall section 110, it is necessary to arrange the radiation ports 130 at a spacing that is a positive multiple of half the length of the in-guide wavelength $\lambda_g$ in the X direction D1 while alternately shifting to one side and the other side in the Y direction D2.

As described above, by setting the spacing between each of the three radiation ports 130 in the X direction D1 to a dimension that is a positive multiple of half the length of the in-guide wavelength $\lambda_g$, the directions of the magnetic fields in the three radiation ports 130 can be aligned, as illustrated in FIG. 9. Thus, the phases of the radio waves radiated from the respective three radiation ports 130 can be made the same. Therefore, when the three radiation ports 130 are arranged in the wide wall section 110 and the propagation mode of the radio waves is set to the TE10 mode, the spacing between each of the three radiation ports 130 in the X direction D1 may be ensured to be half the length of the in-guide wavelength $\lambda_g$. That is, when the radiation ports 130 are arranged in the wide wall section 110, the radiation ports 130 can be arranged side by side in the X direction D1 while being alternately shifted in the Y direction D2 by half the length of the in-guide wavelength $\lambda_g$.

Therefore, when the radiation ports 130 are arranged in the wide wall section 110 of the hollow waveguide 100, the number of radiation ports 130 can be made larger than when the radiation ports 130 are arranged in the narrow wall section 120 of the hollow waveguide 100 with the same dimension in the X direction D1. As a result, when the radiation ports 130 are arranged in the wide wall section 110, a higher gain can be obtained than when the radiation ports 130 are arranged in the narrow wall section 120 with the same dimension in the X direction D1. In other words, if the number of radiation ports 130 is the same, when the radiation ports 130 are arranged in the wide wall section 110, the dimension of the hollow waveguide 100 in the X direction D1 can be made smaller than when the radiation ports 130 are arranged in the narrow wall section 120.

However, in the configuration where the radiation ports 130 are arranged in the wide wall section 110, in addition to the radiation ports 130 arranged side by side in the X direction D1, it is necessary to dispose the radiation port 130 at a position shifted in the Y direction D2 relative to each of the radiation ports 130 that are arranged in the X direction D1. In general, when the radiation ports 130 are arranged in the wide wall section 110, the size of the wide wall section 110 in the Y direction D2 needs to be about half the length of the free-space wavelength Ao to the length of the free-space wavelength $\lambda_0$. For example, when the in-guide wavelength $\lambda_g$ is 6.0 mm and the free-space wavelength $\lambda_0$ is 3.92 mm, the size of the wide wall section 110 in the Y direction D2 is a dimension of 1.98 mm to 3.92 mm.

In the configuration where the radiation ports 130 are arranged in the wide wall section 110, the size in the Y direction D2 is at least twice as large as in the configuration where the radiation ports 130 are arranged in the narrow wall section 120. Therefore, when the radiation ports 130 are arranged in the wide wall section 110, the dimension of the hollow waveguide 100 in the Y direction D2 is larger than when the radiation ports 130 are arranged in the narrow wall section 120 of the hollow waveguide 100 with the same dimension in the X direction D1.

As described above, when the propagation mode of the radio waves in the hollow waveguide 100 extending in the X direction D1 is the TE10 mode, the direction of the magnetic field generated in the hollow waveguide 100 is opposite for every half the size of the in-guide wavelength $\lambda_g$. For this reason, when the radiation ports 130 are arranged in the narrow wall section 120, and the phases of the radio waves from the radiation ports 130 are made the same, it is necessary to ensure that the spacing between each of the radiation ports 130 is as long as the in-guide wavelength $\lambda_g$, so that the dimension of the hollow waveguide 100 in the X direction D1 tends to increase.

In contrast, when the radiation ports 130 are arranged in the wide wall section 110 and the radio waves from the radiation ports 130 are in the same phase, the radiation ports 130 can be arranged side by side in the X direction D1 while being alternately shifted in the Y direction D2 by half the length of the in-guide wavelength $\lambda_g$. Therefore, the dimension of the hollow waveguide 100 in the X direction D1 can be made smaller than when the radiation ports 130 are arranged in the narrow wall section 120, but the dimension tends to be increased in the Y direction D2.

Therefore, when the radiation ports 130 are arranged in the narrow wall section 120 of the hollow waveguide 100 extending in the X direction D1, it is difficult to reduce the dimension of the antenna apparatus in the X direction D1. Further, when the radiation ports 130 are arranged in the wide wall section 110 of the hollow waveguide 100 extending in the X direction D1, it is difficult to reduce the dimension of the antenna apparatus in the Y direction D2. Moreover, according to the inventor's intensive studies, it has been found that when the radiation ports 130 are arranged on a straight line along the X direction D1, sidelobes of radio waves radiated from the antenna apparatus tend to increase.

Figure 10:
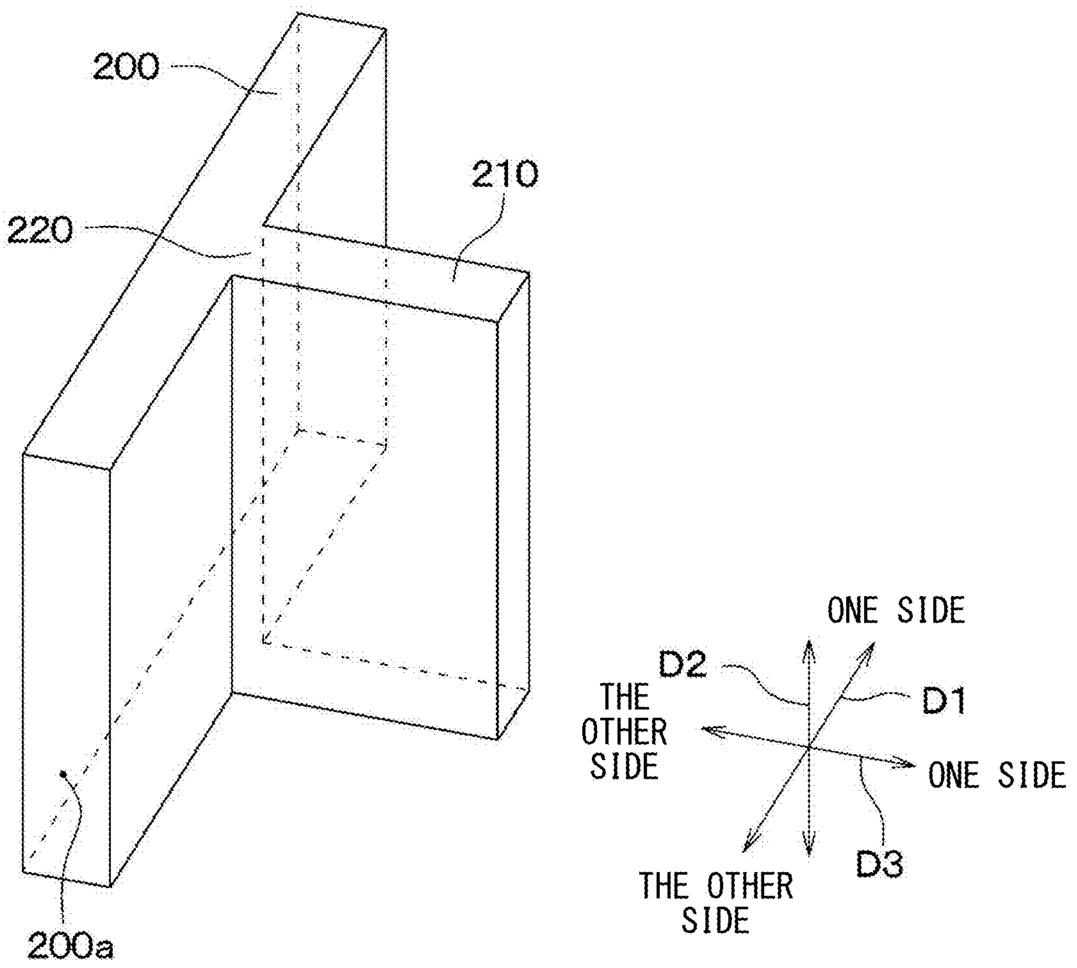
FIG. 10 is a schematic diagram illustrating a distribution waveguide that distributes radio waves to be propagated to the waveguides.

Here, the inventor verified a change in phase when a supply section 210 for supplying energy is connected to one side in the Y direction D2 in a distribution waveguide 200 extending in the X direction D1 illustrated in FIG. 10 and the radio waves are distributed into two in the distribution waveguide 200. The distribution waveguide 200 is formed to have a dimension in the Z direction D3 larger than the dimension in the Y direction D2 and includes a supply port 220 to which the supply section 210 is connected and a distribution path 200*a* that propagates radio waves therein. The supply section 210 extending in the Y direction D2 is connected to the distribution path 200*a*. In this verification, radio waves are propagated with the propagation mode set to the TE10 mode, similar to when radio waves are propagated in the hollow waveguide 100.

As described above, in the distribution waveguide 200 extending in the X direction D1, when energy is supplied from one side in the Y direction D2 to propagate radio waves, the radio waves propagated to the distribution path 200*a* are distributed to one side and the other side in the X direction D1 at the supply port 220. One of the radio waves distributed in the distribution path 200*a* is propagated to one side in the X direction D1, and the other is propagated to the other side in the X direction D1.

Figure 11:
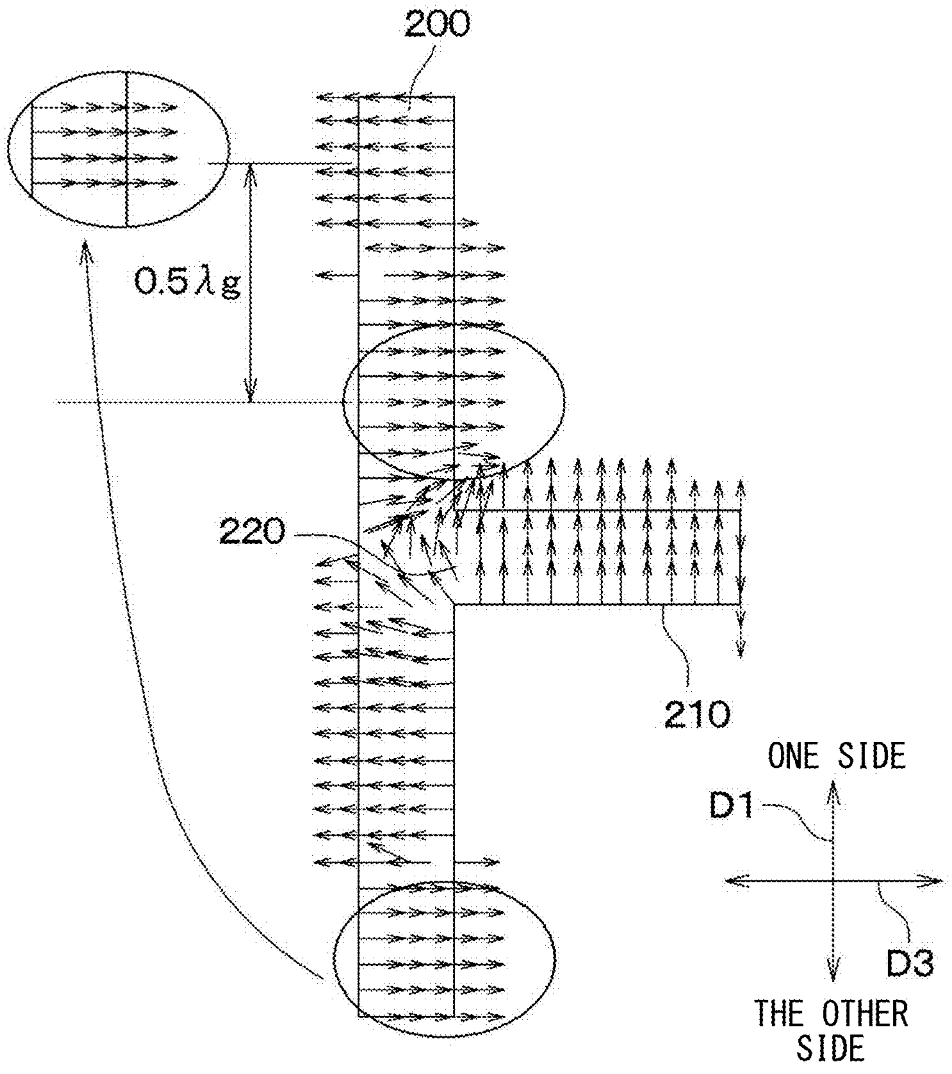
FIG. 11 is an explanatory view for explaining electric fields generated in the distribution waveguide.

According to the inventor's intensive studies, when energy is supplied to the distribution path 200*a* from the Y direction D2, the direction of the electric field generated in a portion on each of the one side and the other side in the X direction D1, separated by the same distance from the portion connected to the supply port 220, becomes opposite, as indicated by arrows in FIG. 11. Therefore, the radio waves, distributed in the distribution path 200*a* and propagated by the same distance to one side and the other side in the X direction D1, respectively, have opposite phases.

The direction of the electric field generated in a portion slightly separated from the portion connected to the supply port 220 on one side in the X direction D1 becomes the same as the direction of the electric field generated in a portion separated by half the size of the in-guide wavelength $\lambda_g$ from the portion connected to the supply port 220 on the other side in the X direction D1. Therefore, among the radio waves distributed in the distribution path 200*a*, the phase of the radio wave propagated to the portion slightly separated on one side in the X direction D1 becomes the same as the phase of the radio wave propagated to the portion separated by half the size of the in-guide wavelength $\lambda_g$ on the other side in the X direction D1.

Therefore, by forming the configuration in which energy is supplied to the distribution waveguide 200 from one side in the Y direction D2, the spacing between the two aperture sections that radiate radio waves can be set to half the length of the in-guide wavelength $\lambda_g$. However, if three or more aperture sections for radiating radio waves are arranged along the X direction D1 in the distribution waveguide 200 extending in the X direction D1, the dimension in the X direction D1 increases, making it difficult to reduce the dimension of the antenna apparatus in the X direction D1.

Therefore, the inventor has considered that in the antenna device 1 of the present embodiment, the respective dimensions of the antenna device 1 in the X direction D1 and the Y direction D2 are reduced by forming the waveguide that propagates the radio waves into a folded U shape. Specifically, a configuration has been considered in which the waveguide is formed in a 180° folded-back shape using the first waveguide section 20, the second waveguide section 30, and the distribution section 40, with the first radiation aperture section 50 disposed in the first waveguide section 20 and the second radiation aperture section 60 disposed in the second waveguide section 30. It has been considered that the phases of the radio waves radiated from the first radiation aperture section 50 and the second radiation aperture section 60 are made the same by setting the aperture pitch PT between the first radiation aperture section 50 and the second radiation aperture section 60 to half the size of the in-guide wavelength $\lambda_g$.

However, in order for the phases of the radio waves radiated in such a shape to be made the same, as illustrated in FIG. 11, it is necessary to that the direction of the magnetic field generated in the first radiation aperture section 50 be made opposite to the direction of the magnetic field in the portion overlapping the first radiation aperture section 50 and the guide width direction Dcr in the second waveguide section 30. In other words, it is necessary that the phase of the radio wave propagated through the first waveguide path 20*a* up to the first radiation aperture section 50 be made opposite to the phase of the radio wave propagated through the second waveguide path 30*a* up to a portion overlapping the first radiation aperture section 50 in the guide width direction Dcr.

Therefore, in the antenna device 1 of the present embodiment, the phases of the radio waves propagated to the respective portions of the first waveguide section 20 and the second waveguide section 30 overlapping in the guide width direction Dcr can be made opposite to each other by the distribution section 40. Specifically, the distribution section 40 of the present embodiment can invert the phase of the radio wave propagated from the feeding aperture 411 to the second connection 31 relative to the phase of the radio wave propagated from the feeding aperture 411 to the first connection 21.

Figure 12:
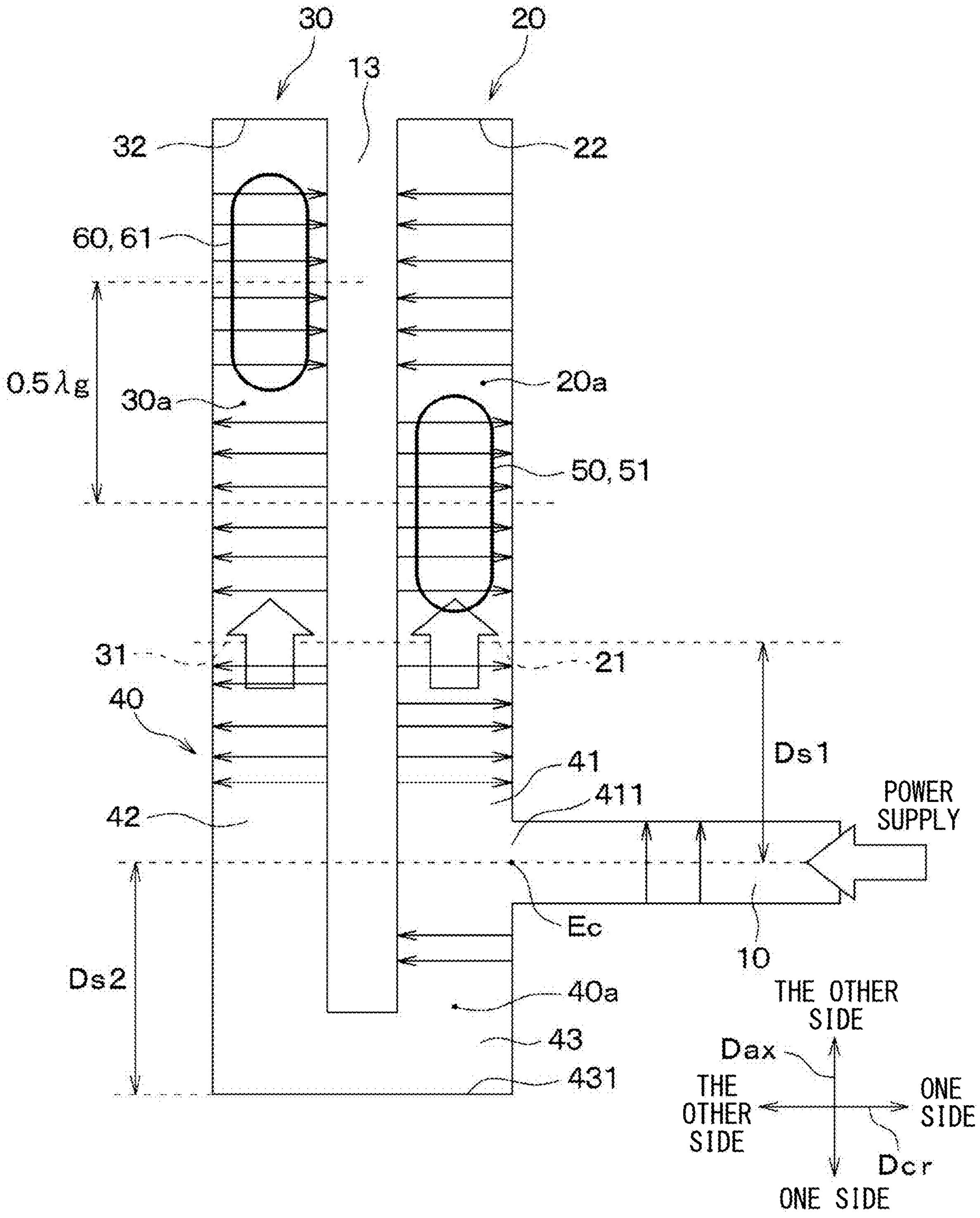
FIG. 12 is a diagram schematically illustrating the antenna device according to the first embodiment.

The configuration of the distribution section 40 for inverting the phase of the radio wave propagated to the first connection 21 and the phase of the radio wave propagated to the second connection 31 will be described with reference to FIG. 12. FIG. 12 is a diagram schematically illustrating the antenna device 1 as a diagram for explaining the configuration of the distribution section 40 for inverting the phase of the radio wave propagated to the first connection 21 and the phase of the radio wave propagated to the second connection 31. In FIG. 12, the direction of the electric field generated in each of the feeding path 10*a*, the first waveguide path 20a, the second waveguide path 30a, and the distribution waveguide 40a is indicated by an arrow. In the present embodiment, as illustrated in FIG. 12, energy is supplied so that an electric field is generated from one side to the other side in the guide axis direction Dax in the feeding path 10a.

When the center of the feeding aperture 411 in the guide axis direction Dax is defined as a power reception center Ec, as illustrated in FIG. 12, the distance in the guide axis direction Dax from the power reception center Ec to the first connection 21 is defined as a first distance Ds1. In addition, the distance from the power reception center Ec to the distribution end wall 431 in the guide axis direction Dax is defined as a second distance Ds2. The first distance Ds1 is the distance in the guide axis direction Dax from the end of the distribution section 40 on the other side in the guide axis direction Dax to the power reception center Ec. The second distance Ds2 is the distance in the guide axis direction Dax from the end of the distribution section 40 on one side in the guide axis direction Dax to the power reception center Ec.

The first distance Ds1 of the present embodiment is set so that when radio waves are propagated from the feeding section 10 to the first distribution section 41, an electric field in the portion of the first waveguide section 20 facing the first radiation aperture section 50 is in a direction from the other side to one side in the guide width direction Dcr.

The second distance Ds2 of the present embodiment is set so that when radio waves are propagated to the first distribution section 41, the direction of the electric field generated in a predetermined portion of the second distribution section 42 is opposite to the direction of the electric field generated in the portion of the first distribution section 41 overlapping the predetermined portion in the guide axis direction Dax. For example, the second distance Ds2 is set so that an electric field generated in a portion overlapping the power reception center Ec of the first distribution section 41 in the guide axis direction Dax and an electric field generated in a portion overlapping the power reception center Ec of the second distribution section 42 in the guide axis direction Dax are in opposite directions.

That is, the second distance Ds2 is set so that the phase of the radio wave propagated to the predetermined portion of the second distribution section 42 is opposite to the phase of the radio wave propagated to the portion of the first distribution section 41 overlapping the predetermined portion in the guide axis direction Dax. For example, the second distance Ds2 is set so that the phase of the radio wave propagated to the portion overlapping the power reception center Ec of the second distribution section 42 in the guide axis direction Dax is inverted relative to the phase of the radio wave when propagated from the first feeding section 11 to the first distribution section 41. In other words, in the distribution section 40, the first distance Ds1 and the second distance Ds2 are set so that the phase of the radio wave propagating to the first connection 21 of the first waveguide section 20 is opposite to the phase of the radio wave propagating to the second connection 31 of the second waveguide section 30.

For example, when the first distance Ds1 is set to any size within the range of 1/20 to 1/10 of the in-guide wavelength $\lambda_g$, the second distance Ds2 is set to any size within the range of 1/5 to 1/4 of the in-guide wavelength $\lambda_g$. However, the first distance Ds1 and the second distance Ds2 are examples, and the present disclosure is not limited thereto.

By setting the first distance Ds1 and the second distance Ds2 in this manner, as illustrated in FIG. 12, the direction of the electric field in the first connection 21 can be made opposite to the direction of the electric field in the second connection 31. The direction of the phase of the radio wave propagated to the first connection 21 can then be opposite to the direction of the phase of the radio wave propagated to the second connection 31.

Thus, the directions of the electric fields of the portions of the first waveguide section 20 and the second waveguide section 30 overlapping each other in the guide width direction Dcr can be made opposite to each other. Therefore, the direction of the electric field in the portion of the first waveguide section 20 facing the first radiation aperture section 50 can be opposite to the direction of the electric field in the portion of the second waveguide section 30 overlapping the first radiation aperture section 50 in the guide width direction Dcr. This is because, as described above, the first waveguide section 20, the second waveguide section 30, and the distribution section 40 have cross sections of equal shape, orthogonal to the propagating direction of the radio waves.

Therefore, the directions of the phases of the radio waves propagated to the portions of the first waveguide section 20 and the second waveguide section 30 overlapping each other in the guide width direction Dcr can be opposite to each other. The phase of the radio wave propagated to the portion facing the first radiation aperture section 50 in the first waveguide section 20 can be made the same as the phase of the radio wave propagated to the portion facing the second radiation aperture section 60, which is separated from the portion by half the in-guide wavelength $\lambda_g$ in the guide axis direction Dax. Therefore, the phases of the radio waves radiated from the first radiation aperture section 50 and the second radiation aperture section 60 can be made the same. The radio waves radiated by the antenna device 1 can be amplified to improve the magnitude of the gain.

Figure 13:
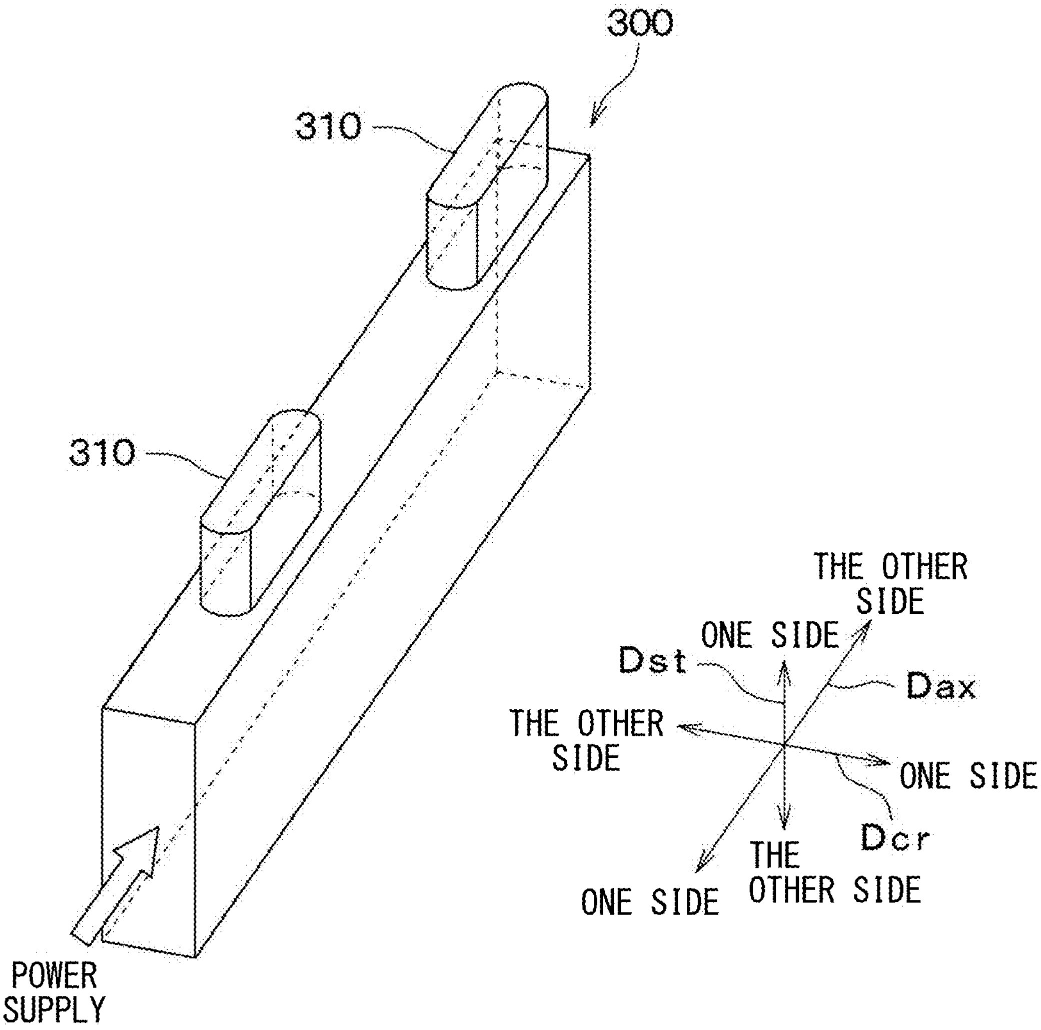
FIG. 13 is a perspective view of a comparative waveguide of an antenna device of a comparative example.
Figure 14:
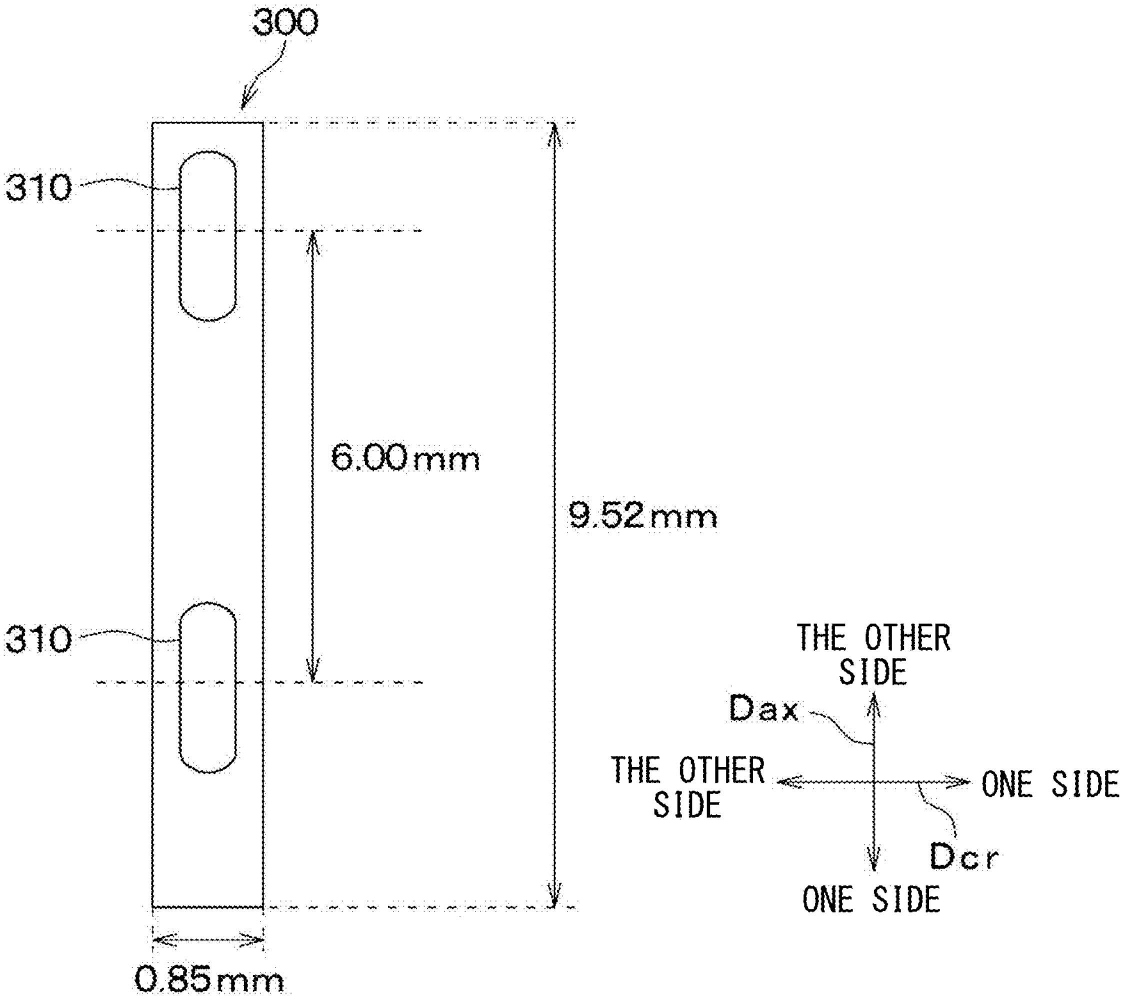
FIG. 14 is a plan view of the comparative waveguide of the antenna device of the comparative example.

Next, the difference between the antenna device 1 of the present embodiment and an antenna device of a comparative example, which is compared to the antenna device 1 of the present embodiment, will be described with reference to FIGS. 13 to 16. FIGS. 13 and 14 illustrate the shape and dimensions of a comparative waveguide 300 in the antenna device of the comparative example. In addition, a result of a computer simulation comparing the gain of the antenna device 1 of the present embodiment with the gain of the antenna device of the comparative example will be described with reference to FIGS. 15 and 16.

As illustrated in FIGS. 13 and 14, the comparative waveguide 300 has a shape along the guide axis direction Dax without a configuration corresponding to the distribution section 40, and two comparative radiation aperture sections 310 are formed along the guide axis direction Dax. In order for the phases of the radio waves radiated from the two comparative radiation aperture sections 310 to be made the same, the spacing between the two comparative radiation aperture sections 310 in the guide axis direction Dax is set to the size of the in-guide wavelength $\lambda_g$. That is, the spacing is set to a size of 6.0 mm, which is twice the size of the aperture pitch PT of 3.0 mm in the antenna device 1 of the present embodiment.

The comparative radiation aperture section 310 is not inclined relative to the direction along the stacking direction Dst. The comparative waveguide 300 has a dimension of 9.52 mm in the guide axis direction Dax and a dimension of 0.85 mm in the guide width direction Dcr. Except for these, the antenna device of the comparative example and the antenna device 1 of the present embodiment are similar in structure to each other. As described above, when the two comparative radiation aperture sections 310 are arranged in the comparative waveguide 300 along the guide axis direction Dax, the dimension in the guide axis direction Dax is larger than the axial dimension Dx of the present embodiment.

Figure 15:
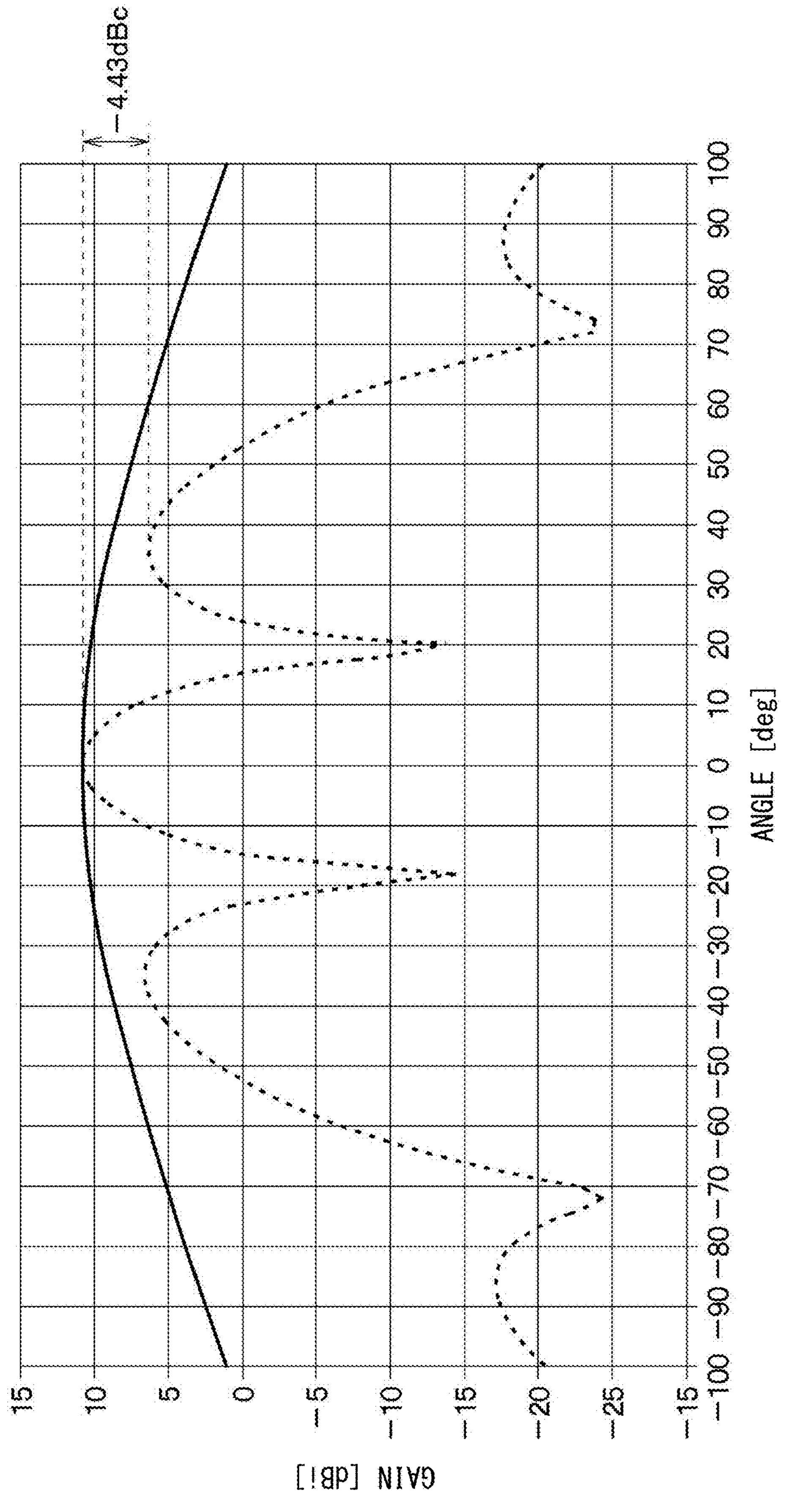
FIG. 15 is a diagram illustrating distributions of gains in an antenna device of a comparative example.
Figure 16:
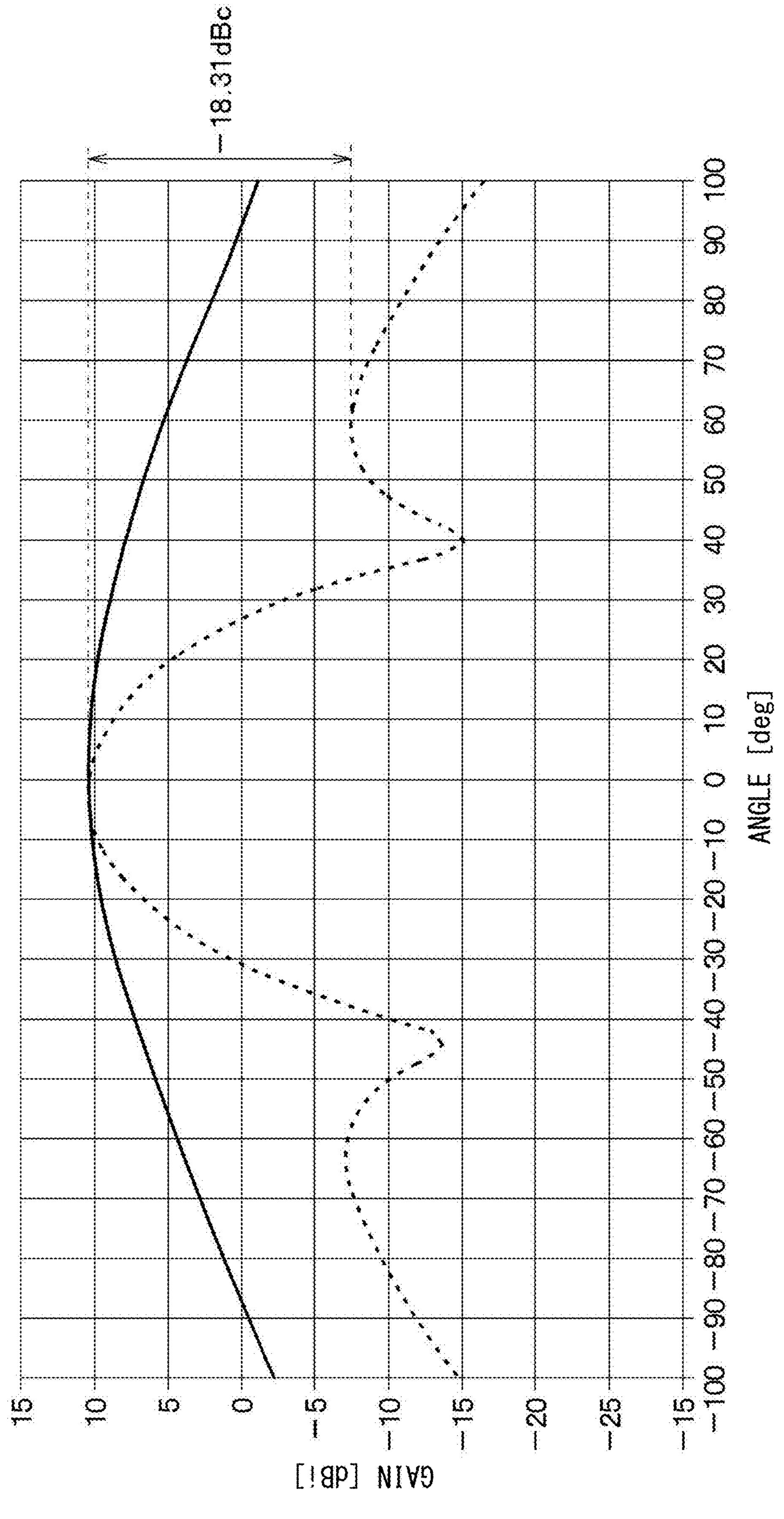
FIG. 16 is a diagram illustrating distributions of gains in the antenna device of the first embodiment.

In addition, the results illustrated in FIGS. 15 and 16 were obtained by the computer simulation comparing the antenna device 1 of the present embodiment with the antenna device of the comparative example. FIG. 15 is a graph illustrating distributions of gains in the antenna device of the comparative example, and FIG. 16 is a graph illustrating distribution of gains in the antenna device 1 of the present embodiment.

The solid line illustrated in each of FIGS. 15 and 16 represents a gain distribution on a plane perpendicular to the guide axis direction Dax, and the broken line illustrated in each of FIGS. 15 and 16 represents a gain distribution on a plane perpendicular to the guide width direction Dcr. FIGS. 15 and 16 illustrate gain distributions obtained when radio waves with a frequency of 76.5 GHz are input to the antenna device 1 and the antenna device of the comparative example.

As illustrated in FIGS. 15 and 16, the maximum value of the gain obtained from the antenna device of the comparative example and the maximum value of the gain obtained from the antenna device 1 were substantially the same magnitude. Specifically, the maximum value of the gain obtained from the antenna device of the comparative example was 10.32 dBi. Meanwhile, the maximum value of the gain obtained from the antenna device 1 of the present embodiment was 10.31 dBi. As described above, the difference between the maximum value of the gain obtained from the antenna device of the comparative example and the maximum value of the gain obtained from the antenna device 1 was 0.01 dBi.

However, as illustrated in FIGS. 15 and 16, the antenna device 1 of the present embodiment was able to suppress sidelobes compared to the antenna device of the comparative example. This enabled the difference between the main lobe and the sidelobes in the antenna device 1 of the present embodiment to be significantly deviated from the difference between the main lobe and the sidelobes in the antenna device of the comparative example.

Specifically, the difference between the maximum value of the main lobe and the maximum value of the sidelobes in the antenna device of the comparative example was 4.43 dBc, and the difference between these values was relatively small. In contrast, the difference between the maximum value of the main lobe and the maximum value of the sidelobes in the antenna device 1 of the present embodiment was 18.31 dBc, and the difference between these values was relatively large. The antenna device 1 was able to improve the difference between the maximum value of the main lobe and the maximum value of the sidelobes by 13.88 dBc compared to the antenna device of the comparative example.

When the antenna device 1 is used for object detection, if the difference between the maximum value of the main lobe and the maximum value of the sidelobes is small, a detection error caused by detection of the sidelobes occurs. Therefore, in general, the greater the difference between the maximum value of the main lobe and the maximum value of the sidelobes, the greater the desirability. For example, the difference between the maximum value of the main lobe and the maximum value of the sidelobes is desirably 17 dBc or more. In the antenna device 1 of the present embodiment, the difference between the maximum value of the main lobe and the maximum value of the sidelobes can be set to 18.31 dBc. Therefore, when the antenna device 1 is used for object detection, a detection error caused by detection of the sidelobes can be reduced.

As described above, in the antenna device 1 of the present embodiment, the first waveguide section 20 extends in the guide axis direction Dax and includes the first connection 21, connected to the distribution section 40, on one side in the guide axis direction Dax. The second waveguide section 30 extends in the guide axis direction Dax and includes the second connection 31, connected to the distribution section 40, on one side in the guide axis direction Dax. The positions of the first connection 21 and the second connection 31 in the guide axis direction Dax overlap. The first radiation aperture section 50 and the second radiation aperture section 60 are disposed at positions in the guide axis direction Dax shifted from each other. The distribution section 40 includes the feeding aperture 411 in the guide width direction Dcr, and is formed by being folded back from one side to the other side in the guide axis direction Dax to be able to propagate radio waves to the first connection 21 of the first waveguide section 20 and the second connection 31 of the second waveguide section 30 adjacent to each other via the partition wall section 13. The distribution section 40 makes the phases of the radio waves, propagating to the first connection 21 and the second connection 31, opposite to each other.

According to this, the phase of the radio wave propagated to the portion of the first waveguide section 20 facing the first radiation aperture section 50 can be made the same as the phase of the radio wave propagated to the portion of the second waveguide section 30 facing the second radiation aperture section 60, which is separated from the first radiation aperture section 50 by half the in-guide wavelength $\lambda_g$. Therefore, the phases of the radio waves radiated from the first radiation aperture section 50 and the second radiation aperture section 60 can be made the same. The radio waves radiated by the antenna device 1 can be amplified to improve the magnitude of the gain.

The axial dimension Dx can be reduced compared to the configuration in which in a single waveguide, such as the hollow waveguide 100 and the comparative waveguide 300 described above, parts that radiate radio waves are arranged along the extending direction of the waveguide. For example, compared to the configuration in which two radiation ports 130 are arranged in the narrow wall section 120 of the hollow waveguide 100, the axial dimension Dx can be reduced by forming the configuration that includes the first waveguide section 20, the second waveguide path 30*a*, and the distribution section 40.

Further, compared to the configuration in which three radiation ports 130 are arranged in the wide wall section 110 of the hollow waveguide 100, the widthwise dimension Dr can be reduced by forming the configuration in which the waveguide that propagates the radio waves includes the first waveguide section 20, the second waveguide path 30*a*, and the distribution section 40. Even a combined dimension of the widthwise dimension Dr and the dimension of the feeding section 10 in the guide width direction Dcr can be made smaller than the dimension of the hollow waveguide 100 in the guide width direction Dcr, where the radiation ports 130 are arranged in the wide wall section 110. Compared to the configuration in which two comparative radiation aperture sections 310 are arranged in the comparative waveguide 300, the axial dimension Dx can be reduced by forming the configuration in which the waveguide that propagates radio waves includes the first waveguide section 20, the second waveguide path 30*a*, and the distribution section 40.

Moreover, compared to the antenna device of the comparative example described above, the antenna device 1 of the present embodiment can suppress sidelobes and can improve the difference between the maximum value of the main lobe and the maximum value of the sidelobes. Therefore, compared to the configuration in which parts that radiate radio waves are arranged in a single waveguide along the extending direction of the waveguide, it is possible to suppress sidelobes of radio waves while minimizing an increase in the size of the antenna device 1.

According to the above embodiment, the following effects can be obtained.

(1) In the above embodiment, the first waveguide section 20 includes the one-side first narrow wall surface 25 and the other-side first narrow wall surface 26 extending in the guide axis direction Dax and the guide width direction Dcr, and the one-side first wide wall surface 23 and the other-side first wide wall surface 24 extending in the guide axis direction Dax and the stacking direction Dst. The second waveguide section 30 includes the one-side second narrow wall surface 35 and the other-side second narrow wall surface 36 extending in the guide axis direction Dax and the guide width direction Dcr, and the one-side second wide wall surface 33 and the other-side second wide wall surface 34 extending in the guide axis direction Dax and the stacking direction Dst. The sizes of the one-side first narrow wall surface 25 and the other-side first narrow wall surface 26 in the guide width direction Dor are smaller than the sizes of the one-side first wide wall surface 23 and the other-side first wide wall surface 24 in the stacking direction Dst. The sizes of the one-side second narrow wall surface 35 and the other-side second narrow wall surface 36 in the guide width direction Dor are smaller than the sizes of the one-side second wide wall surface 33 and the other-side second wide wall surface 34 in the stacking direction Dst. The first radiation aperture section 50 is disposed on the one-side first narrow wall surface 25 of the first waveguide section 20. The second radiation aperture section 60 is disposed on the one-side second narrow wall surface 35 of the second waveguide section 30.

According to this, the widthwise dimension Dr can be made smaller than when the first radiation aperture section 50 is disposed on one-side first wide wall surface 23 of the first waveguide section 20 and the second radiation aperture section 60 is disposed on the other-side second wide wall surface 34 of the second waveguide section 30.

(2) In the above embodiment, in the distribution section 40, the first distance Ds1 and the second distance Ds2 are set so that the phases of the respective radio waves propagating to the first connection 21 of the first waveguide section 20 and the second connection 31 of the second waveguide section 30 are opposite to each other.

According to this, by adjusting the dimensions of the first distance Ds1 and the second distance Ds2, the phases of the radio waves propagating to the first connection 21 and the second connection 31 can be easily made opposite to each other.

(3) In the above embodiment, the first radiation aperture section 50 includes the first communication port 52 communicating with the first waveguide section 20 and the first radiation aperture 51 aperture opening toward the external space, and is formed as a through-hole with an inner diameter expanding from the first communication port 52 toward the first radiation aperture 51. The second radiation aperture section 60 includes a second communication port 62 communicating with the second waveguide section 30 and a second radiation aperture 61 opening toward the external space, and is formed as a through-hole with an inner diameter expanding from the second communication port 62 toward the second radiation aperture 61.

According to this, the gain of the antenna device 1 can be made larger than when the first radiation aperture section 50 and the second radiation aperture section 60 are through-holes each having a constant inner diameter.

(4) In the above embodiment, the antenna device 1 includes the feeding section 10 connected to the feeding aperture 411 and forming the feeding path 10*a* that forms the propagation path for propagating the radio waves to the distribution waveguide 40*a*. The feeding section 10 is partially bent relative to the guide width direction Dcr.

According to this, even when there is a small space for disposing the feeding section 10 around the first waveguide section 20, the feeding section 10 can be easily connected to the first waveguide section 20 by bending the feeding section 10.

(First Modification of First Embodiment)

In the first embodiment, the first radiation aperture section 50 is a through-hole with an inner diameter expanding from the first communication port 52 toward the first radiation aperture 51, and has a cross section orthogonal to the stacking direction Dst, formed in an oval shape extending in the guide axis direction Dax. In the first embodiment, the second radiation aperture section 60 is a through-hole with an inner diameter expanding from the second communication port 62 toward the second radiation aperture 61, and has a cross section orthogonal to the stacking direction Dst, formed in an oval shape extending in the guide axis direction Dax. However, the shapes of first radiation aperture section 50 and second radiation aperture section 60 are not limited thereto.

Figure 17:
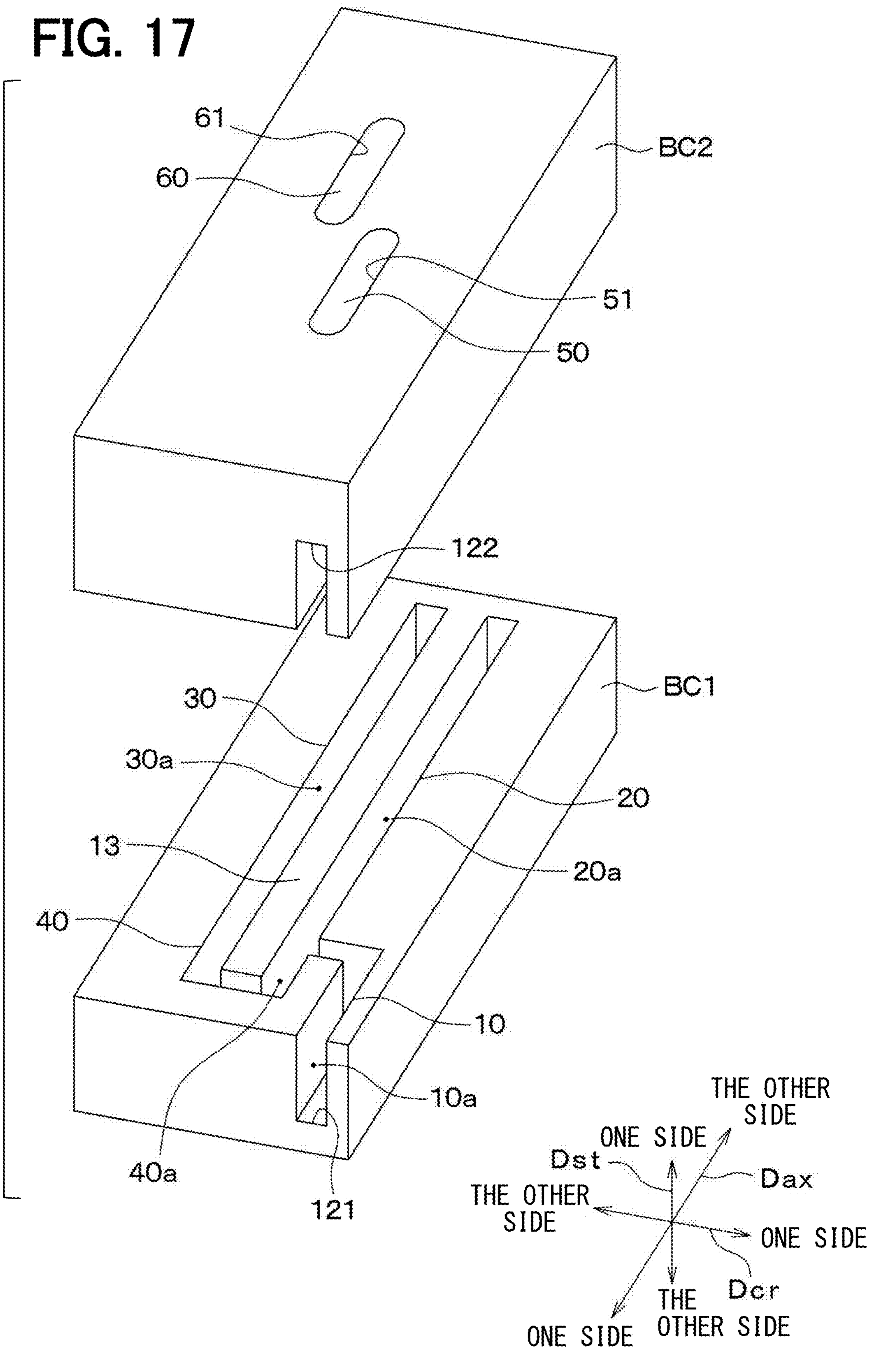
FIG. 17 is a diagram of an antenna device according to a first modification of the first embodiment, corresponding to FIG. 2.
Figure 18:
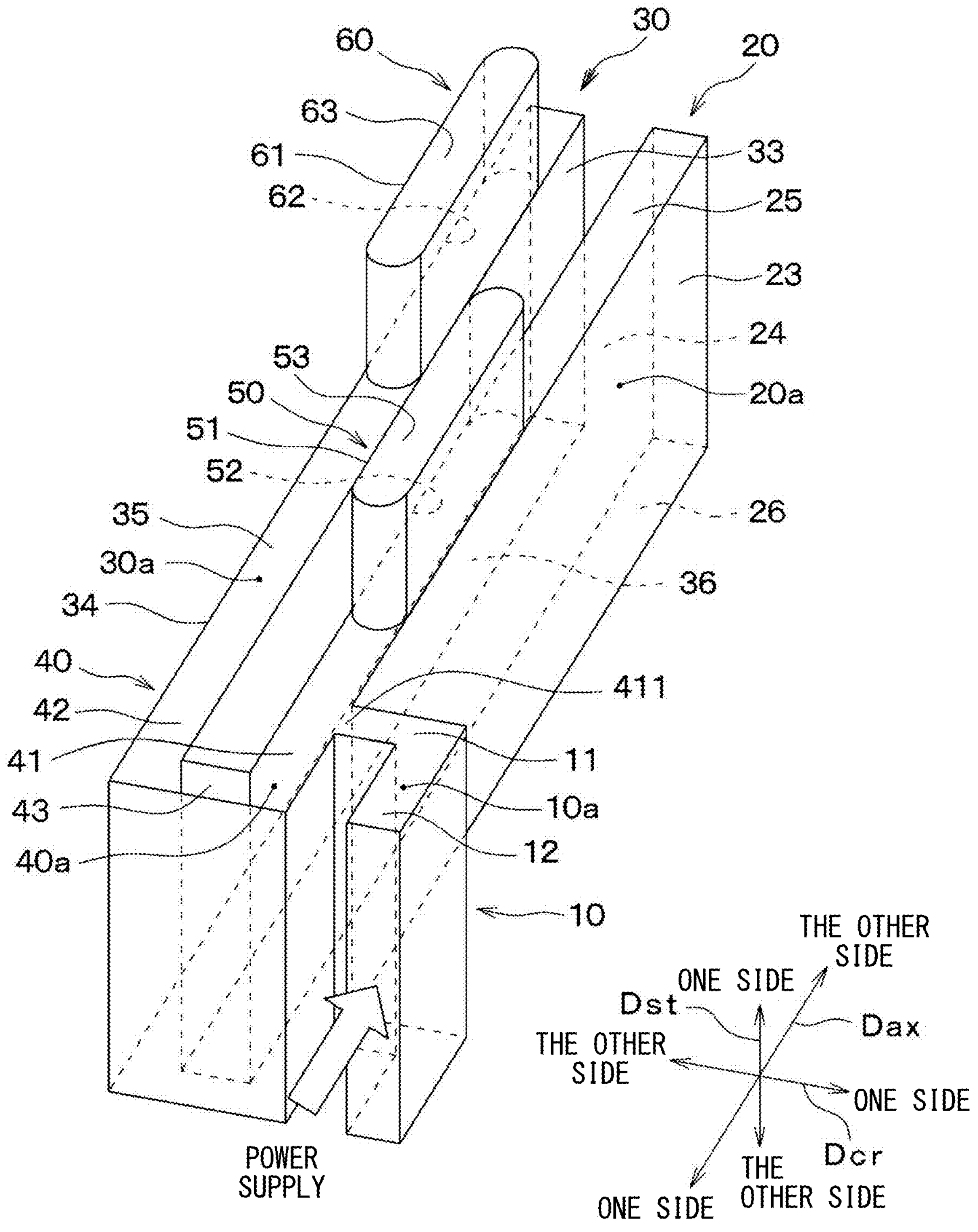
FIG. 18 is a diagram of the antenna device according to the first modification of the first embodiment, corresponding to FIG. 3.

For example, as illustrated in FIGS. 17 and 18, the first radiation aperture section 50 may be formed as a through-hole having a constant inner diameter from the first communication port 52 toward the first radiation aperture 51. The second radiation aperture section 60 may be formed as a through-hole having a constant inner diameter from the second communication port 62 toward the second radiation aperture 61.

Although not illustrated, each of the first radiation aperture section 50 and the second radiation aperture section 60 may have a cross section orthogonal to the stacking direction Dst, formed in a shape different from the oval shape, such as a perfect circular shape, an elliptical shape, a rectangular shape, or a rhombic shape.

(Second Modification of First Embodiment)

In the first embodiment, each of the first radiation aperture section 50, the second radiation aperture section 60, and the distribution section 40 has a cross section orthogonal to the propagating direction of radio waves, formed in a rectangular shape extending in the stacking direction Dst. However, the present disclosure is not limited thereto.

Figure 19:
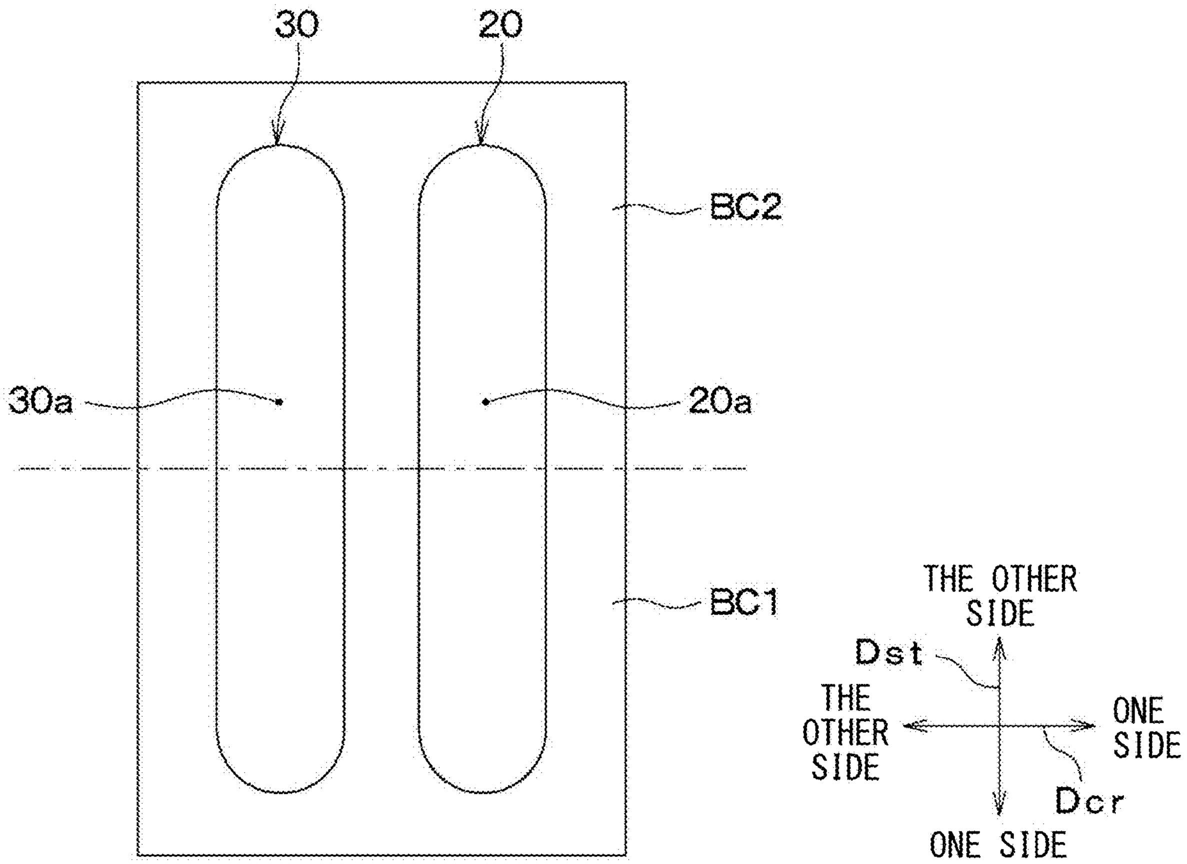
FIG. 19 is a diagram of an antenna device according to a second modification of the first embodiment, corresponding to FIG. 5.
Figure 20:
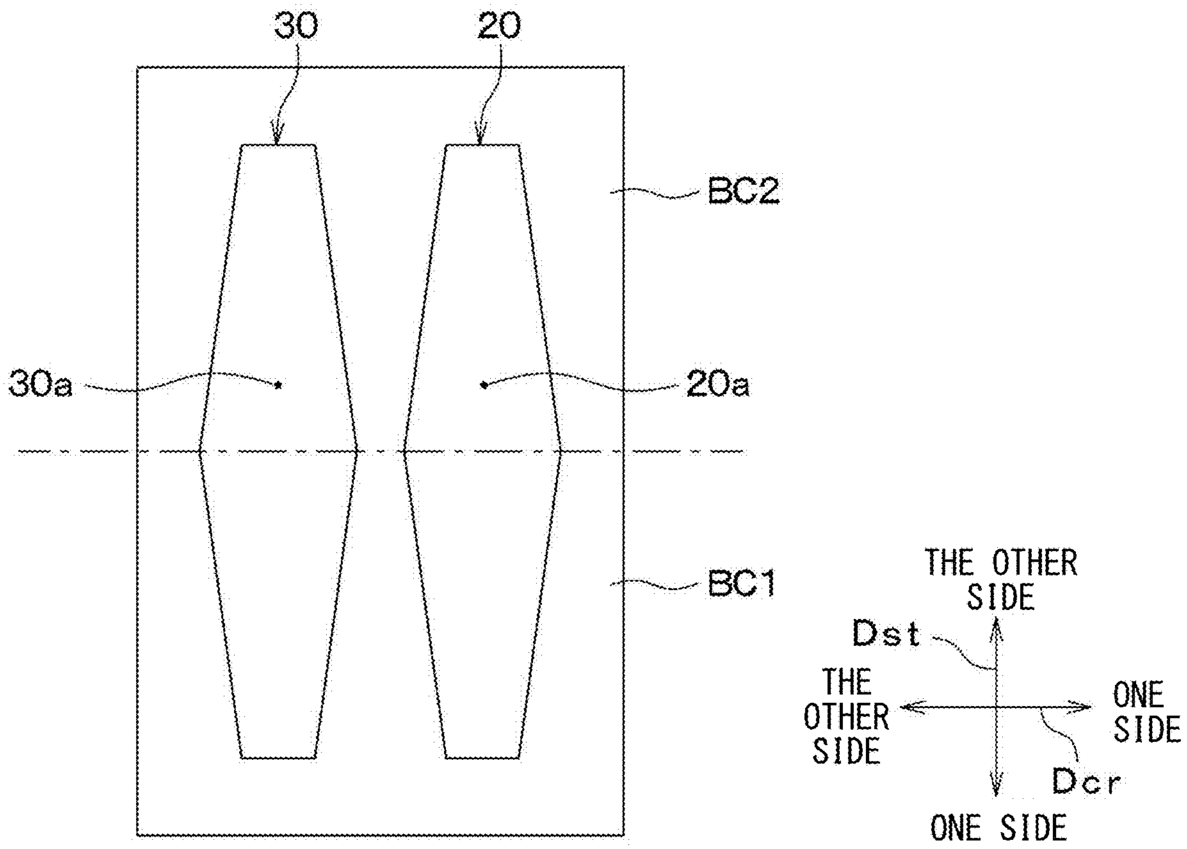
FIG. 20 is a diagram of the antenna device according to the second modification of the first embodiment, corresponding to FIG. 5.
Figure 21:
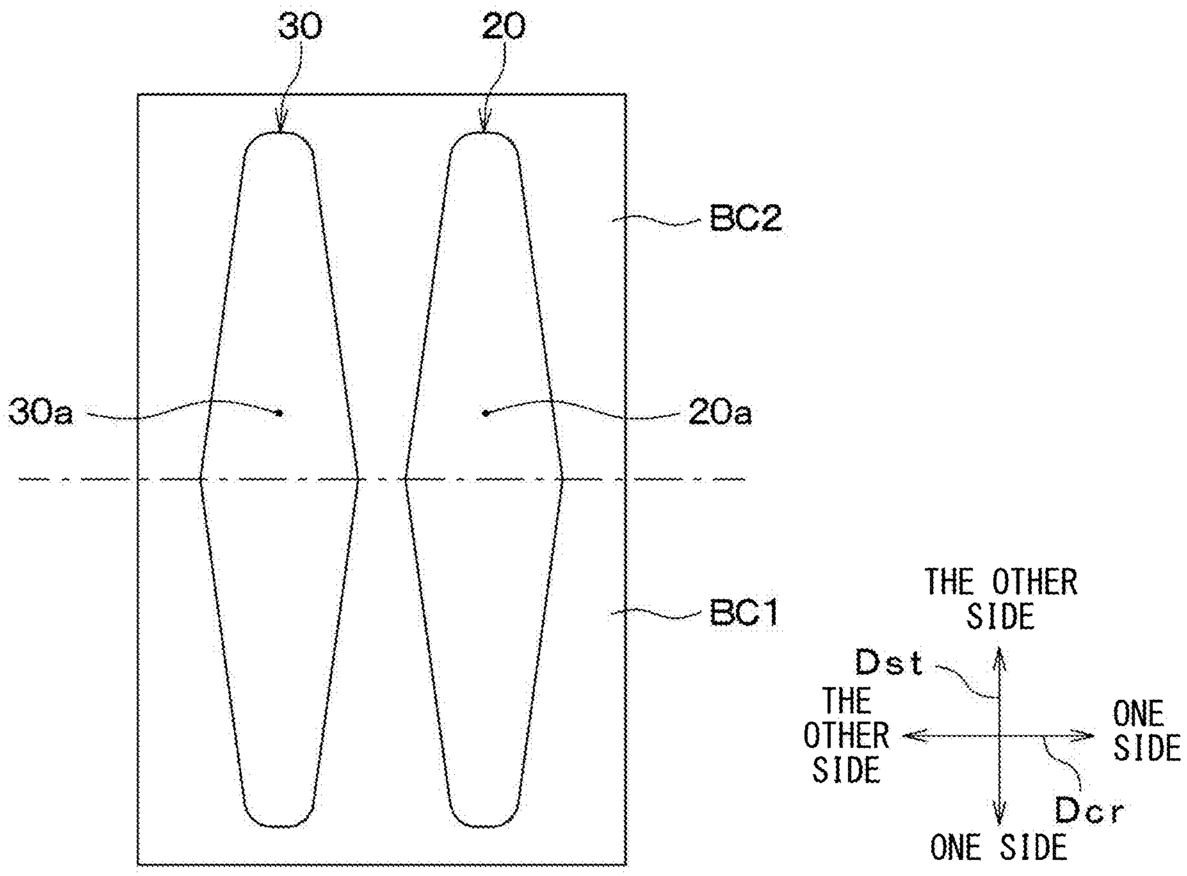
FIG. 21 is a diagram of the antenna device according to the second modification of the first embodiment, corresponding to FIG. 5.

For example, as illustrated in FIG. 19, the first waveguide section 20, the second waveguide section 30, and the distribution section 40 may have a cross section orthogonal to the propagating direction of the radio waves, formed in an oval shape extending in the stacking direction Dst. Alternatively, as illustrated in FIG. 20, each of the first waveguide section 20, the second waveguide section 30, and the distribution section 40 may have a cross section orthogonal to the propagating direction of the radio waves, formed in the shape of two coupled trapezoids each with a size in the guide width direction Dcr increasing toward the center in the stacking direction Dst. Alternatively, as illustrated in FIG. 21, each of the first waveguide section 20, the second waveguide section 30, and the distribution section 40 may have a cross section orthogonal to the propagating direction of the radio waves, formed in a shape with the size in the guide width direction Dcr continuously expanding toward the center in the stacking direction Dst. Each of the first waveguide section 20, the second waveguide section 30, and the distribution section 40 may have a cross section, orthogonal to the propagating direction of the radio waves, with one side and the other side in the stacking direction Dst formed in an arc shape.

In the embodiment described above, an example has been described in which the first distance Ds1 is set to any size within the range of 1/20 to 1/10 of the in-guide wavelength $\lambda_g$, and the second distance Ds2 is set to any size within the range of 1/5 to 1/4 of the in-guide wavelength $\lambda_g$. However, when each of the first waveguide section 20, the second waveguide section 30, and the distribution section 40 has a cross section, orthogonal to the propagating direction of the radio waves, in a shape different from the oval shape, the first distance Ds1 and the second distance Ds2 may be changed.

This is because, when the above cross-sectional shape is changed, the reflection direction of the radio waves when reflected in each of the first waveguide section 20, the second waveguide section 30, and the distribution section 40 changes from that in the oval-shaped cross section of each of the first waveguide section 20, the second waveguide section 30, and the distribution section 40 Therefore, the first distance Ds1 and the second distance Ds2 are appropriately set according to the shapes of the cross sections of the first waveguide section 20, the second waveguide section 30, and the distribution section 40 so that the phases of the respective radio waves propagating to the first connection 21 and the second connection 31 are opposite to each other.

(Third Modification of First Embodiment)

In the first embodiment, the distance from the feeding aperture 411 in the guide axis direction Dax is smaller in the first radiation aperture section 50 than in the second radiation aperture section 60, but the present disclosure is not limited thereto.

Figure 22:
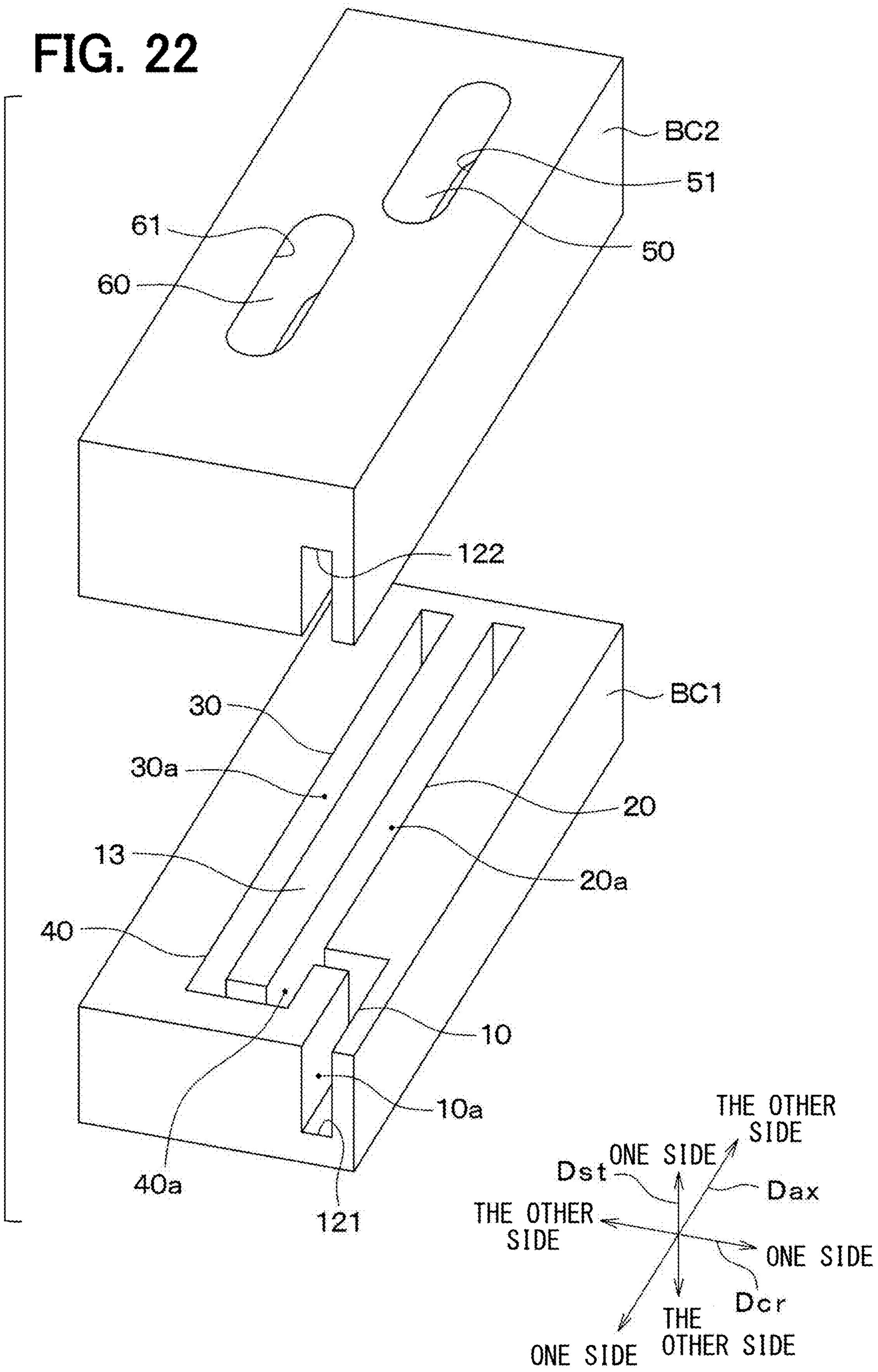
FIG. 22 is a diagram of an antenna device according to a third modification of the first embodiment, corresponding to FIG. 2.
Figure 23:
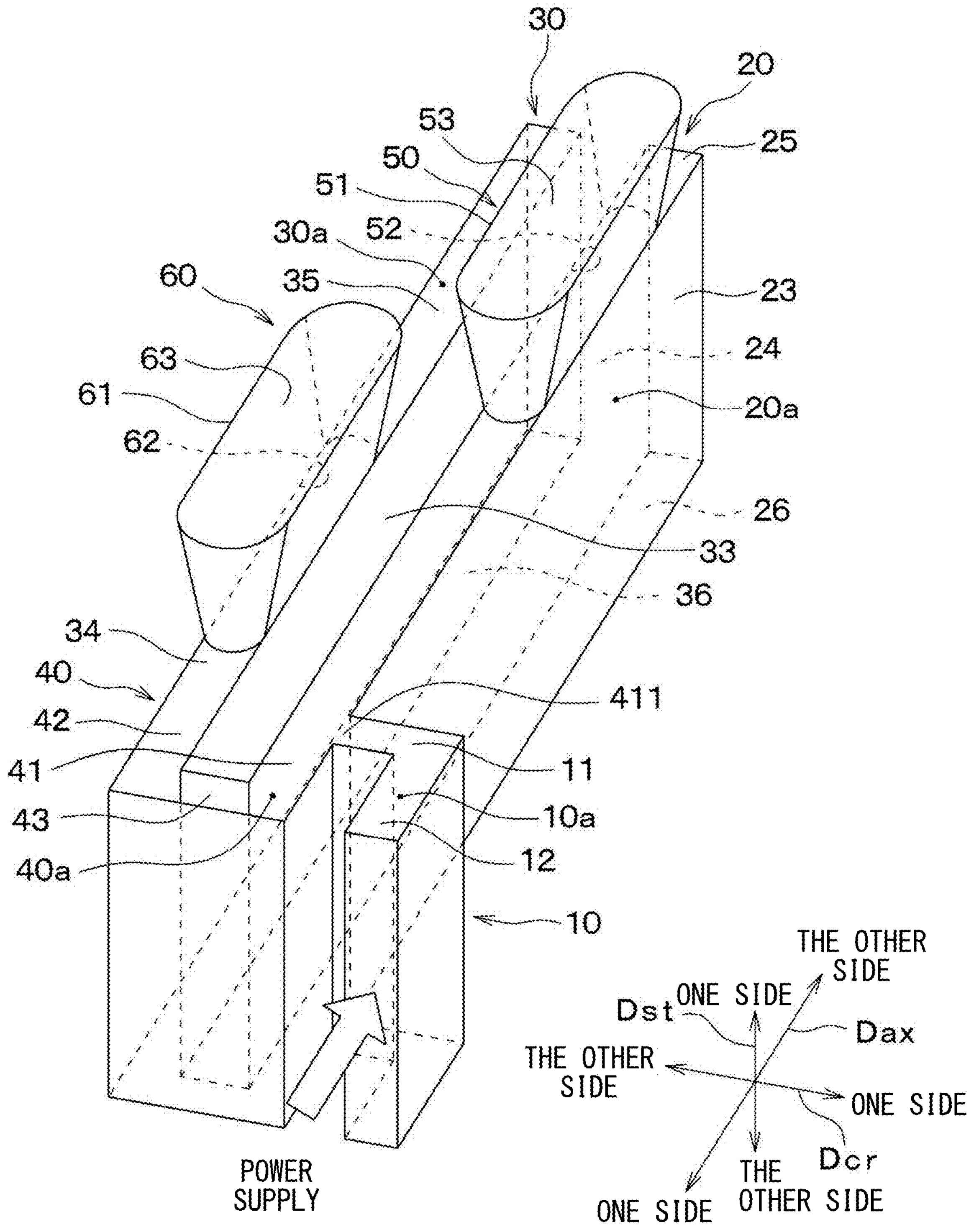
FIG. 23 is a diagram of the antenna device according to the third modification of the first embodiment, corresponding to FIG. 3.
Figure 24:
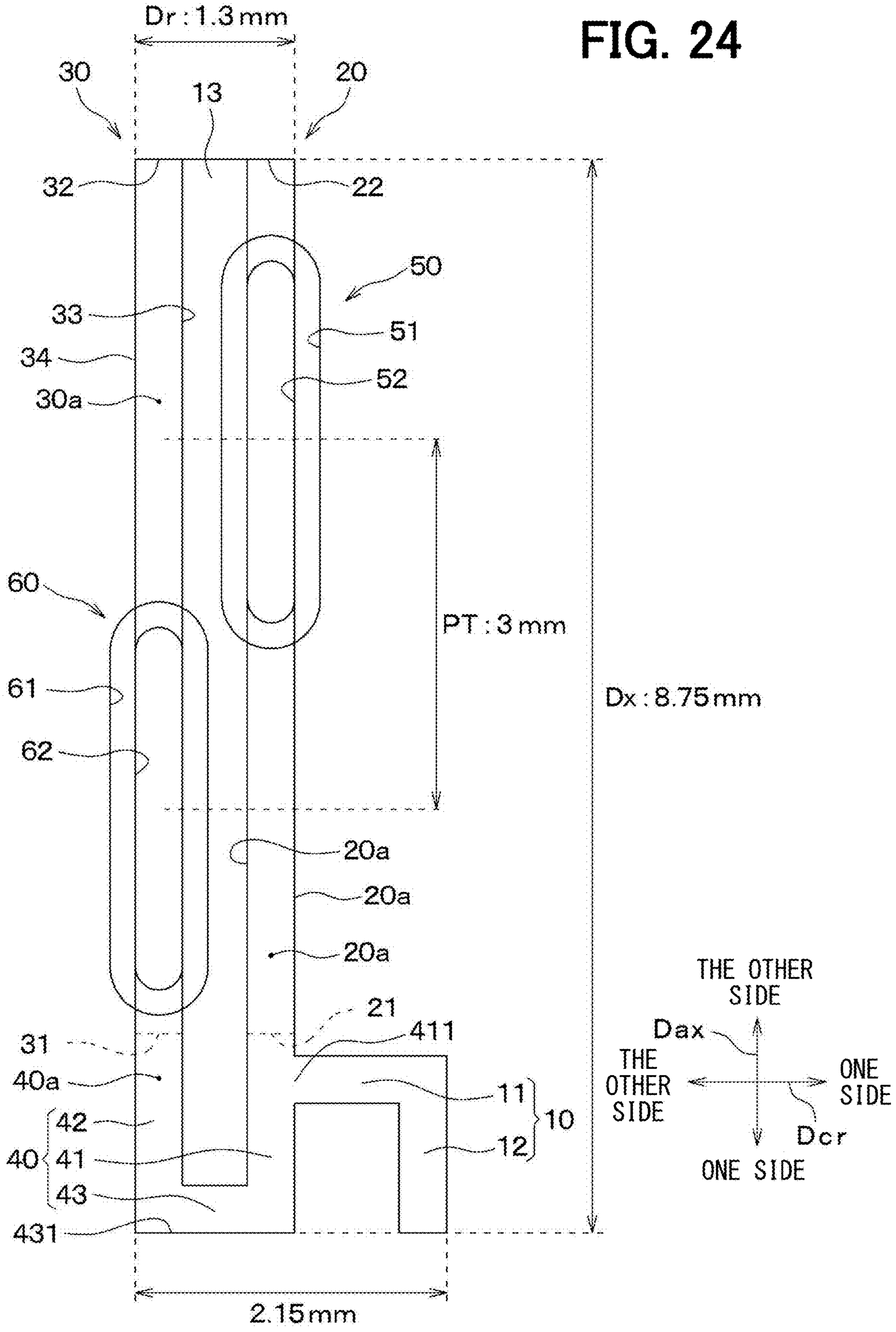
FIG. 24 is a diagram of the antenna device according to the third modification of the first embodiment, corresponding to FIG. 4.

For example, as illustrated in FIGS. 22 to 24, the distance from the feeding aperture 411 in the guide axis direction Dax may be smaller in the second radiation aperture section 60 than in the first radiation aperture section 50, and the second radiation aperture section 60 may be formed at a position closer to the feeding aperture 411 than the first radiation aperture section 50. In this case, the first distance Ds1 corresponds to the distance in the guide axis direction Dax from the power reception center Ec to the second connection 31.

(Fourth Modification of First Embodiment)

In the first embodiment, one first radiation aperture section 50 is connected to the first waveguide section 20, one second radiation aperture section 60 is connected to the second waveguide section 30, and the antenna device 1 includes two radiation aperture sections. However, the number of first radiation aperture sections 50 and the number of second radiation aperture sections 60 are not limited thereto.

Figure 25:
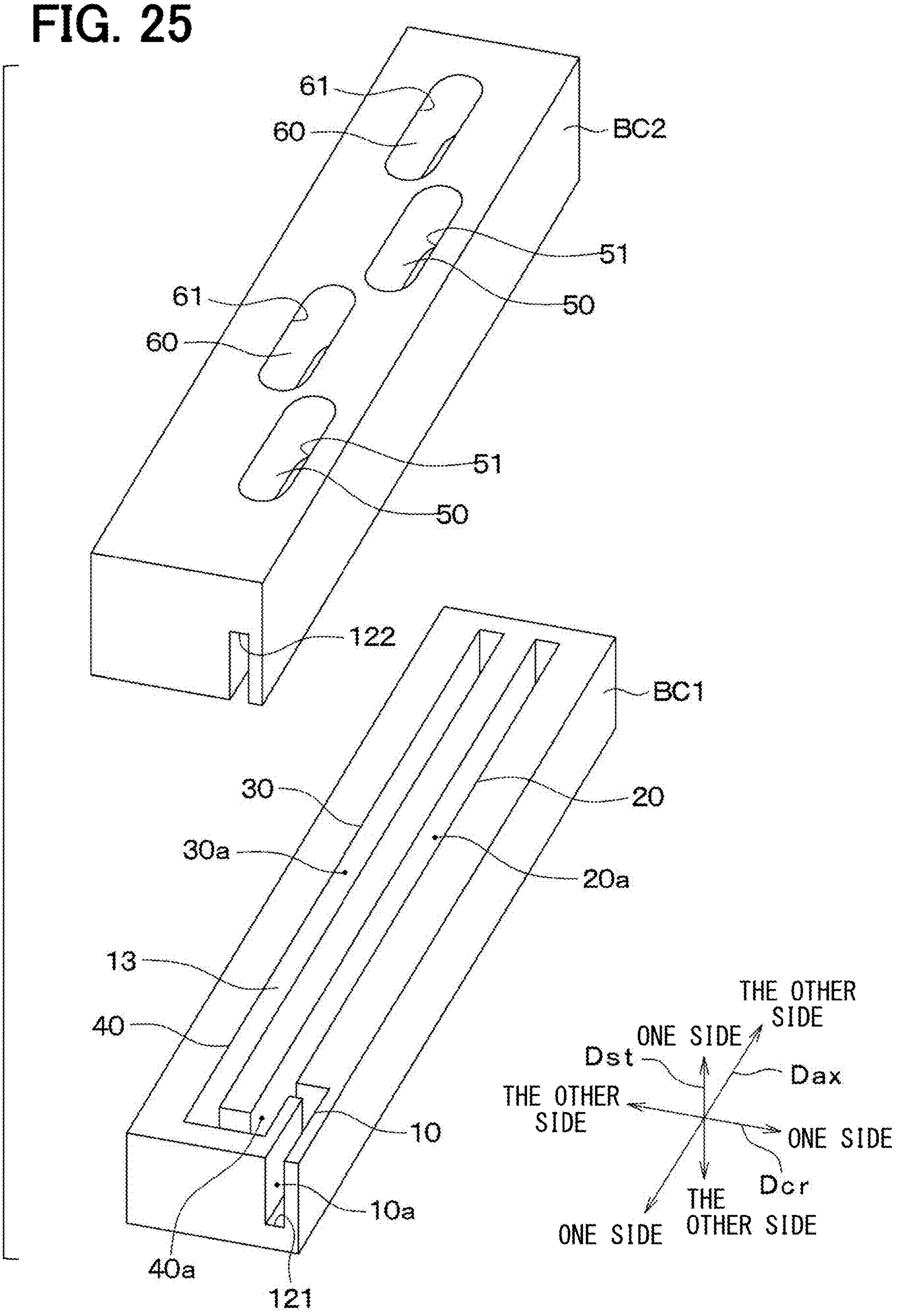
FIG. 25 is a diagram of an antenna device according to a fourth modification of the first embodiment, corresponding to FIG. 2.
Figure 26:
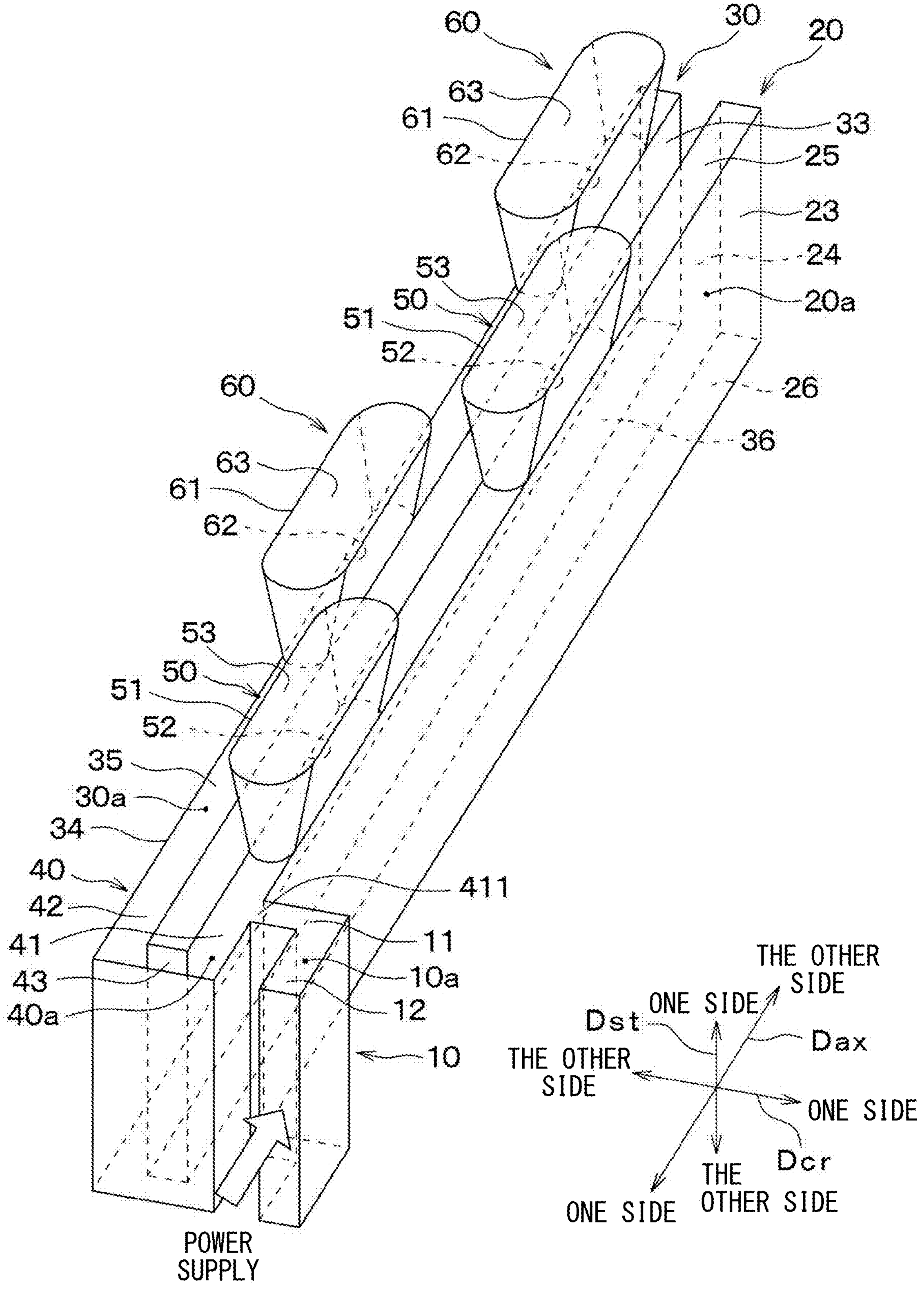
FIG. 26 is a diagram of the antenna device according to the fourth modification of the first embodiment, corresponding to FIG. 3.
Figure 27:
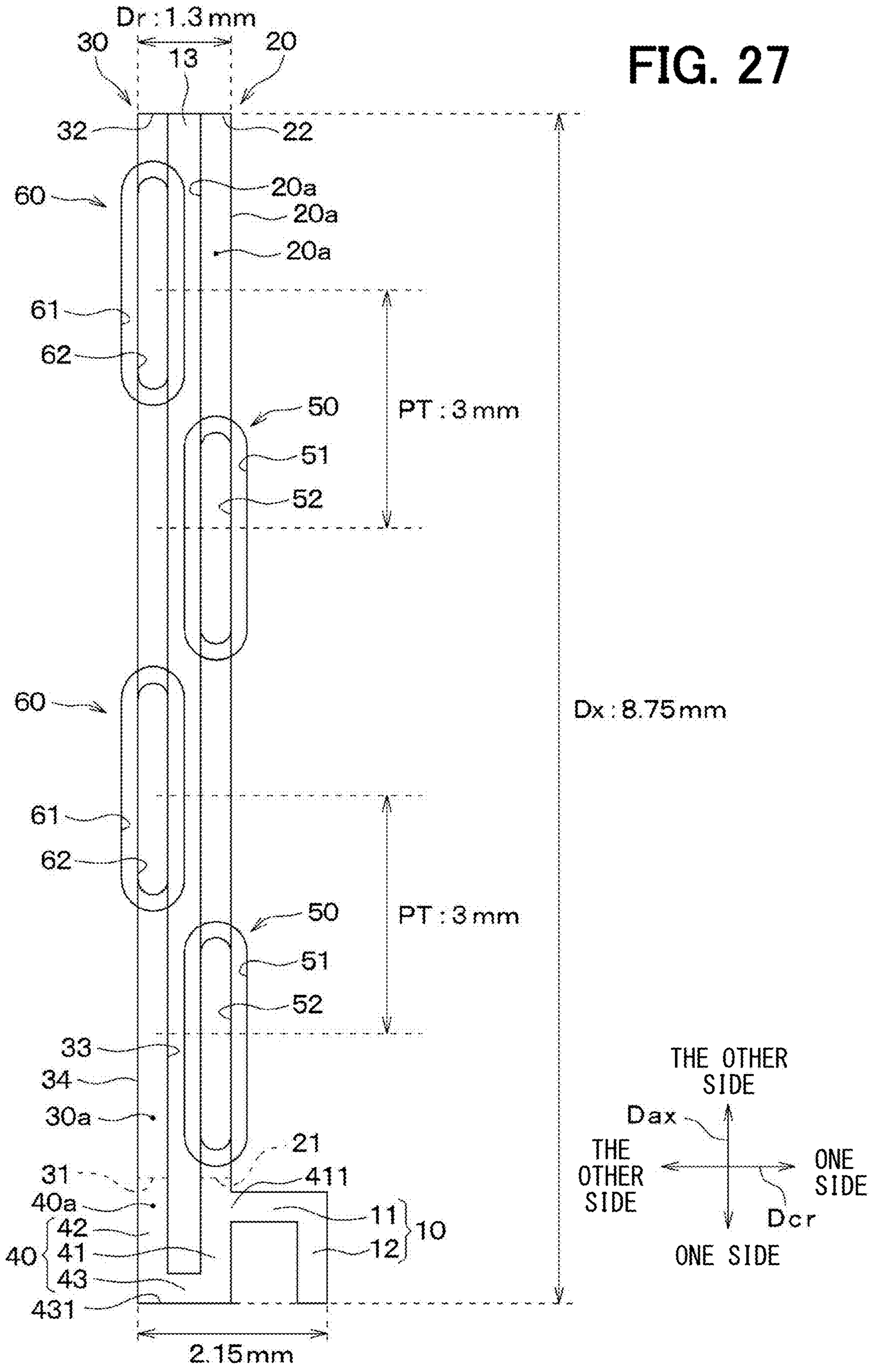
FIG. 27 is a diagram of the antenna device according to the fourth modification of the first embodiment, corresponding to FIG. 4.

For example, as illustrated in FIGS. 25 to 27, two first radiation aperture sections 50 may be connected to the first waveguide section 20, two second radiation aperture sections 60 may be connected to the second waveguide section 30, and the antenna device 1 may include four radiation aperture sections. Alternatively, although not illustrated, the antenna device 1 may be configured to include three first radiation aperture sections 50 and three second radiation aperture sections 60, or may be configured to include five or more first radiation aperture sections 50 and five or more second radiation aperture sections 60. The numbers of first radiation aperture sections 50 and second radiation aperture sections 60 may be equal or different.

(Fifth Modification of First Embodiment)

In the first embodiment, a part of the feeding section 10 is formed by being bent at 90° relative to the guide width direction Dcr has been described, but the present disclosure is not limited thereto.

Figure 28:
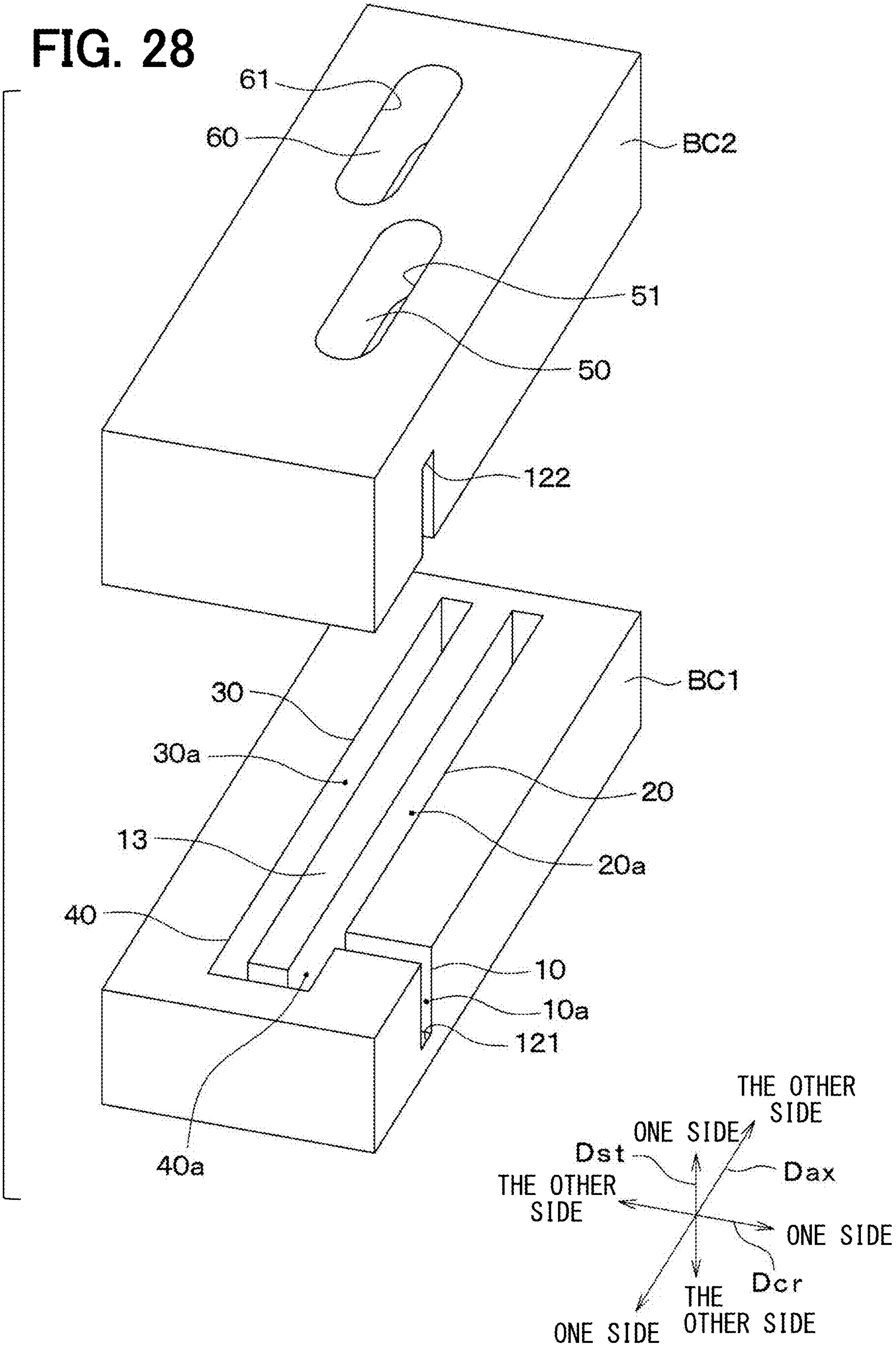
FIG. 28 is a diagram of an antenna device according to a fifth modification of the first embodiment, corresponding to FIG. 2.
Figure 29:
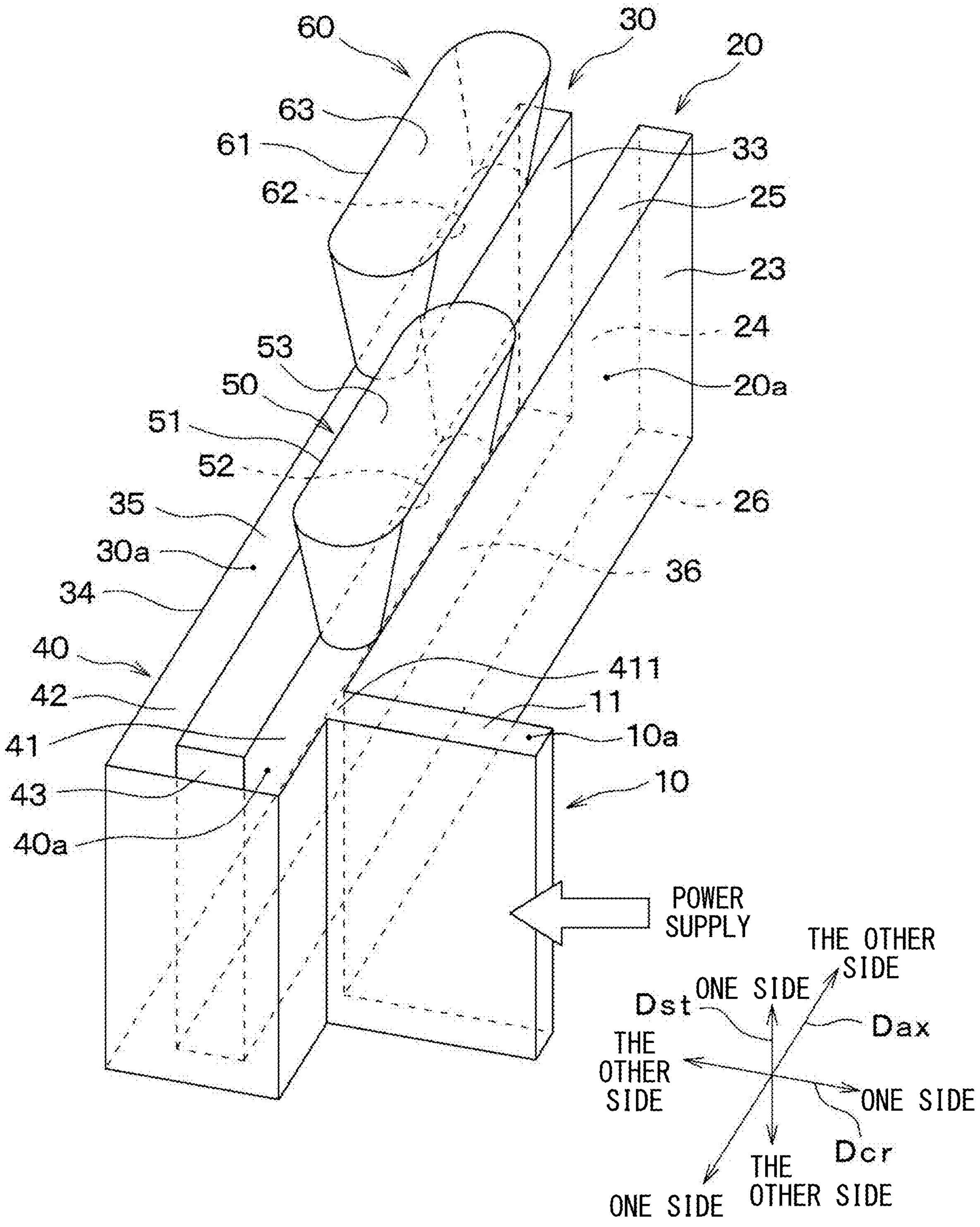
FIG. 29 is a diagram of the antenna device according to the fifth modification of the first embodiment, corresponding to FIG. 3.

For example, as illustrated in FIGS. 28 and 29, the feeding section 10 may be formed in a linear shape that is not bent. Alternatively, although not illustrated, a part of the feeding section 10 may be bent at an angle different from 90°. The shape of the feeding section 10 can be appropriately set according to the space existing around the first waveguide section 20.

Second Embodiment

Next, a second embodiment will be described with reference to FIG. 30. The present embodiment differs from the first embodiment in the shape of the distribution section 40. The other configurations are similar to those of the first embodiment. Therefore, in the present embodiment, parts different from those of the first embodiment will be mainly described, and description of parts similar to those of the first embodiment may be omitted.

Figure 30:
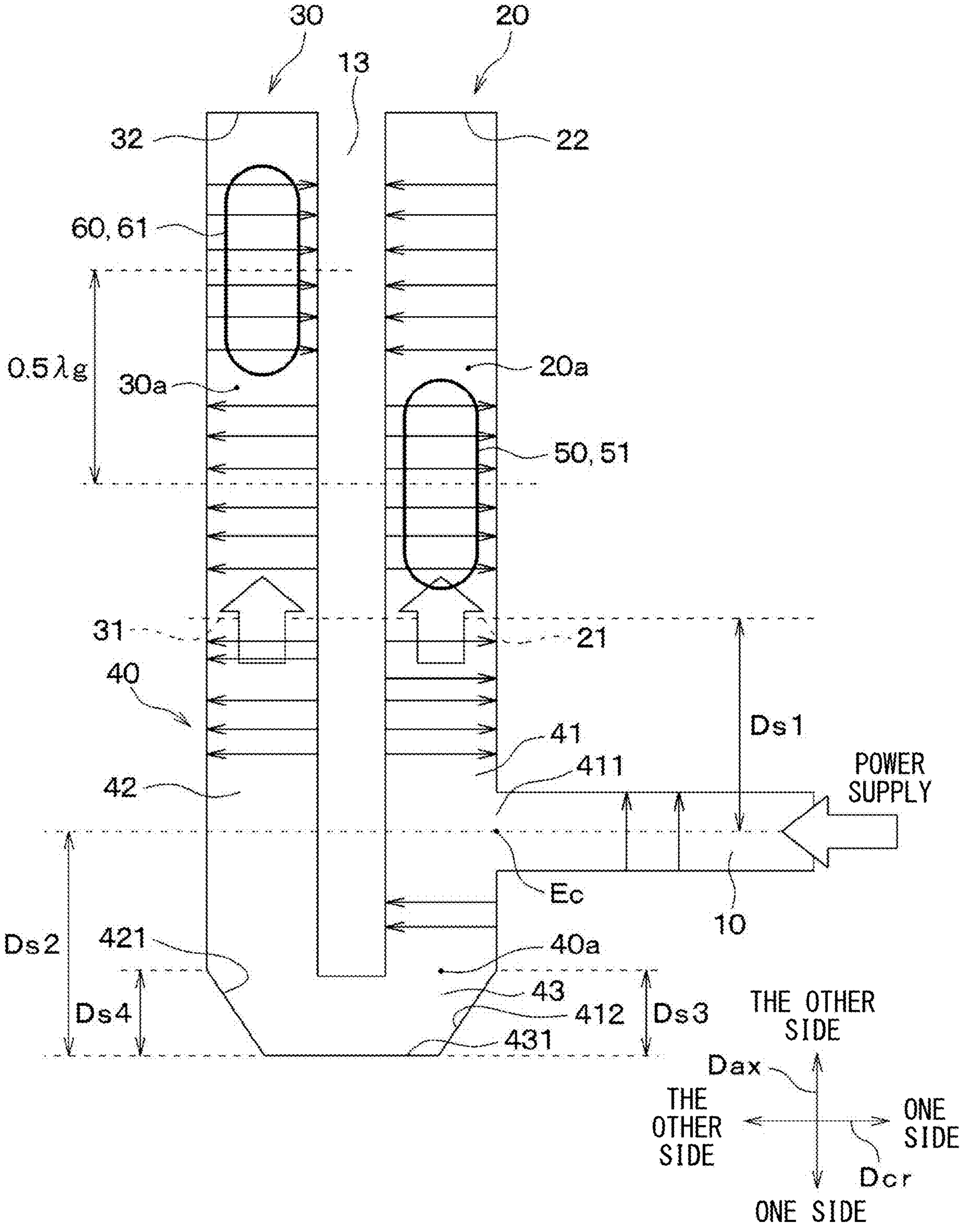
FIG. 30 is a diagram of an antenna device according to a second embodiment, corresponding to FIG. 12.

As illustrated in FIG. 30, the distribution section 40 of the present embodiment is formed by the first distribution section 41 including a first inclined surface 412 that extends at an incline relative to the guide axis direction Dax and the guide width direction Dcr. In addition, the distribution section 40 is formed by the second distribution section 42 including a second inclined surface 421 that extends at an incline relative to the guide axis direction Dax and the guide width direction Dcr.

The first inclined surface 412 is configured by a part of the surface on one side in the guide width direction Dcr among the four surfaces surrounding the distribution waveguide 40*a* in the first distribution section 41. The first inclined surface 412 faces the distribution waveguide 40*a* and is inclined to approach the center of the distribution section 40 in the guide width direction Dcr from the other side to one side in the guide axis direction Dax. In other words, between the first waveguide section 20 and the second waveguide section 30, which are adjacent to each other via the partition wall section 13, the first inclined surface 412 is inclined to approach the second waveguide section 30.

The first inclined surface 412 is formed from the midway portion of the first distribution section 41 in the guide axis direction Dax to the distribution end wall 431 of the third distribution section 43. That is, in the first distribution section 41 of the present embodiment, the other side in the guide axis direction Dax on the surface on one side in the guide width direction Dcr is formed along the guide axis direction Dax, and one side in the guide axis direction Dax is formed at an incline relative to the guide axis direction Dax.

The second inclined surface 421 is configured by a part of the surface on the other side in the guide width direction Dcr among the four surfaces surrounding the distribution waveguide 40*a* in the second distribution section 42. The second inclined surface 421 faces the distribution waveguide 40*a* and is inclined to approach the center of the distribution section 40 in the guide width direction Dcr from the other side to one side in the guide axis direction Dax. In other words, between the first waveguide section 20 and the second waveguide section 30, which are adjacent to each other via the partition wall section 13, the second inclined surface 421 is inclined to approach the first waveguide section 20.

The second inclined surface 421 is formed from a midway portion of the second distribution section 42 in the guide axis direction Dax to the distribution end wall 431 of the third distribution section 43. That is, in the second distribution section 42 of the present embodiment, the other side in the guide axis direction Dax on the surface on the other side in the guide width direction Dcr is formed along the guide axis direction Dax, and one side in the guide axis direction Dax is formed at an incline relative to the guide axis direction Dax.

The first inclined surface 412 and the second inclined surface 421 are formed with equal dimensions in the guide axis direction Dax and equal dimensions in the guide width direction Dcr. That is, the inclination angles of the first inclined surface 412 and the second inclined surface 421, which are the angles of the respective inclined surfaces relative to the guide axis direction Dax, are equal. Hereinafter, the distance of the first inclined surface 412 from the end on one side to the end on the other side in the guide axis direction Dax is referred to as a third distance Ds3, and the distance of the second inclined surface 421 from the end on one side to the end on the other side in the guide axis direction Dax is referred to as a fourth distance Ds4. In the present embodiment, the third distance Ds3 and the fourth distance Ds4 are formed to be equal.

In the distribution section 40 of the present embodiment formed as described above, the radio waves introduced into the distribution waveguide 40*a* are propagated through the first distribution section 41, the third distribution section 43, and the second distribution section 42 and folded back. At this time, the propagation distance of the radio waves changes compared to the configuration without the first inclined surface 412 and the second inclined surface 421, as in the first embodiment. This leads to a change in the amount of phase change when the phase changes due to the propagation of the radio waves through the distribution waveguide 40*a*.

Therefore, the first distance Ds1, the second distance Ds2, the third distance Ds3, and the fourth distance Ds4 of the present embodiment are set so that when radio waves are propagated to the first distribution section 41, the direction of the electric field generated in a predetermined portion of the second distribution section 42 is opposite to the direction of the electric field generated in the portion of the first distribution section 41 overlapping the predetermined portion in the guide axis direction Dax. In other words, in the distribution section 40, the first distance Ds1, the second distance Ds2, the third distance Ds3, and the fourth distance Ds4 are set so that the phase of the radio wave propagating to the first connection 21 is opposite to the phase of the radio wave propagating to the second connection 31.

The other configurations are similar to those of the first embodiment. The antenna device 1 of the present embodiment can obtain effects similar to those of the first embodiment, exerted by a configuration similar or equivalent to that of the first embodiment.

In addition, as in the present embodiment, by forming the configuration that includes the first inclined surface 412 and the second inclined surface 421, even when it is difficult to ensure the second distance Ds2, the phase of the radio wave propagating to the first connection 21 can be made opposite to the phase of the radio wave propagating to the second connection 31.

(First Modification of Second Embodiment)

In the first embodiment, the first distribution section 41 includes the first inclined surface 412 and the second distribution section 42 includes the second inclined surface 421, but the present disclosure is not limited thereto. For example, the distribution section 40 may have a shape in which the first distribution section 41 includes the first inclined surface 412 but the second distribution section 42 does not include the second inclined surface 421. Alternatively, the distribution section 40 may have a shape in which the second distribution section 42 includes the second inclined surface 421 but the first distribution section 41 does not include the first inclined surface 412.

(Second Modification of Second Embodiment)

In the first embodiment, the first inclined surface 412 and the second inclined surface 421 are formed to have equal dimensions in the guide axis direction Dax and equal dimensions in the guide width direction Dcr, but the present disclosure is not limited thereto. For example, the first inclined surface 412 and the second inclined surface 421 may have different dimensions in the guide axis direction Dax. Alternatively, the first inclined surface 412 and the second inclined surface 421 may have different dimensions in the guide width direction Dcr. That is, the inclination angles of the first inclined surface 412 and the second inclined surface 421, which are the angles of the respective inclined surfaces relative to the guide axis direction Dax, may differ from each other.

Third Embodiment

Next, a third embodiment will be described with reference to FIG. 31. The present embodiment differs from the first embodiment in that the antenna device 1 includes a third waveguide section 70 as a waveguide in addition to a first waveguide section 20 and a second waveguide section 30, and includes a third radiation aperture section 80 connected to the third waveguide section 70. Moreover, the present embodiment differs from the first embodiment in that the distribution section 40 includes a fourth distribution section 44 and a fifth distribution section 45 in addition to the first distribution section 41, the second distribution section 42, and the third distribution section 43, and distributes radio waves to the first waveguide section 20, the second waveguide section 30, and the third waveguide section 70. The other configurations are similar to those of the first embodiment. Therefore, in the present embodiment, parts different from those of the first embodiment will be mainly described, and description of parts similar to those of the first embodiment may be omitted.

Figure 31:
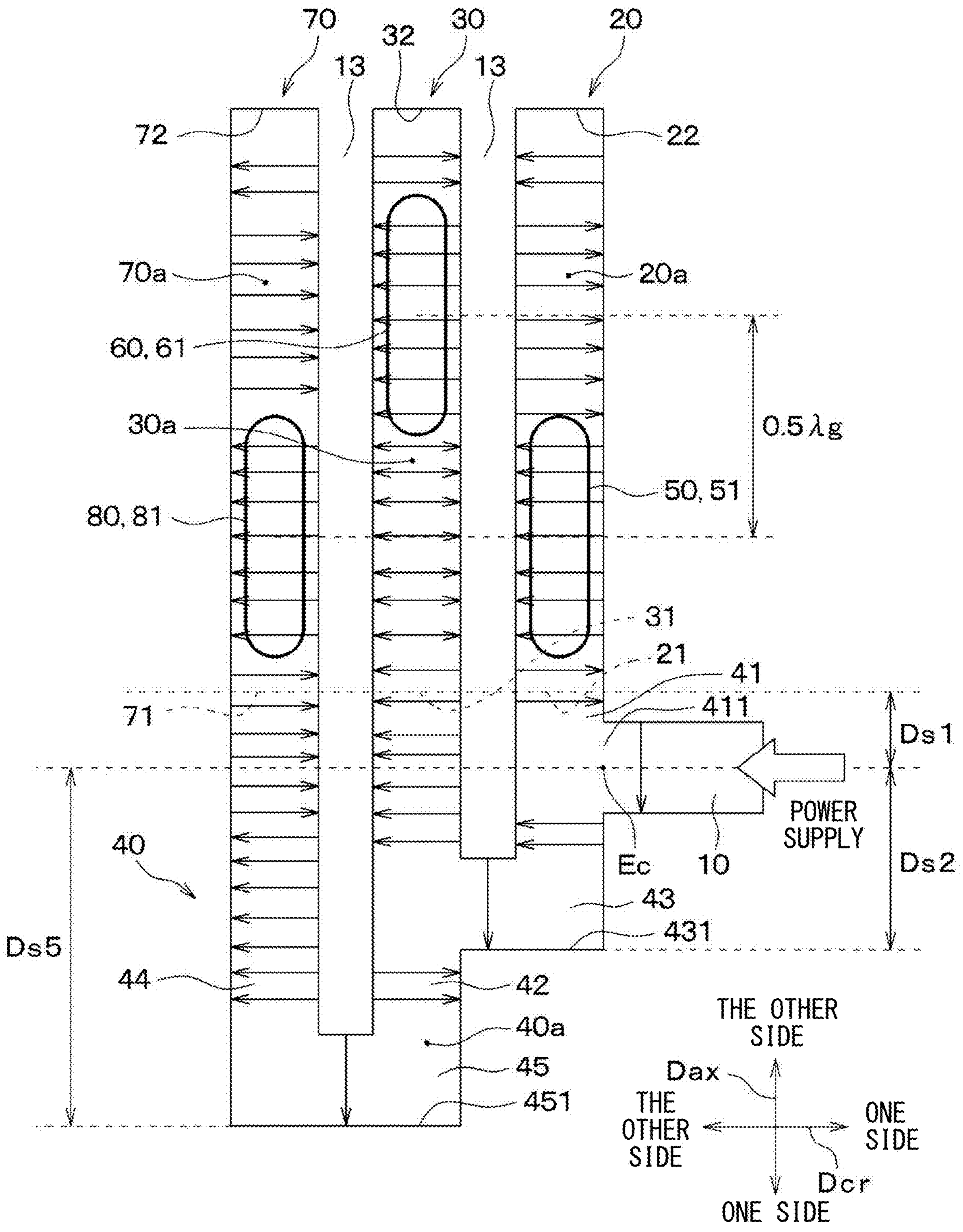
FIG. 31 is a diagram of an antenna device according to a third embodiment, corresponding to FIG. 12.

As illustrated in FIG. 31, the antenna device 1 of the present embodiment includes the third waveguide section 70 extending along the guide axis direction Dax. The antenna device 1 of the present embodiment has a configuration in which the first waveguide section 20, the second waveguide section 30, the third waveguide section 70, and the distribution section 40 are formed continuously, and two sections are formed by folding back.

The first waveguide section 20, the second waveguide section 30, and the third waveguide section 70 are formed side by side in the guide width direction Dcr. The first waveguide section 20, the second waveguide section 30, and the third waveguide section 70 are arranged in the guide width direction Dcr, with the partition wall section 13 placed between each section. The third waveguide section 70 includes a third connection 71, connected to the distribution section 40, on one side in the guide axis direction Dax, and includes a third terminal wall 72, forming the terminal end of the waveguide, on the other side in the guide axis direction Dax. The third terminal wall 72 is formed of a planar wall expanding in a direction orthogonal to the guide axis direction Dax.

In the first waveguide section 20, the second waveguide section 30, and the third waveguide section 70, the positions of the first connection 21, the second connection 31, and the third connection 71 in the guide axis direction Dax overlap. In the first waveguide section 20, the second waveguide section 30, and the third waveguide section 70, the positions of the first terminal wall 22, the second terminal wall 32, and the third terminal wall 72 in the guide axis direction Dax overlap. That is, the first waveguide section 20, the second waveguide section 30, and the third waveguide section 70 have equal dimensions in the guide axis direction Dax.

A third waveguide path 70*a* that extends in the guide axis direction Dax and propagates radio waves is formed inside the third waveguide section 70. Similarly to the first waveguide path 20*a* and the second waveguide path 30*a*, the third waveguide path 70*a* is formed between the first block BC1 and the second block BC2 as a cavity extending in the guide axis direction Dax.

The other configurations of the third waveguide section 70 are the same as those of the second waveguide section 30. Specifically, the third waveguide section 70 has a cross section orthogonal to the guide axis direction Dax, formed in a rectangular shape with a dimension in the stacking direction Dst larger than the dimension in the guide width direction Dcr. The dimension of the third waveguide section 70 in the stacking direction Dst is equal to the dimension of each of the first waveguide section 20 and the second waveguide section 30 in the stacking direction Dst. The dimension of the third waveguide section 70 in the guide width direction Dcr is equal to the dimension of each of the first waveguide section 20 and the second waveguide section 30 in the guide width direction Dcr.

The distribution section 40 of the present embodiment includes a fourth distribution section 44 extending along the guide axis direction Dax and connected to the third connection 71 of the third waveguide section 70, and a fifth distribution section 45 extending along the guide width direction Dcr and connected to the second distribution section 42 and the fourth distribution section 44. The second distribution section 42 and the fourth distribution section 44 are formed side by side in the guide width direction Dcr, with the central axis of each distribution section extending along the guide axis direction Dax. The second distribution section 42 and the fourth distribution section 44 are arranged in the guide width direction Dcr via the partition wall section 13.

The fourth distribution section 44 guides the radio waves introduced into the distribution section 40 to the third waveguide section 70. In the fourth distribution section 44, the other side in the guide axis direction Dax communicates with the third waveguide section 70, and one side in the guide axis direction Dax communicates with the fifth distribution section 45. The fourth distribution section 44 communicates with the feeding section 10 via the fifth distribution section 45, the second distribution section 42, the third distribution section 43, and the first distribution section 41. The radio waves introduced through the feeding aperture 411 of the first distribution section 41 are introduced into the fourth distribution section 44 via the third distribution section 43, the second distribution section 42, and the fifth distribution section 45. The second distribution section 42 and the fourth distribution section 44 have equal dimensions in the guide axis direction Dax. The fifth distribution section 45 extends along the guide width direction Dcr, with one side in the guide width direction Dcr connected to the second distribution section 42 and the other side in the guide width direction Dcr connected to the fourth distribution section 44. The fifth distribution section 45 guides the radio waves propagated from the feeding aperture 411 of the first distribution section 41 to the second distribution section 42 to the fifth distribution section 45.

The second distribution section 42 of the present embodiment has a dimension in the guide axis direction Dax larger than the second distribution section 42 of the first embodiment. That is, the second distribution section 42 has a dimension in the guide axis direction Dax larger than the first distribution section 41. In the second distribution section 42, the third distribution section 43 is connected to the middle in the guide axis direction Dax, and the fifth distribution section 45 is connected to the end on one side in the guide axis direction Dax.

In the distribution section 40 including the first distribution section 41, the second distribution section 42, the third distribution section 43, the fourth distribution section 44, and the fifth distribution section 45 formed in this manner, a portion where the second distribution section 42 and the fifth distribution section 45 are connected is bent at 90°, that is, at a right angle. In the distribution section 40, a portion where the fourth distribution section 44 and the fifth distribution section 45 are connected is bent at 90°, that is, at a right angle. The distribution section 40 of the present embodiment forms two folded sections by being folded back by 180° from one side to the other side in the guide axis direction Dax to bypass the partition wall section 13.

The distribution section 40 is connected to the first waveguide section 20 and the second waveguide section 30 adjacent to each other via the partition wall section 13, and is further connected to the second waveguide section 30 and the third waveguide section 70 adjacent to each other via the partition wall section 13. A distribution waveguide 40*a* that propagates radio waves is formed inside the distribution section 40 by folding back. For the distribution waveguide 40*a*, two cavities are formed by being bent at 180° between the first block BC1 and the second block BC2. The distribution section 40 has a staircase shape formed on one side in the guide axis direction Dax and includes two short circuit sections on one side in the guide axis direction Dax. Specifically, the distribution section 40 includes a first distribution end wall 431 forming a part of the inner wall surface of the third distribution section 43 and a second distribution end wall 451 forming a part of the inner wall surface of the fifth distribution section 45. The first distribution end wall 431 and the second distribution end wall 451 are constituted by planar walls facing the distribution waveguide 40*a* and expanding in a direction orthogonal to the guide axis direction Dax.

The dimension of the fourth distribution section 44 in the stacking direction Dst is equal to the dimension of each of the first distribution section 41 and the second distribution section 42 in the stacking direction Dst. The dimension of the fourth distribution section 44 in the guide width direction Dcr is equal to the dimension of each of the first distribution section 41 and the second distribution section 42 in the guide width direction Dcr. The dimension of the fifth distribution section 45 in the stacking direction Dst is equal to the dimension of the third distribution section 43 in the stacking direction Dst, and the dimension of the fifth distribution section 45 in the guide axis direction Dax is equal to the dimension of the third distribution section 43 in the guide axis direction Dax.

This enables radio waves to propagate between the first waveguide path 20*a*, the second waveguide path 30*a*, the distribution waveguide 40*a*, and the feeding path 10*a* of the feeding section 10. Specifically, the radio waves introduced from the feeding path 10*a* into the distribution waveguide 40*a* of the distribution section 40 are distributed in the distribution waveguide 40*a* and propagated to the first waveguide path 20*a* of the first waveguide section 20, the second waveguide path 30*a* of the second waveguide section 30, and the third waveguide path 70*a* of the third waveguide section 70.

The antenna device 1 of the present embodiment includes the third radiation aperture section 80 in addition to the first radiation aperture section 50 and the second radiation aperture section 60. Similarly to the first radiation aperture section 50 and the second radiation aperture section 60, the third radiation aperture section 80 is formed as a through-hole penetrating the second block BC2 in the stacking direction Dst. The third radiation aperture section 80 includes a third radiation aperture 81, opening toward the external space of the antenna device 1, on one side in the stacking direction Dst.

The third radiation aperture section 80 has a cross section orthogonal to the stacking direction Dst, formed in an oval shape extending in the guide axis direction Dax. That is, the third radiation aperture section 80 has a dimension in the guide width direction Dcr smaller than the dimension in the guide axis direction Dax. The third radiation aperture section 80 is formed in a tapered shape with an inner diameter increasing from the other side to one side in the stacking direction Dst. In other words, the third radiation aperture section 80 is formed as a through-hole with an inner diameter expanding toward one side in the stacking direction Dst.

The second radiation aperture section 60 and the third radiation aperture section 80, which are respectively connected to the second waveguide section 30 and the third waveguide section 70 adjacent to each other via the partition wall section 13, are formed at different positions in the guide axis direction Dax, shifted from each other in the guide axis direction Dax. Specifically, in the present embodiment, the third radiation aperture section 80 is formed on one side in the guide axis direction Dax compared to the second radiation aperture section 60. Thus, the distance of the third radiation aperture section 80 from the feeding aperture 411 in the guide axis direction Dax is smaller than the distance of the second radiation aperture section 60 from the feeding aperture 411 in the guide axis direction Dax. That is, the third radiation aperture section 80 is formed at a position closer to the feeding aperture 411 than the second radiation aperture section 60.

The first radiation aperture section 50 and the third radiation aperture section 80 are formed at positions that overlap each other in the guide width direction Dcr. That is, the third radiation aperture section 80 is formed as separated from the second radiation aperture section 60 on one side in the guide axis direction Dax by ½ of an in-guide wavelength $\lambda_g$, which is an aperture pitch PT between the first radiation aperture section 50 and the second radiation aperture section 60. Specifically, the center of the third radiation aperture section 80 in the guide axis direction Dax is formed as shifted by 3.0 mm from the center of the second radiation aperture section 60 in the guide axis direction Dax to one side in the guide axis direction Dax.

In the present embodiment, the phases of the radio waves propagated to the portions of the second waveguide section 30 and the third waveguide section 70 overlapping in the guide axis direction Dax can be made opposite to each other by the distribution section 40. Specifically, the distribution section 40 of the present embodiment can invert the phase of the radio wave propagated from the fourth distribution section 44 to the third connection 71 relative to the phase of the radio wave propagated from the second distribution section 42 to the second connection 31.

Hereinafter, as illustrated in FIG. 31, the distance in the guide axis direction Dax from the power reception center Ec to the second distribution end wall 451 is defined as a fifth distance Ds5. In FIG. 31, the distance in the guide axis direction Dax from the power reception center Ec to the first connection 21 is defined as a first distance Ds1 as in the first embodiment, and the distance in the guide axis direction Dax from the power reception center Ec to the distribution end wall 431 is defined as a second distance Ds2 as in the first embodiment.

Further, as in the first embodiment, the first distance Ds1 and the second distance Ds2 are set so that the phase of the radio wave propagated to a predetermined portion of the second distribution section 42 is opposite to the phase of the radio wave propagated to the portion of the first distribution section 41 overlapping the predetermined portion in the guide axis direction Dax. In other words, in the distribution section 40, the first distance Ds1 and the second distance Ds2 are set so that the phase of the radio wave propagating to the first connection 21 of the first waveguide section 20 is opposite to the phase of the radio wave propagating to the second connection 31 of the second waveguide section 30.

The fifth distance Ds5 is set so that the phase of the radio wave propagated to the predetermined portion of the second distribution section 42 is opposite to the phase of the radio wave propagated to the portion of the fourth distribution section 44 overlapping the predetermined portion in the guide axis direction Dax. In other words, in the distribution section 40, the second distance Ds2 and the fifth distance Ds5 are set so that the phase of the radio wave propagating to the second connection 31 of the second waveguide section 30 is opposite to the phase of the radio wave propagating to the third connection 71 of the third waveguide section 70.

When the first distance Ds1, the second distance Ds2, and the fifth distance Ds5 are set as described above, the phase of the radio wave propagating to the first connection 21, the phase of the radio wave propagating to the second connection 31, and the phase of the radio wave propagating to the third connection 71 become the same. For example, when the first distance Ds1 is set to any size within the range of 1/20 to 1/10 of the in-guide wavelength $\lambda_g$, the second distance Ds2 and the fifth distance Ds5 are set to any size within the range of ⅕ to ¼ of the in-guide wavelength $\lambda_g$. However, the first distance Ds1, the second distance Ds2, and the fifth distance Ds5 are examples, and the present disclosure is not limited thereto.

As a result, the directions of the electric fields of the portions of the first waveguide section 20 and the second waveguide section 30 overlapping each other in the guide width direction Dcr can be made opposite to each other. Moreover, the directions of the electric fields of the portions of the second waveguide section 30 and the third waveguide section 70 overlapping each other in the guide width direction Dcr can be opposite to each other. Therefore, the directions of the phases of the radio waves propagated to the portions overlapping each other in the guide width direction Dcr in the first waveguide section 20, the second waveguide section 30, and the third waveguide section 70 can be made opposite to each other.

The phase of the radio wave propagated to the portion facing the first radiation aperture section 50 in the first waveguide section 20 can be made the same as the phase of the radio wave propagated to the portion facing the second radiation aperture section 60, which is separated from the portion by half the in-guide wavelength $\lambda_g$ in the guide axis direction Dax. Moreover, the phase of the radio wave propagated to the portion facing the second radiation aperture section 60 in the second waveguide section 30 can be made the same as the phase of the radio wave propagated to the portion facing the third radiation aperture section 80, which is separated from the portion by half the in-guide wavelength $\lambda_g$ in the guide axis direction Dax. Therefore, the phases of the radio waves radiated from first radiation aperture section 50, second radiation aperture section 60, and third radiation aperture section 80 can be made the same. The radio waves radiated by the antenna device 1 can be amplified to improve the magnitude of the gain.

In addition, the axial dimension Dx can be reduced compared to the configuration in which parts that radiate radio waves are arranged in a single waveguide along the extending direction of the waveguide. Therefore, compared to the configuration in which parts that radiate radio waves are arranged in a single waveguide along the extending direction of the waveguide, it is possible to suppress sidelobes of radio waves while minimizing an increase in the size of the antenna device 1.

Although the present embodiment is a modification based on the first embodiment, the present embodiment can be combined with the second embodiment.

Fourth Embodiment

Next, a fourth embodiment will be described with reference to FIG. 32. The present embodiment differs from the first embodiment in the number of components constituting the antenna device 1. The other configurations are similar to those of the first embodiment. Therefore, in the present embodiment, parts different from those of the first embodiment will be mainly described, and description of parts similar to those of the first embodiment may be omitted.

Figure 32:
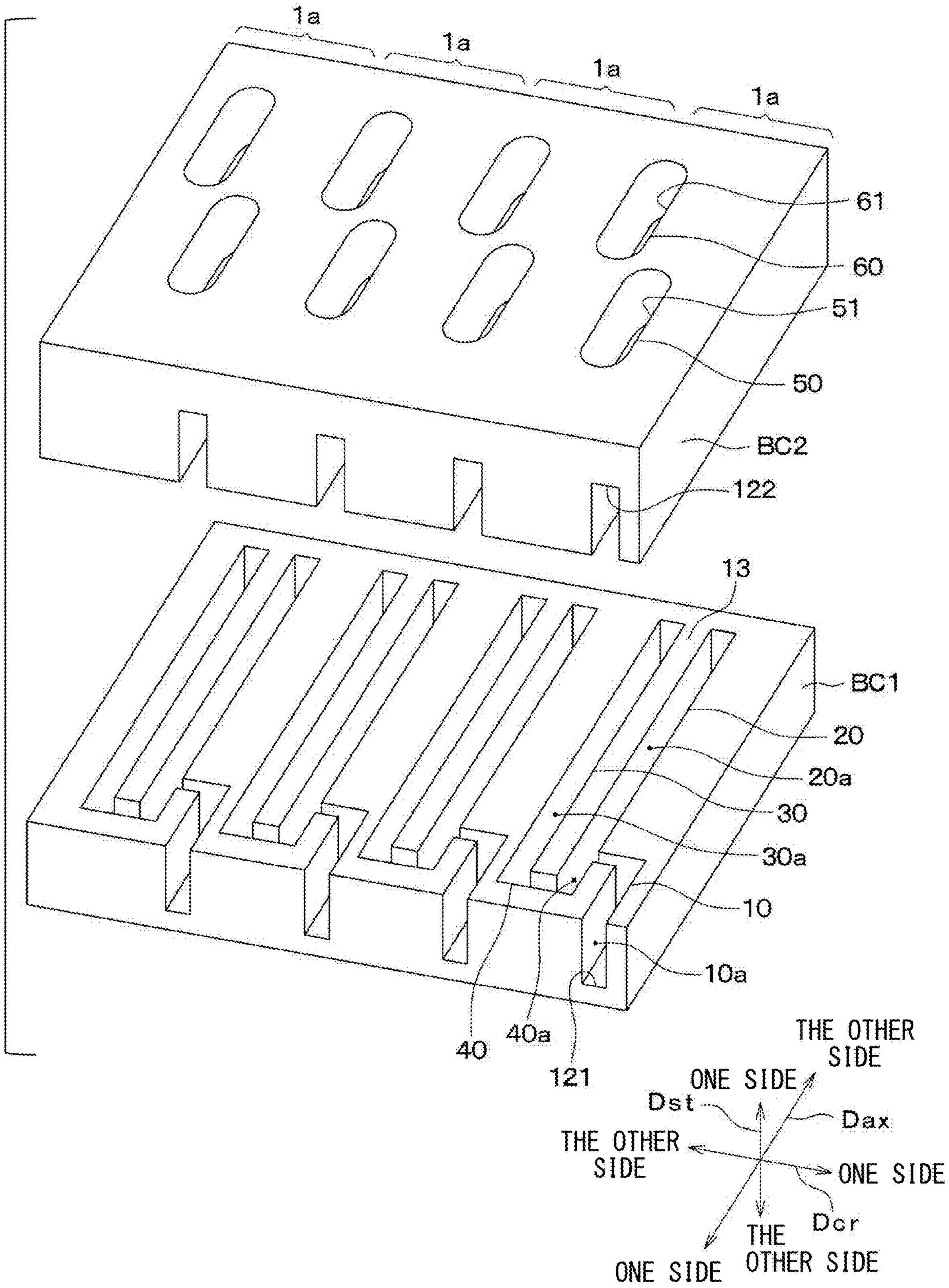
FIG. 32 is a diagram of an antenna device according to a fourth embodiment, corresponding to FIG. 2.

As illustrated in FIG. 32, the antenna device 1 of the present embodiment includes four each of the feeding section 10, the first waveguide section 20, the second waveguide section 30, the distribution section 40, the first radiation aperture section 50, and the second radiation aperture section 60 described in the first embodiment. As in the first embodiment, each of the four first radiation aperture sections 50 is formed at a position closer to the feeding aperture 411 than the corresponding one of the four second radiation aperture sections 60. Each of the four feeding sections 10 is connected to one side of the corresponding one of the four first waveguide sections 20 in the guide width direction Dcr.

Here, as illustrated in FIG. 32, a part that includes one feeding section 10, one first waveguide section 20, one second waveguide section 30, one distribution section 40, one first radiation aperture section 50, and one second radiation aperture section 60 is referred to as an antenna section 1*a*. The configuration of each of the feeding section 10, the first waveguide section 20, the second waveguide section 30, the distribution section 40, the first radiation aperture section 50, and the second radiation aperture section 60 constituting the antenna section 1*a* is similar to the configuration described in the first embodiment. The antenna device 1 of the present embodiment includes four antenna sections 1*a* arranged in the guide width direction Dcr.

The feeding section 10, the first waveguide section 20, the second waveguide section 30, the distribution section 40, the first radiation aperture section 50, and the second radiation aperture section 60 constituting each of the four antenna sections 1*a* have the same shape. In FIG. 32, for convenience, reference numerals are assigned to representative ones of the four feeding sections 10, first waveguide sections 20, second waveguide sections 30, distribution sections 40, first radiation aperture sections 50, and second radiation aperture sections 60, and reference numerals for the other sections are omitted.

Thus, the phases of the radio waves radiated from the first radiation aperture section 50 and the second radiation aperture section 60 of each antenna section 1*a* can be made the same. The radio waves radiated by each antenna section 1*a* can be amplified to improve the magnitude of the gain. Therefore, by combining the radio waves radiated by each antenna section 1*a*, the radiated radio waves can be further amplified and the magnitude of the gain can be improved compared to the configuration in which the antenna device 1 includes one antenna section 1*a*.

In addition, the axial dimension Dx can be reduced compared to the configuration in which each antenna section 1*a* includes a single waveguide, and a part that radiates radio waves are arranged along the extending direction of the waveguide in the single waveguide. Therefore, compared to the configuration in which in a single waveguide in each antenna section 1*a*, parts that radiate radio waves are arranged along the extending direction of the waveguide, it is possible to suppress sidelobes of radio waves while minimizing an increase in the size of the antenna device 1.

Although the present embodiment is a modification based on the first embodiment, the present embodiment can be combined with either the second or third embodiment.

(First Modification of Fourth Embodiment)

Figure 33:
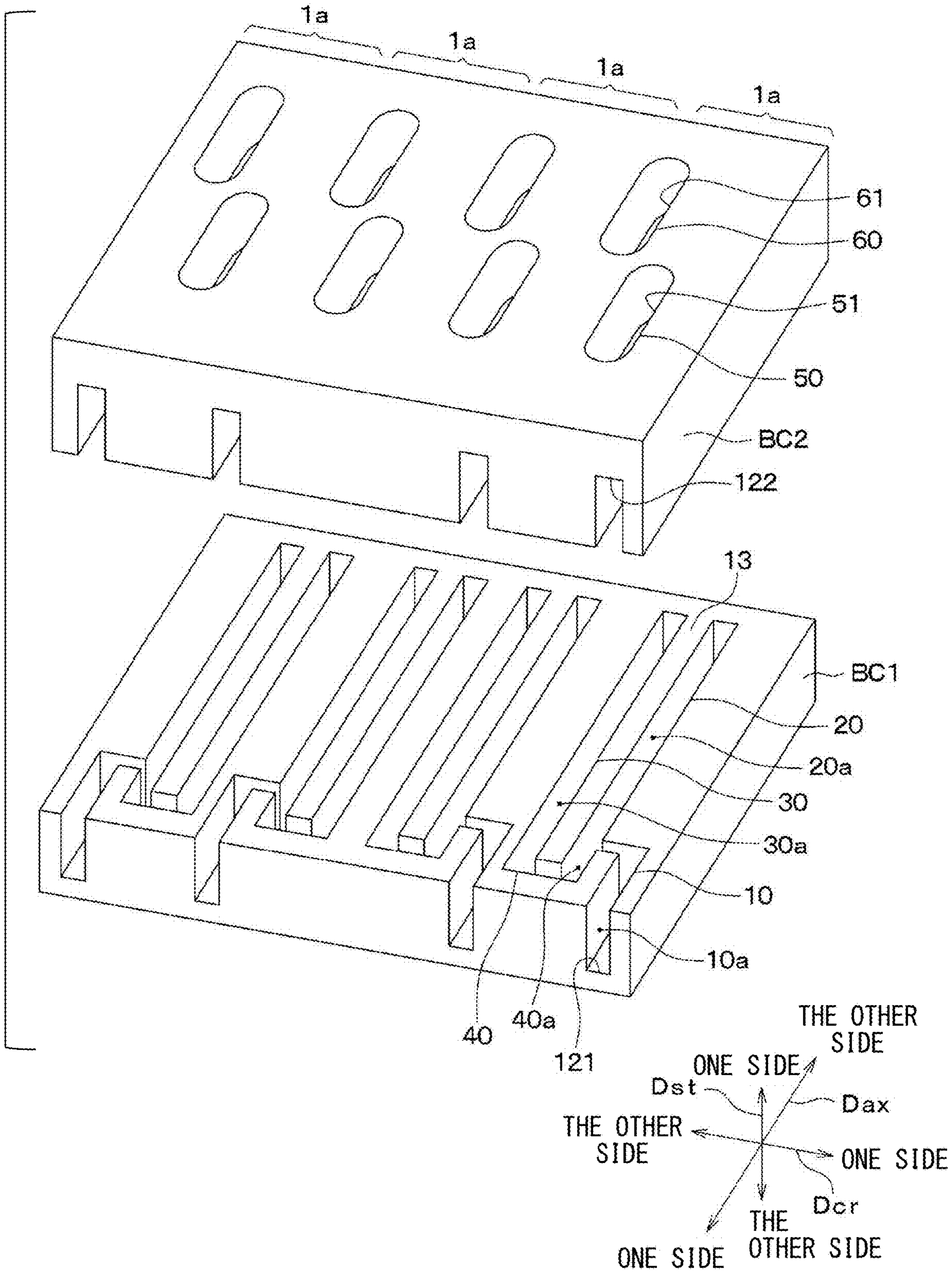
FIG. 33 is a diagram of an antenna device according to a first modification of the fourth embodiment, corresponding to FIG. 2.

In the fourth embodiment, the feeding sections 10 in the respective antenna sections 1*a* are connected to one side of the first waveguide sections 20 in the guide width direction Dcr, but the present disclosure is not limited thereto. For example, as illustrated in FIG. 33, two of the feeding sections 10 in the respective antenna sections 1*a* may be connected to one side of the first waveguide sections 20 in the guide width direction Dcr, and the remaining two feeding sections 10 may be connected to the other side of the first waveguide sections 20 in the guide width direction Dcr.

(Second Modification of Fourth Embodiment)

In the fourth embodiment, the first radiation aperture section 50 in each antenna section 1*a* is formed at a position closer to the feeding aperture 411 than the second radiation aperture section 60, but the present disclosure is not limited thereto. For example, some of the second radiation aperture sections 60 in the respective antenna sections 1*a* may be formed at positions closer to the feeding aperture 411 than the first radiation aperture sections 50. Alternatively, all the second radiation aperture sections 60 in the respective antenna sections 1*a* may be formed at positions closer to the feeding aperture 411 than the first radiation aperture sections 50.

(Third Modification of Fourth Embodiment)

In the fourth embodiment, the feeding section 10, the first waveguide section 20, the second waveguide section 30, the distribution section 40, the first radiation aperture section 50, and the second radiation aperture section 60 constituting each antenna section 1*a* have the same shape, but the present disclosure is not limited thereto. For example, the feeding section 10, the first waveguide section 20, the second waveguide section 30, the distribution section 40, the first radiation aperture section 50, and the second radiation aperture section 60 constituting each antenna section 1*a* may be partially different in shape from the components of the other antenna sections 1*a*.

Fifth Embodiment

Next, a fifth embodiment will be described with reference to FIGS. 34 to 36. The present embodiment differs from the fourth embodiment in that choke grooves 123 are formed in the antenna device 1. The other configurations are similar to those of the fourth embodiment. Therefore, in the present embodiment, parts different from those of the fourth embodiment will be mainly described, and description of parts similar to those of the fourth embodiment may be omitted.

Figure 34:
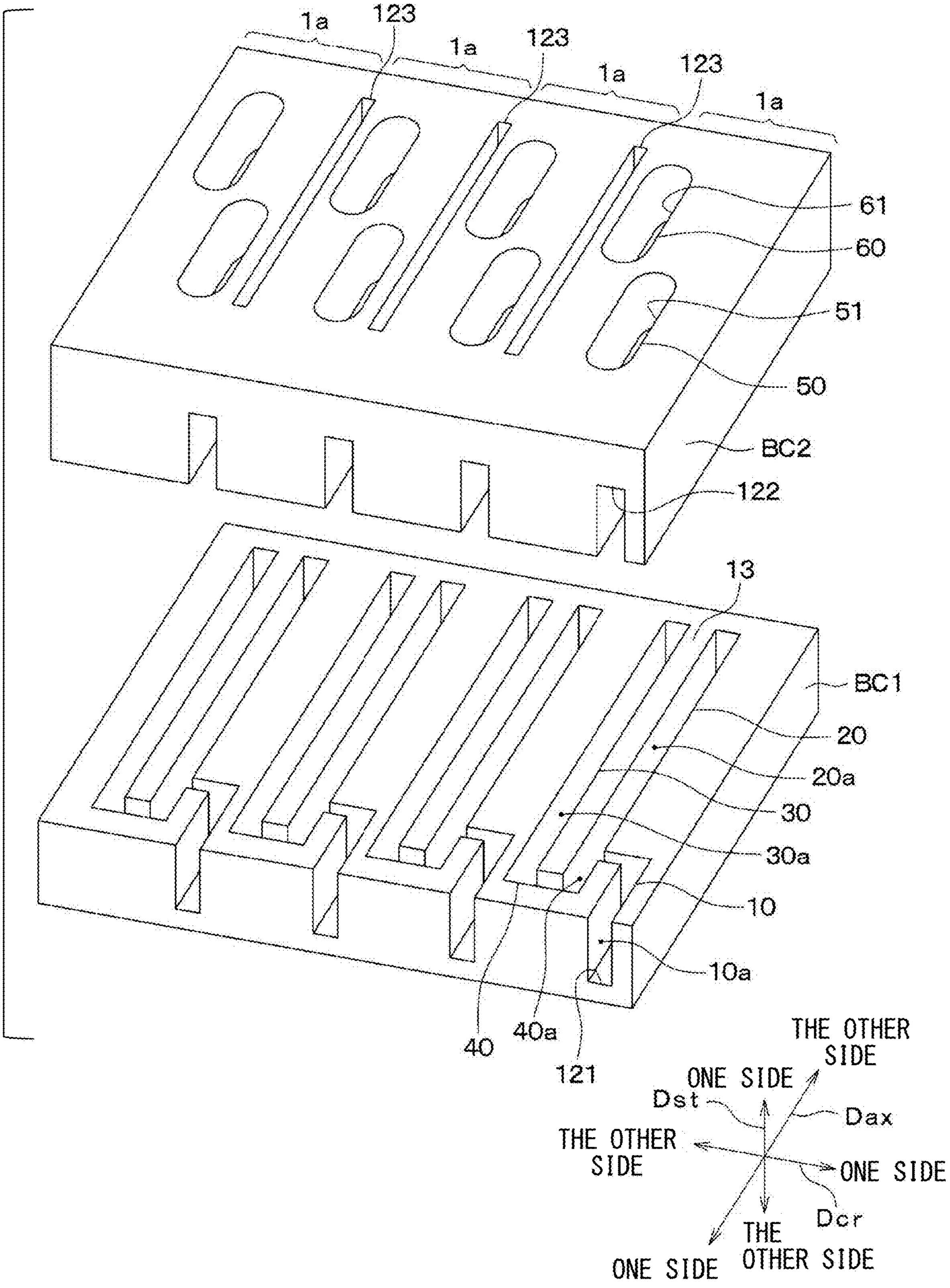
FIG. 34 is a diagram of an antenna device according to a fifth embodiment, corresponding to FIG. 2.
Figure 35:
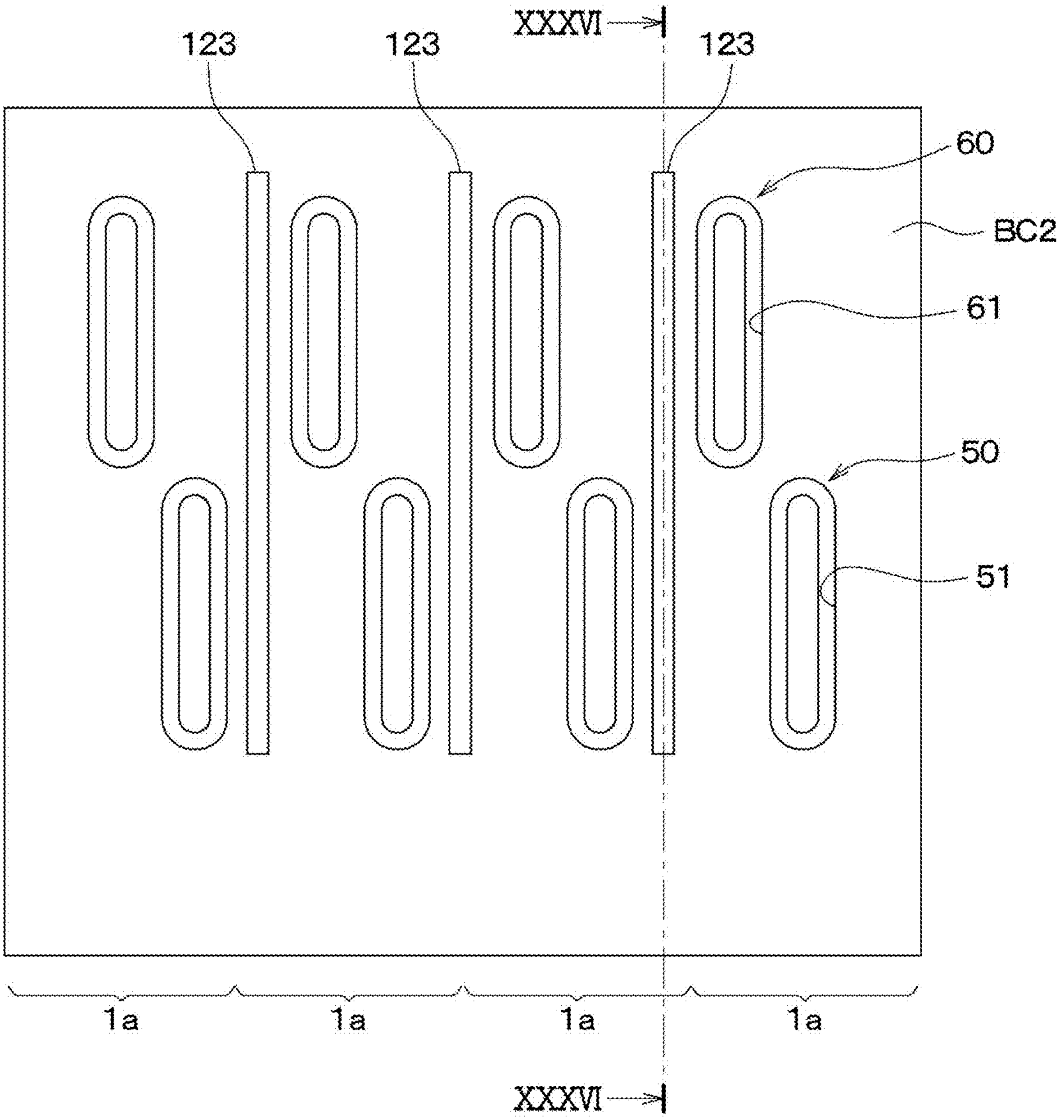
FIG. 35 is a plan view schematically illustrating the antenna device according to the fifth embodiment as viewed from a direction orthogonal to a stacking direction.
Figure 36:
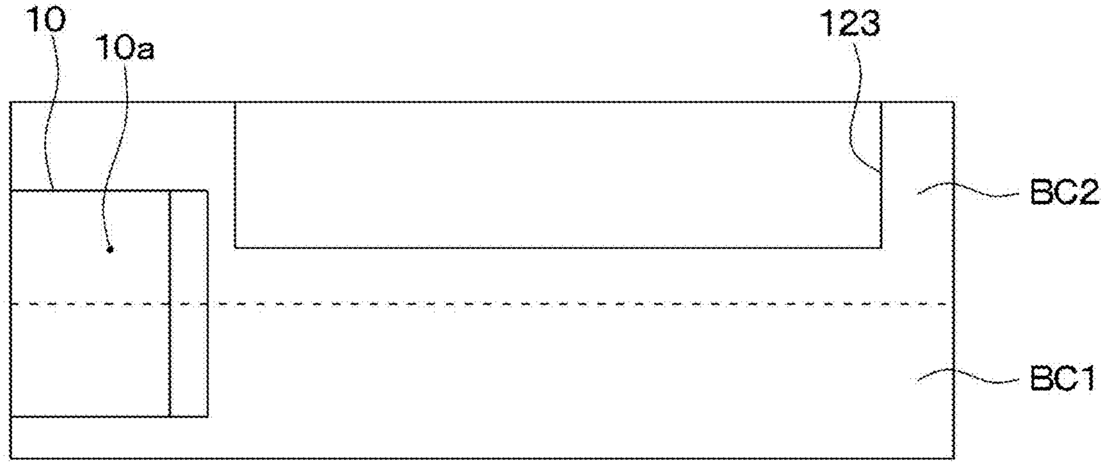
FIG. 36 is a cross-sectional view taken along line XXXVI-XXXVI of FIG. 35.

In the antenna device 1 of the present embodiment, as illustrated in FIGS. 34 to 36, plural choke grooves 123 are formed on one side of the second block BC2 in the stacking direction Dst. The choke groove 123 is formed by recessing a surface on one side of the second block BC2 in the stacking direction Dst. That is, the choke groove 123 is configured by a groove formed without penetrating the second block BC2 in the stacking direction Dst. The choke groove 123 is formed deeper than half the dimension of the second block BC2 in the stacking direction Dst. In other words, the choke groove 123 is formed from the center of the second block BC2 in the stacking direction Dst to the other side.

The choke groove 123 is formed along the guide axis direction Dax. That is, the choke groove 123 is formed along the extending direction of the first waveguide section 20 and the second waveguide section 30. In the antenna device 1 where four antenna sections 1*a*, each including the first waveguide section 20 and the second waveguide section 30 adjacent to each other via the partition wall section 13, are arranged, the choke groove 123 is formed between each antenna section 1*a*.

With this configuration, the radio waves radiated from the first radiation aperture section 50 and the second radiation aperture section 60 of one of the four antenna sections 1*a* are less likely to interfere with the radio waves radiated from the first radiation aperture section 50 and the second radiation aperture section 60 of the other antenna section 1*a*. This enables an improvement in the isolation of the radio waves radiated by the antenna device 1.

The other configurations are similar to those of the fourth embodiment. The antenna device 1 of the present embodiment can obtain effects similar to those of the fourth embodiment, exerted by a configuration similar or equivalent to that of the fourth embodiment.

Sixth Embodiment

Next, a sixth embodiment will be described with reference to FIG. 37. The present embodiment differs from the first embodiment in that antenna devices 1 are arranged on an electrical board 4. The other configurations are similar to those of the first embodiment. Therefore, in the present embodiment, parts different from those of the first embodiment will be mainly described, and description of parts similar to those of the first embodiment may be omitted.

Figure 37:
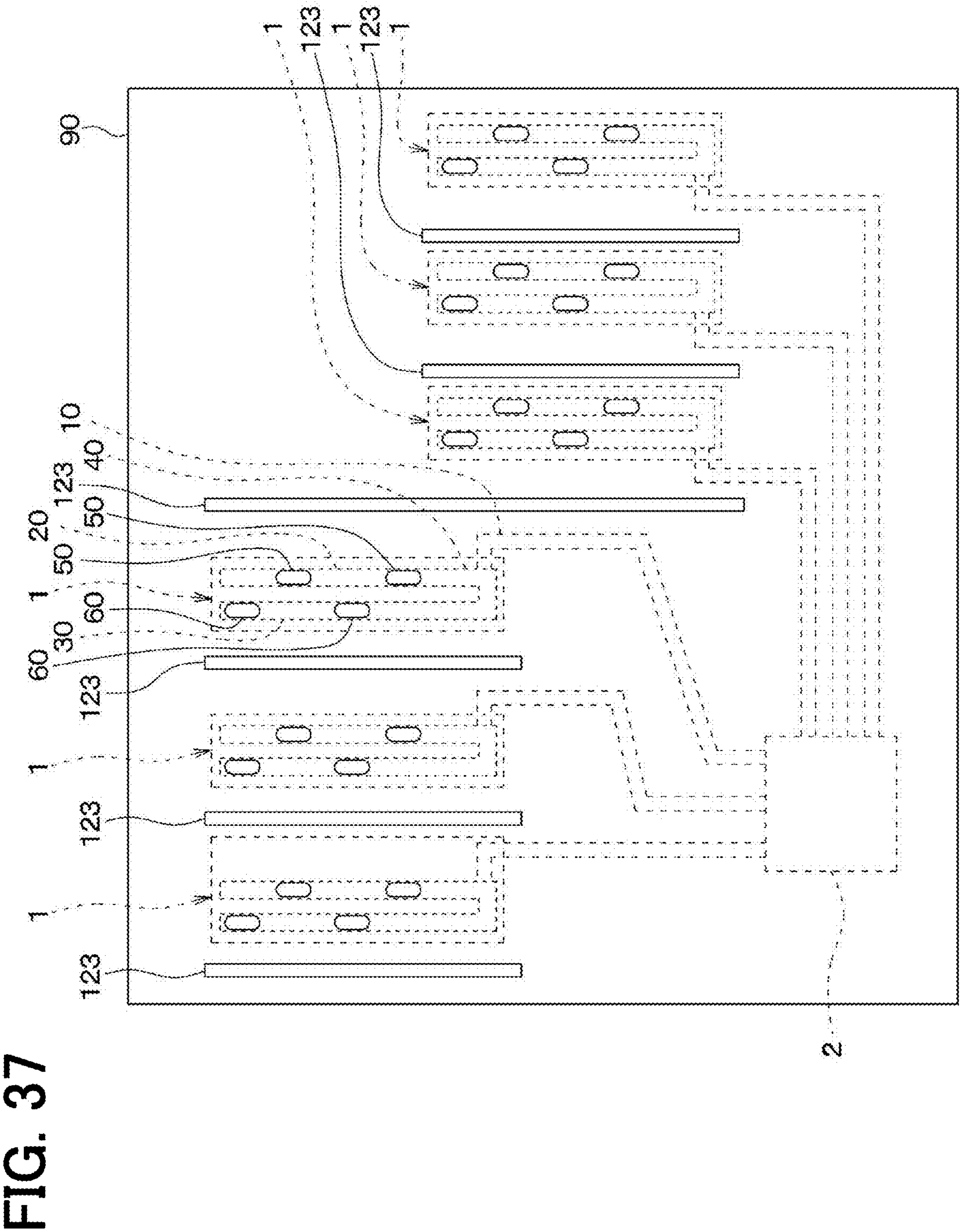
FIG. 37 is a plan view schematically illustrating a schematic configuration of equipment that includes plural antenna devices in a sixth embodiment.

As illustrated in FIG. 37, an array antenna 90, which is an array of plural antenna devices 1, can be used to establish a configuration for transmitting radio waves transmitted and received by the MMIC 2. Such an array antenna 90 gathers, for example, the first waveguide section 20 and the second waveguide section 30 on the MMIC 2 side in each of the antenna devices 1. The array antenna 90 can be implemented by enabling radio waves to propagate between each of the feeding section 10, the first waveguide section 20, the second waveguide section 30, and the distribution section 40 of the antenna device 1 and the MMIC 2. In the array antenna 90, the choke groove 123 described in the fifth embodiment is formed between each of the antenna devices 1. In FIG. 37, for convenience, reference numerals are assigned to representative ones of the feeding sections 10, first waveguide sections 20, second waveguide sections 30, distribution sections 40, first radiation aperture sections 50, and second radiation aperture sections 60 in the respective antenna devices 1, and the reference numerals for the other sections are omitted.

As described in the above embodiment, the antenna device 1 of the present disclosure can be made small in size, enabling the array antenna 90 to be configured using the antenna devices 1 to implement a small-sized array antenna 90. In addition, since the input/output section 3 of the MMIC 2 can be coupled to the first radiation aperture section 50 and the second radiation aperture section 60 of each antenna device 1, the gain of the array antenna 90 can be increased.

The other configurations are similar to those of the first embodiment. The antenna device 1 of the present embodiment can obtain effects similar to those of the first embodiment, exerted by a configuration similar or equivalent to that of the first embodiment.

Although the present embodiment is a modification based on the first embodiment, the present embodiment can be combined with any of second to fifth embodiments.

Seventh Embodiment

Next, a seventh embodiment will be described with reference to FIG. 38. The present embodiment differs from the first embodiment in that the MMIC 2 is mounted on the one surface 4*a* of the electrical board 4. The other configurations are similar to those of the first embodiment. Therefore, in the present embodiment, parts different from those of the first embodiment will be mainly described, and description of parts similar to those of the first embodiment may be omitted.

Figure 38:
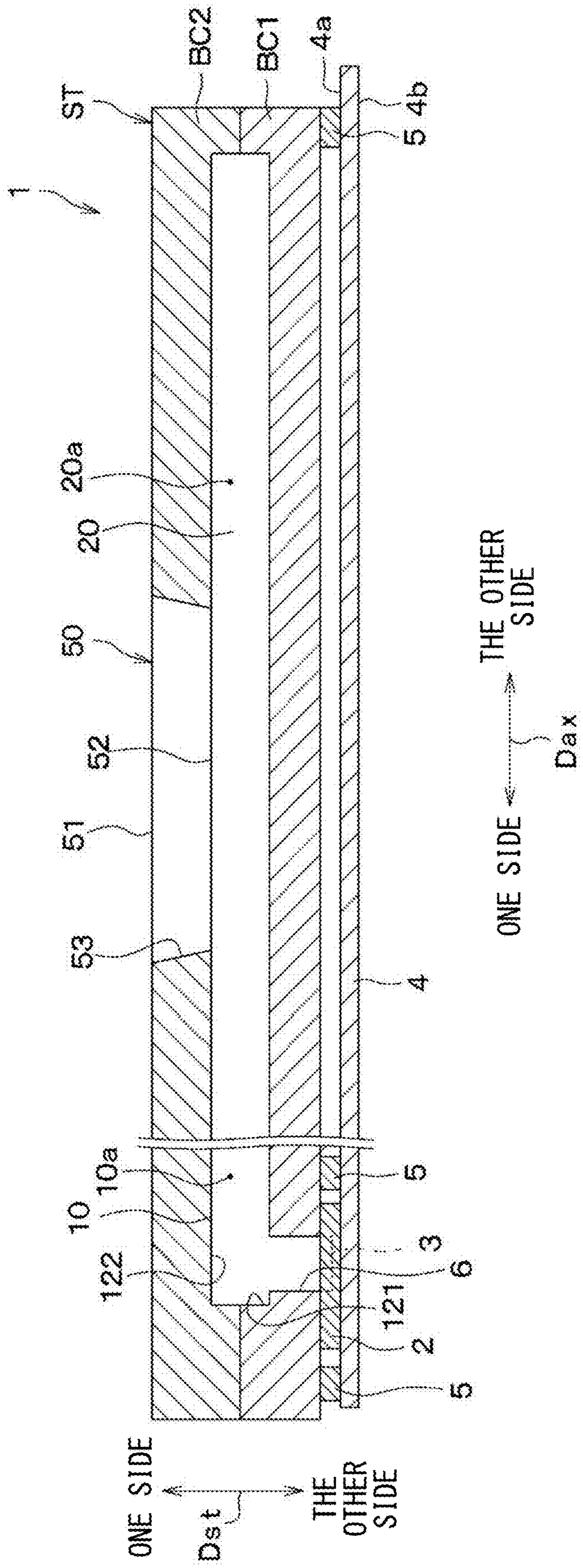
FIG. 38 is a cross-sectional view schematically illustrating a schematic configuration of an antenna device according to a seventh embodiment.

As illustrated in FIG. 38, in the antenna device 1 of the present embodiment, the MMIC 2 is mounted on the one surface 4*a* of the electrical board 4, rather than on the other surface 4*b* of the electrical board 4. A gap for disposing the MMIC 2 is ensured by plural spacers 5 between the first block BC1 of the antenna device 1 and the one surface 4*a* of the electrical board 4, and the MMIC 2 is disposed between the first block BC1 and the one surface 4*a* of the electrical board 4. In FIG. 38 and FIGS. 40 to 42, which will be described later, the solder Sd illustrated in FIG. 1 and the like is omitted.

In the present embodiment, similarly to the first embodiment, the external port 6 is disposed to face the input/output section 3 of the MMIC 2. This enables radio waves to propagate between the external port 6 and the input/output section 3 of the MMIC 2. However, in the present embodiment, unlike the first embodiment, since the MMIC 2 is mounted on the one surface 4*a* of the electrical board 4 as described above, the board through-hole SH is not formed in the electrical board 4.

The other configurations are similar to those of the first embodiment. The antenna device 1 of the present embodiment can obtain effects similar to those of the first embodiment, exerted by a configuration similar or equivalent to that of the first embodiment.

Although the present embodiment is a modification based on the first embodiment, the present embodiment can be combined with any of second to sixth embodiments.

Eighth Embodiment

Next, an eighth embodiment will be described with reference to FIG. 39. The present embodiment differs from the first embodiment in that the spacer 5 is not provided. The other configurations are similar to those of the ninth embodiment. Therefore, in the present embodiment, parts different from those of the first embodiment will be mainly described, and description of parts similar to those of the first embodiment may be omitted.

Figure 39:
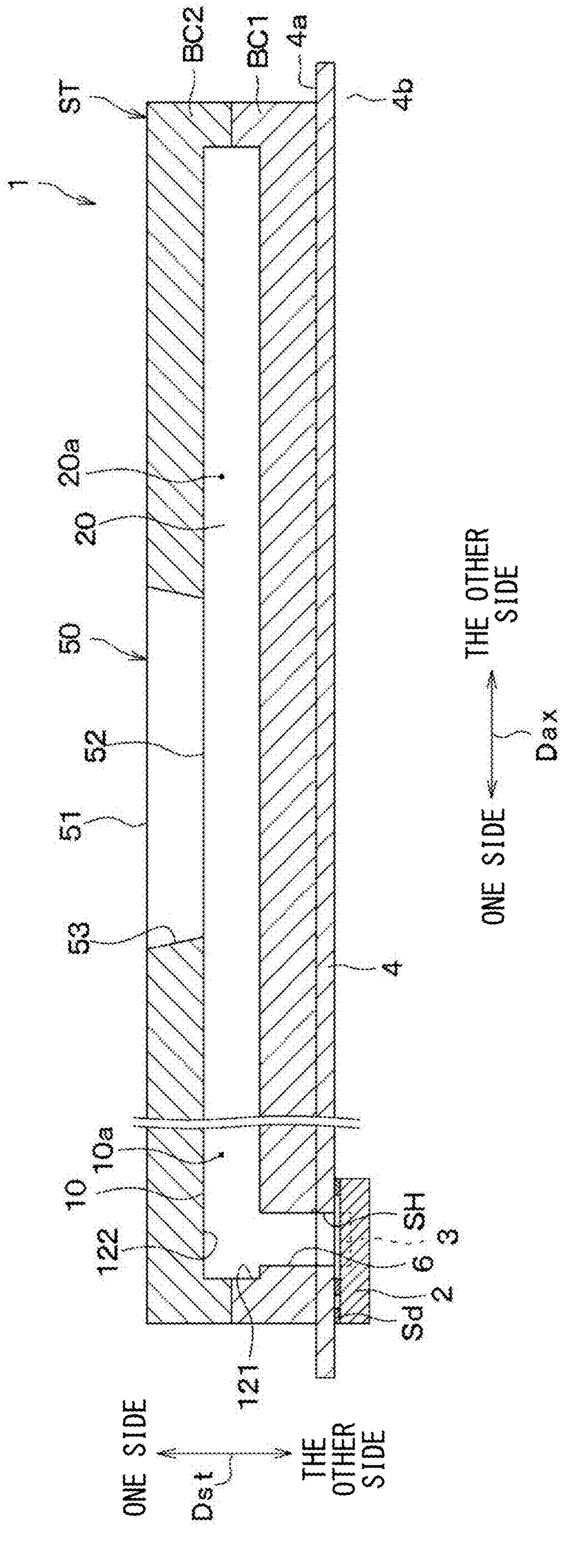
FIG. 39 is a cross-sectional view schematically illustrating a schematic configuration of an antenna device according to an eighth embodiment.

As illustrated in FIG. 39, in the antenna device 1 of the present embodiment, the first block BC1 is disposed to be in contact with the one surface 4*a* of the electrical board 4, without the spacer 5 described in the first embodiment. The MMIC 2 is mounted on the other surface 4*b* of the electrical board 4. A board through-hole SH penetrating the electrical board 4 in the stacking direction Dst is formed at a position facing the input/output section 3 of the MMIC 2 in the electrical board 4. The external port 6 is disposed to face the input/output section 3, with the board through-hole SH interposed between the external port 6 and the input/output section 3 of the MMIC 2. With such an arrangement form, radio waves can propagate between the external port 6 and the MMIC 2.

The other configurations are similar to those of the first embodiment. The antenna device 1 of the present embodiment can obtain effects similar to those of the first embodiment, exerted by a configuration similar or equivalent to that of the first embodiment.

Although the present embodiment is a modification based on the first embodiment, the present embodiment can be combined with any of second to sixth embodiments.

Ninth Embodiment

Next, a ninth embodiment will be described with reference to FIG. 40. The present embodiment differs from the first embodiment in that connection wiring 3*a* and an input/output circuit 3*b* are provided instead of the input/output section 3. The other configurations are similar to those of the first embodiment. Therefore, in the present embodiment, parts different from those of the first embodiment will be mainly described, and description of parts similar to those of the first embodiment may be omitted.

Figure 40:
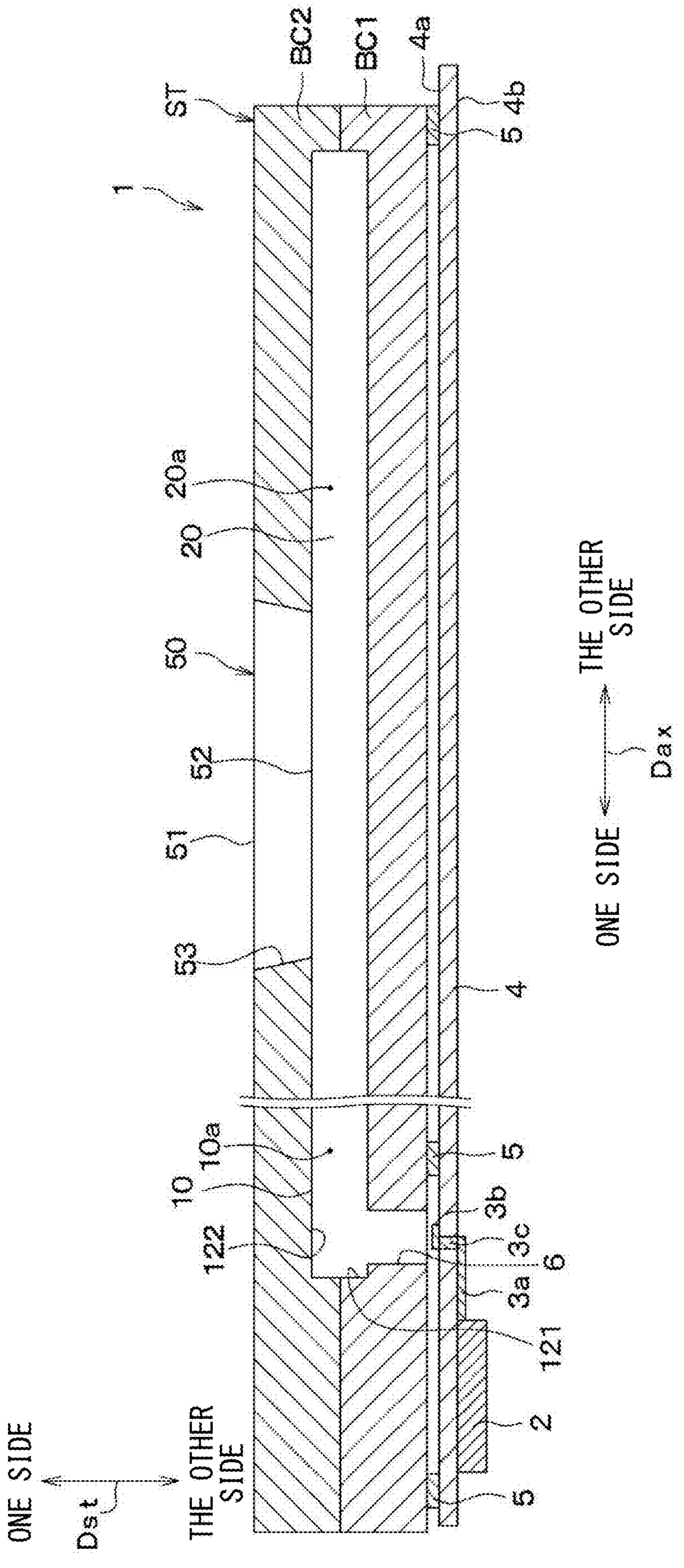
FIG. 40 is a cross-sectional view schematically illustrating a schematic configuration of an antenna device according to a ninth embodiment.

As illustrated in FIG. 40, in the present embodiment, connection wiring 3*a* and an input/output circuit 3*b* are provided on the electrical board 4 instead of the input/output section 3 of the MMIC 2. The connection wiring 3*a* and the input/output circuit 3*b* are configured by a conductive wiring pattern formed on the electrical board 4.

In the electrical board 4, the input/output circuit 3*b* is formed on the one surface 4*a*, and the connection wiring 3*a* is formed on the other surface 4*b*. The electrical board 4 is provided with a connection 3*c* that penetrates the electrical board 4 and electrically connects the connection wiring 3*a* and the input/output circuit 3*b*. The connection 3*c* is formed of, for example, a through hole. The input/output circuit 3*b* and the connection wiring 3*a* are electrically connected via the connection 3*c*. The input/output circuit 3*b* transmits and receives radio waves to and from the external port 6 of the antenna device 1. The input/output circuit 3*b* functions similarly to the input/output section 3 of the MMIC 2 in the first embodiment.

The other configurations are similar to those of the first embodiment. The antenna device 1 of the present embodiment can obtain effects similar to those of the first embodiment, exerted by a configuration similar or equivalent to that of the first embodiment.

Although the present embodiment is a modification based on the first embodiment, the present embodiment can be combined with any of second to sixth embodiments.

Tenth Embodiment

Next, a tenth embodiment will be described with reference to FIG. 41. The present embodiment differs from the ninth embodiment in that the spacer 5 is not provided. The other configurations are similar to those of the ninth embodiment. Therefore, in the present embodiment, parts different from those of the ninth embodiment will be mainly described, and description of parts similar to those of the ninth embodiment may be omitted.

Figure 41:
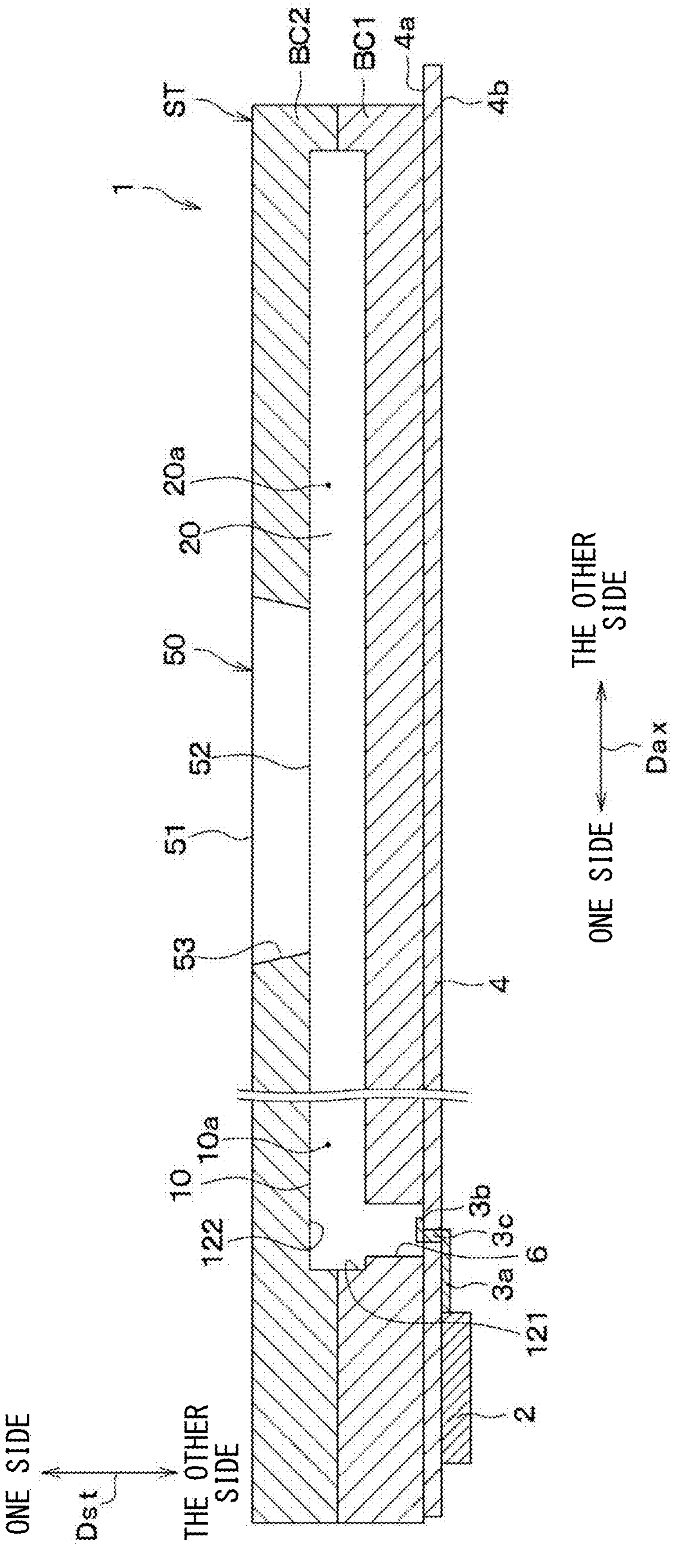
FIG. 41 is a cross-sectional view schematically illustrating a schematic configuration of an antenna device according to a tenth embodiment.

As illustrated in FIG. 41, in the present embodiment, the spacer 5 in the ninth embodiment is not provided. In the antenna device 1 of the present embodiment, the first block BC1 is disposed to be in contact with the one surface 4*a* of the electrical board 4 without the spacer 5. The MMIC 2 is mounted on the other surface 4*b* of the electrical board 4.

The input/output circuit 3*b* is formed on the one surface 4*a* of the electrical board 4, and the connection wiring 3*a* is formed on the other surface 4*b* of the electrical board 4. The electrical board 4 is provided with a connection 3*c* that penetrates the electrical board 4 and electrically connects the connection wiring 3*a* and the input/output circuit 3*b*. The connection 3*c* is formed of, for example, a through hole. The input/output circuit 3*b* and the connection wiring 3*a* are electrically connected via the connection 3*c*.

The other configurations are similar to those of the ninth embodiment. The antenna device 1 of the present embodiment can obtain effects similar to those of the ninth embodiment, exerted by a configuration similar or equivalent to that of the ninth embodiment.

Eleventh Embodiment

Next, an eleventh embodiment will be described with reference to FIG. 42. The present embodiment differs from the first embodiment in that the MMIC 2 is mounted on the one surface 4*a* of the electrical board 4, and the connection wiring 3*a* and the input/output circuit 3*b* are provided instead of the input/output section 3. The other configurations are similar to those of the first embodiment. Therefore, in the present embodiment, parts different from those of the first embodiment will be mainly described, and description of parts similar to those of the first embodiment may be omitted.

Figure 42:
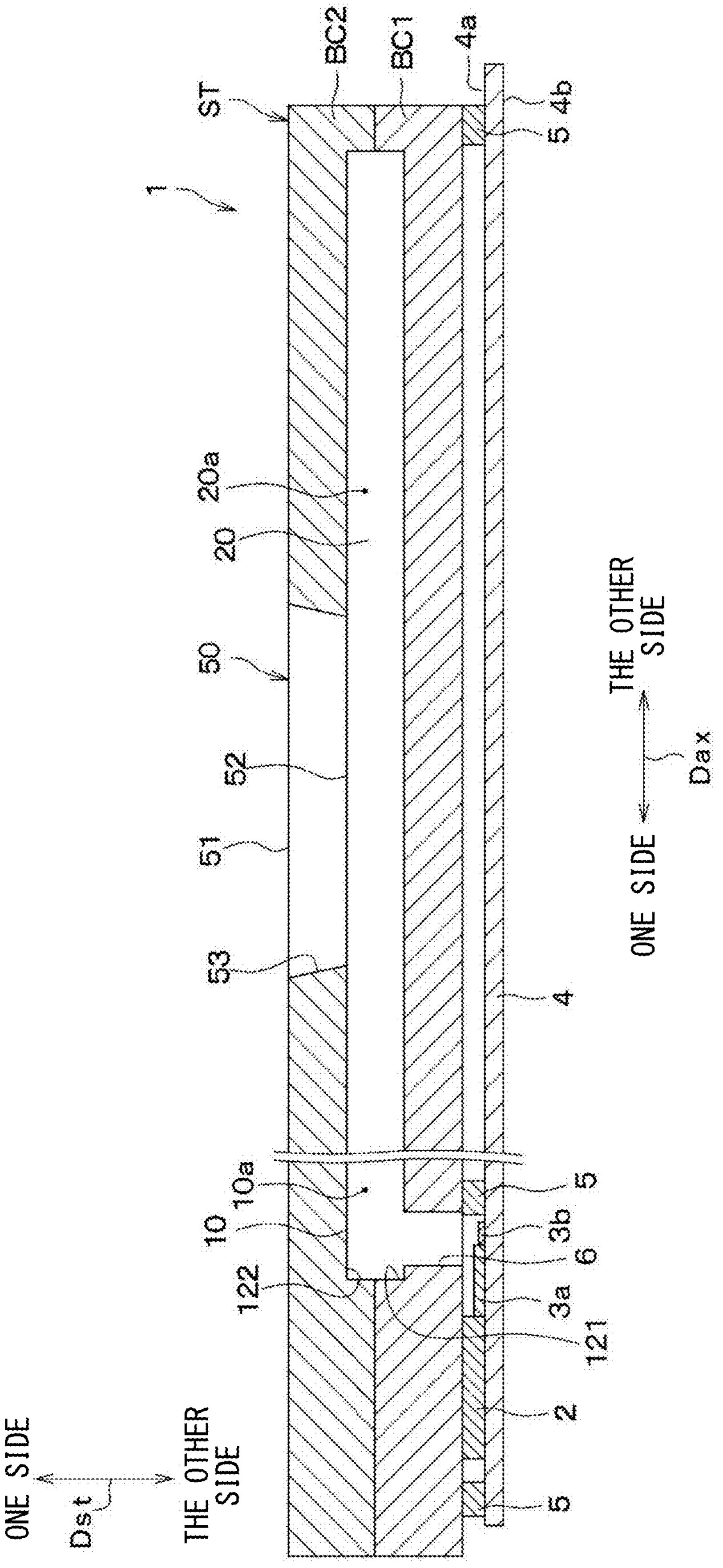
FIG. 42 is a cross-sectional view schematically illustrating a schematic configuration of an antenna device according to an eleventh embodiment.

As illustrated in FIG. 42, in the antenna device 1 of the present embodiment, the MMIC 2 is mounted on the one surface 4*a* of the electrical board 4, rather than on the other surface 4*b* of the electrical board 4. A gap for disposing the MMIC 2 is ensured by plural spacers 5 between the first block BC1 of the antenna device 1 and the one surface 4*a* of the electrical board 4, and the MMIC 2 is disposed between the first block BC1 and the one surface 4*a* of the electrical board 4. Moreover, in the present embodiment, connection wiring 3*a* and an input/output circuit 3*b* are provided on the electrical board 4 instead of the input/output section 3 of the MMIC 2. The connection wiring 3*a* and the input/output circuit 3*b* are configured by a conductive wiring pattern formed on the electrical board 4.

The connection wiring 3*a* is formed to be led out from the MMIC 2 along the one surface 4*a* of the electrical board 4. The connection wiring 3*a* has one side electrically connected to the terminal of the MMIC 2, and the other end side electrically connected to the input/output circuit 3*b*. The input/output circuit 3*b* transmits and receives radio waves to and from the external port 6 of the antenna device 1. The input/output circuit 3*b* functions similarly to the input/output section 3 of the MMIC 2 in the first embodiment.

The external port 6 of the present embodiment is disposed to face the input/output circuit 3*b*. This enables radio waves to propagate between the external port 6 and the input/output circuit 3*b*. In the present embodiment, since the MMIC 2 is mounted on the one surface 4*a* of the electrical board 4 as described above, the board through-hole SH is not formed in the electrical board 4.

The other configurations are similar to those of the first embodiment. The antenna device 1 of the present embodiment can obtain effects similar to those of the first embodiment, exerted by a configuration similar or equivalent to that of the first embodiment.

Although the present embodiment is a modification based on the first embodiment, the present embodiment can be combined with any of second to sixth embodiments.

Other Embodiments

Although the representative embodiments of the present disclosure have been described above, the present disclosure is not limited to the embodiments described above, and can be variously modified as follows, for example.

The MMIC 2 in the embodiments described above transmits and receives radio waves, but this is merely an example, and only one of transmission and reception of radio waves may be performed. The antenna device 1 is also applicable to equipment that transmits and receives radio waves by a semiconductor device other than the MMIC 2.

In the embodiments described above, the antenna device 1 is configured by the structure ST in which the two blocks BC1, BC2 are stacked in the stacking direction Dst, but may not be configured by the structure ST having such a stacked structure.

In the embodiments, the first waveguide section 20 and the second waveguide section 30 have equal dimensions in the guide axis direction Dax, but the present disclosure is not limited thereto. The first waveguide section 20 and the second waveguide section 30 may have different dimensions in the guide axis direction Dax may differ from each other as long as the first connection 21 and the second connection 31 are located at positions that overlap in the guide axis direction Dax.

In the embodiments, the first distribution section 41 and the second distribution section 42 have equal dimensions in the guide axis direction Dax, but the present disclosure is not limited thereto. The first distribution section 41 and the second distribution section 42 may have different dimensions in the guide axis direction Dax.

It goes without saying that in the embodiments described above, the elements constituting the embodiments are not necessarily essential except for a case where it is explicitly stated that the elements are particularly essential and a case where the elements are considered to be obviously essential in principle.

In the embodiments described above, when a numerical value such as the number, a numerical value, an amount, or a range of the constituent elements of the embodiment is referred to, the numerical value is not limited to specific numerical values unless otherwise specified as being essential or obviously limited to the specific numerical values in principle.

In each of the embodiments, when the shapes, positional relationships, and the like of the constituent elements and the like are referred to, the shapes, positional relationships, and the like are not limited thereto unless otherwise specified or limited to specific shapes, positional relationships, and the like in principle.

What is claimed is:

1. An antenna device comprising:

a plurality of waveguide sections each forming a waveguide path that is a propagation path for radio waves;

a partition wall section disposed between the plurality of waveguide sections to partition the plurality of waveguide sections;

a plurality of radiation aperture sections connected to the plurality of waveguide sections, respectively, to radiate the radio waves; and a distribution section including a feeding aperture through which radio waves are introduced and forming a distribution waveguide that is a propagation path to distribute and propagate the radio waves to each of the plurality of waveguide sections, wherein each of the plurality of waveguide sections extends in a first direction and has a connection on one side in the first direction, the connection being connected to an end of the distribution section on the other side in the first direction, the waveguide sections are arranged in a second direction orthogonal to the first direction, and positions of the connections of the waveguide sections overlap with each other in the first direction, positions of two of the radiation aperture sections are shifted from each other in the first direction, the two of the radiation aperture sections being respectively connected to two of the waveguide sections adjacent to each other via the partition wall section, the feeding aperture is connected to the distribution section in the second direction, and the distribution section is formed by being folded back from the one side to the other side in the first direction to propagate the radio waves to the connections of the two of the waveguide sections and to make phases of the radio waves opposite to each other.

2. The antenna device according to claim 1, wherein each of the plurality of waveguide sections has a narrow wall surface extending in the first direction and the second direction and a wide wall surface extending in the first direction and a third direction orthogonal to the first direction and the second direction, the narrow wall surface is formed with a size in the second direction smaller than a size of the wide wall surface in the third direction, and the radiation aperture sections are defined on the narrow wall surfaces of the waveguide sections respectively.

3. The antenna device according to claim 1, wherein a distance in the first direction from the end of the distribution section on the other side in the first direction to the feeding aperture is defined as a first distance, a distance in the first direction from an end of the distribution section on the one side in the first direction to the feeding aperture is defined as a second distance, and the first distance and the second distance are set to make the phases of the radio waves opposite to each other in the distribution section.

4. The antenna device according to claim 1, wherein the distribution section includes, at an end on the one side in the first direction, a first inclined surface that faces the distribution waveguide and extends at an incline relative to the first direction and the second direction so as to approach one of the two of the waveguide sections from the other side to the one side in the first direction, and a second inclined surface that faces the distribution waveguide and extends at an incline relative to the first direction and the second direction so as to approach the other of the two of the waveguide sections from the one side to the other side in the first direction, a distance in the first direction from the end of the distribution section on the other side in the first direction to the feeding aperture is defined as a first distance, a distance in the first direction from an end of the distribution section on the one side in the first direction to the feeding aperture is defined as a second distance, a distance from an end of the first inclined surface on the one side to an end of the first inclined surface on the other side in the first direction is defined as a third distance, a distance from an end of the second inclined surface on the one side to an end of the second inclined surface on the other side in the first direction is defined as a fourth distance, and the first distance, the second distance, the third distance, and the fourth distance are set to make the phases of the radio waves opposite to each other in the distribution section.

5. The antenna device according to claim 1, wherein each of the plurality of radiation aperture sections includes a communication port communicating with the plurality of waveguide sections and a radiation aperture opening toward an external space, and is formed as a through-hole with an inner diameter expanding from the communication port toward the radiation aperture.

6. The antenna device according to claim 1, further comprising a feeding section connected to the feeding aperture and forming a feeding path that forms a propagation path for propagating the radio waves to the distribution waveguide, wherein the feeding section is formed to be partially bent relative to the second direction.

7. The antenna device according to claim 1, further comprising a choke groove configured to reduce interference of the radio waves, wherein the waveguide sections are configured by arranging, side by side, a plurality of antenna sections each including two waveguide sections adjacent to each other via the partition wall section, and the choke groove is formed between the plurality of the antenna sections.

* * * * *